United States Patent [19]

Hata

[11] Patent Number: 5,028,773
[45] Date of Patent: Jul. 2, 1991

[54] LENS CONTROLLER INCLUDES A ZOOMING OPTICAL SYSTEM AND A ZOOMING SPEED CONTROL DEVICE

[75] Inventor: Daisuke Hata, Funabashi, Japan

[73] Assignee: Ricoh Company, Ltd., Tokyo, Japan

[21] Appl. No.: 397,193

[22] Filed: Aug. 23, 1989

[30] Foreign Application Priority Data

| Aug. 23, 1988 | [JP] | Japan | 63-208890 |
| Sep. 2, 1988 | [JP] | Japan | 63-220196 |
| Sep. 3, 1988 | [JP] | Japan | 63-221007 |
| Jul. 15, 1989 | [JP] | Japan | 1-183061 |

[51] Int. Cl.$^5$ .............................. G01J 1/20
[52] U.S. Cl. ........................ 250/201.2; 354/195.1
[58] Field of Search ..................... 250/201.2; 354/400–409, 195.1; 350/429

[56] References Cited

U.S. PATENT DOCUMENTS

| 4,583,827 | 4/1986 | Tokunaga et al. | 350/429 |
| 4,937,602 | 6/1990 | Himuro et al. | 354/195.1 |

*Primary Examiner*—David C. Nelms
*Assistant Examiner*—Que T. Le
*Attorney, Agent, or Firm*—Oblon, Spivak, McClelland, Maier & Neustadt

[57] ABSTRACT

A lens controller comprises a varifocal lens changed by a focusing position with respect to a shifting amount of an image forming position; a focusing drive unit for driving a focusing lens group constituting a zooming optical system; a zooming drive unit for driving a zooming lens group constituting the zooming optical system; a detector for detecting the position of the focusing lens group between proximate and infinite positions; a detector for detecting the position of the zooming lens group on the optical axis thereof corresponding to the focal distance of the entire zooming optical system; a focusing correction control device for calculating a correcting amount of the shift of the image forming position with respect to the focal distance when the zooming operation is performed to change the focal distance of the entire zooming optical system by the zooming drive unit, the focusing correction control device controlling the focusing drive unit so as to move the focusing lens group to the focusing position in accordance with the correcting amount; and a zooming speed control device for receiving an output of the focusing lens group position detector and changing the zooming speed in a predetermined relation based on the change in output of the focusing lens group position detector. The other constructional devices may be used to automatically correct the shift of the image forming position.

8 Claims, 27 Drawing Sheets

Fig. 1 (ii)
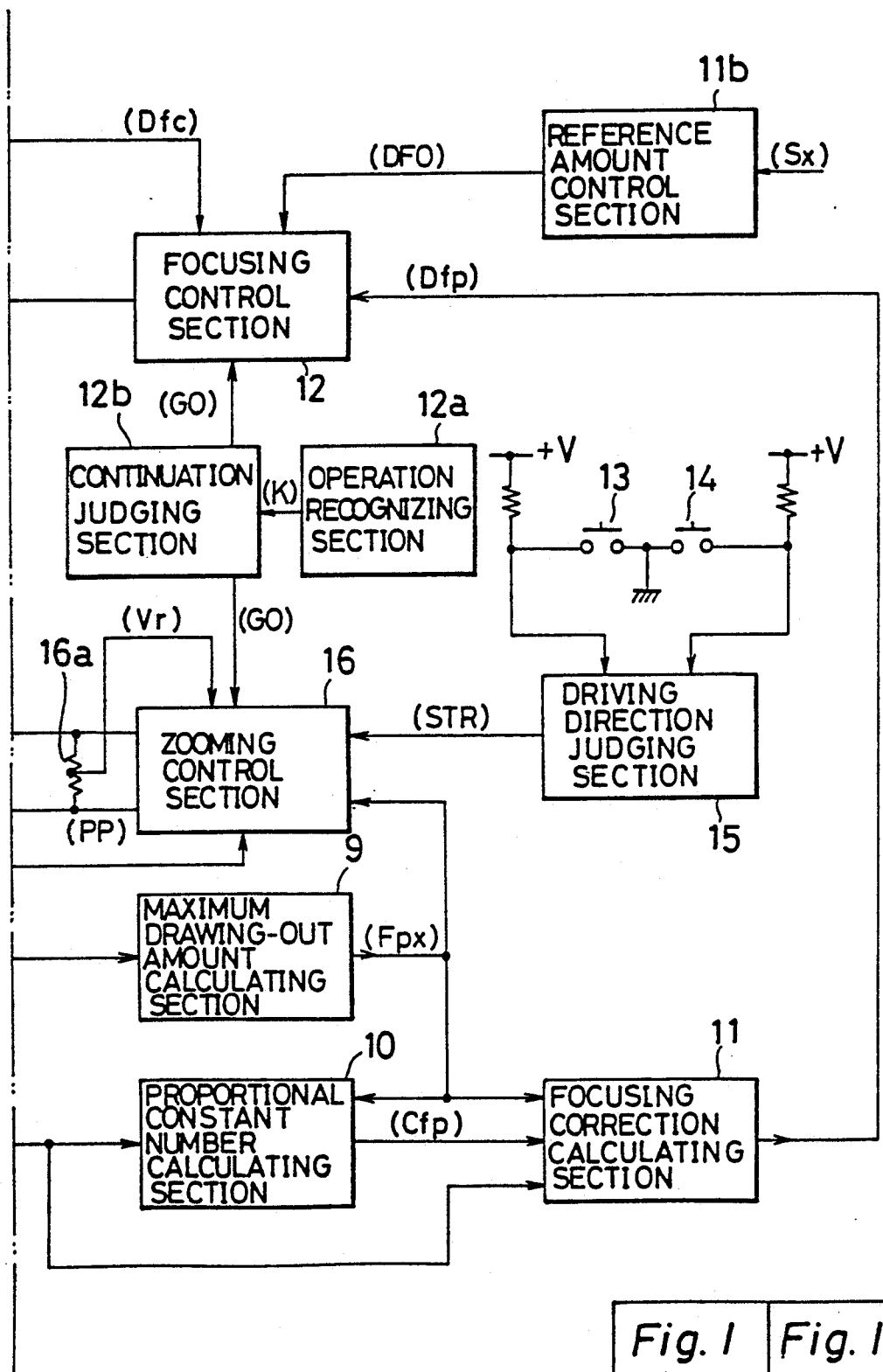

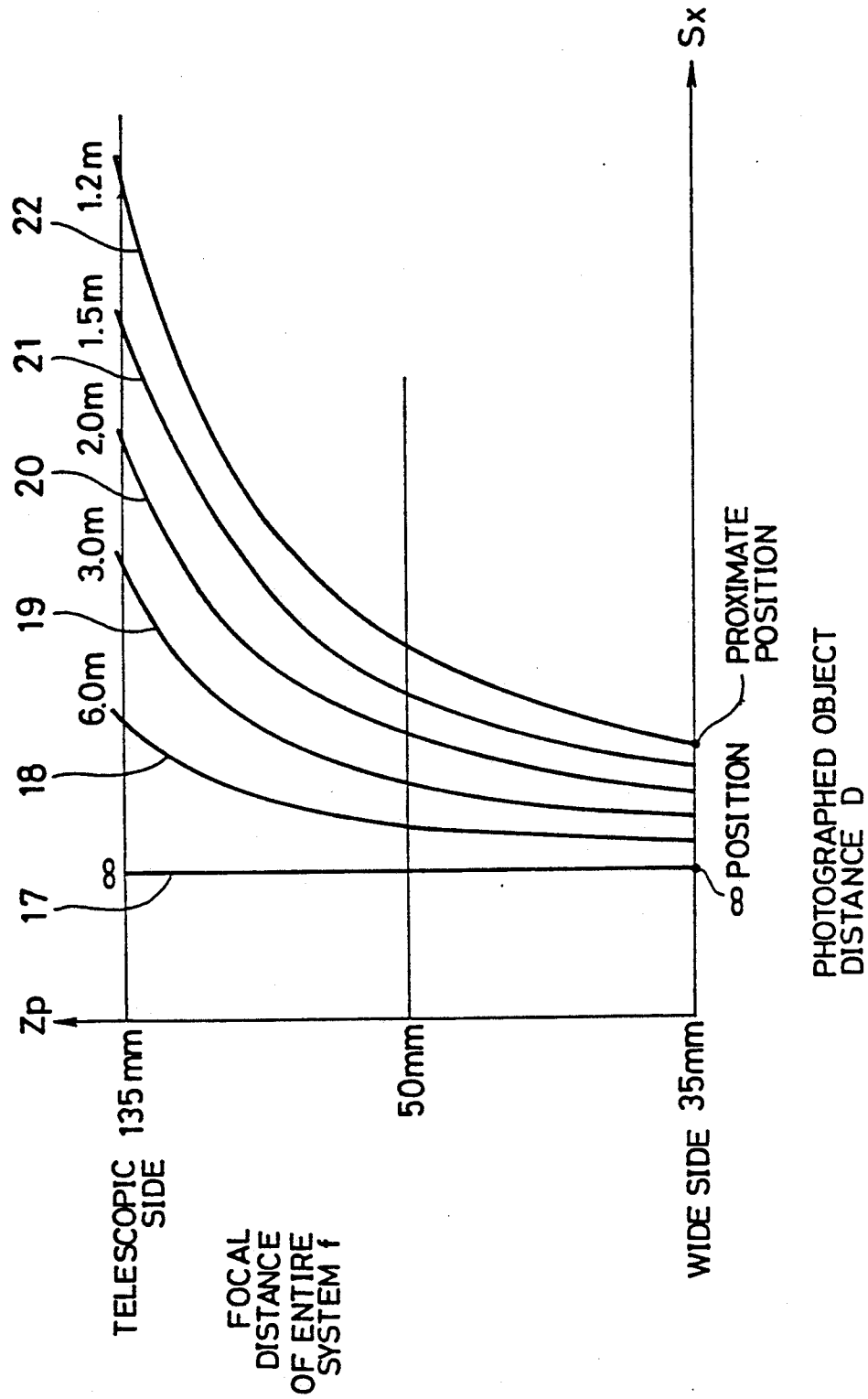

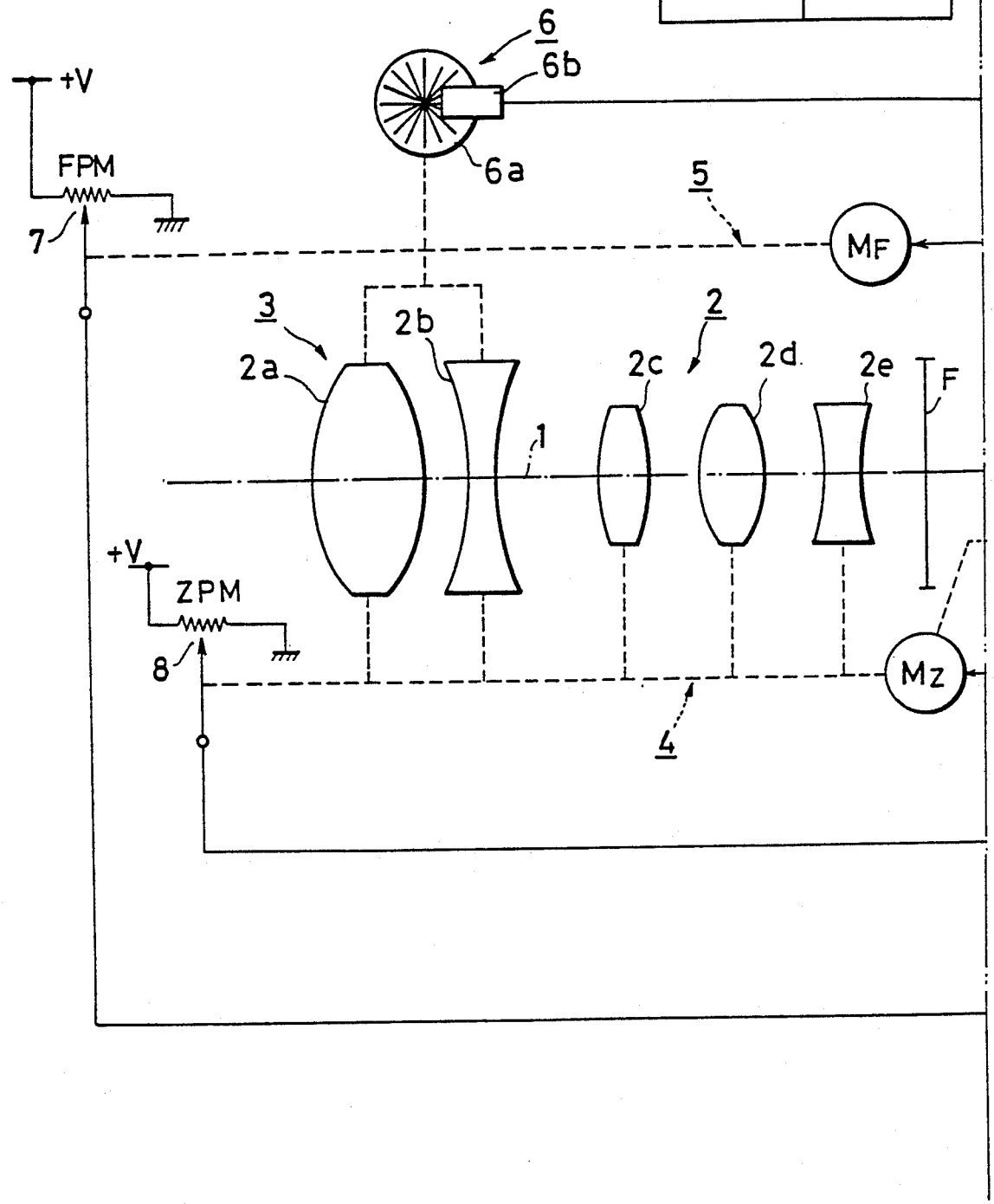

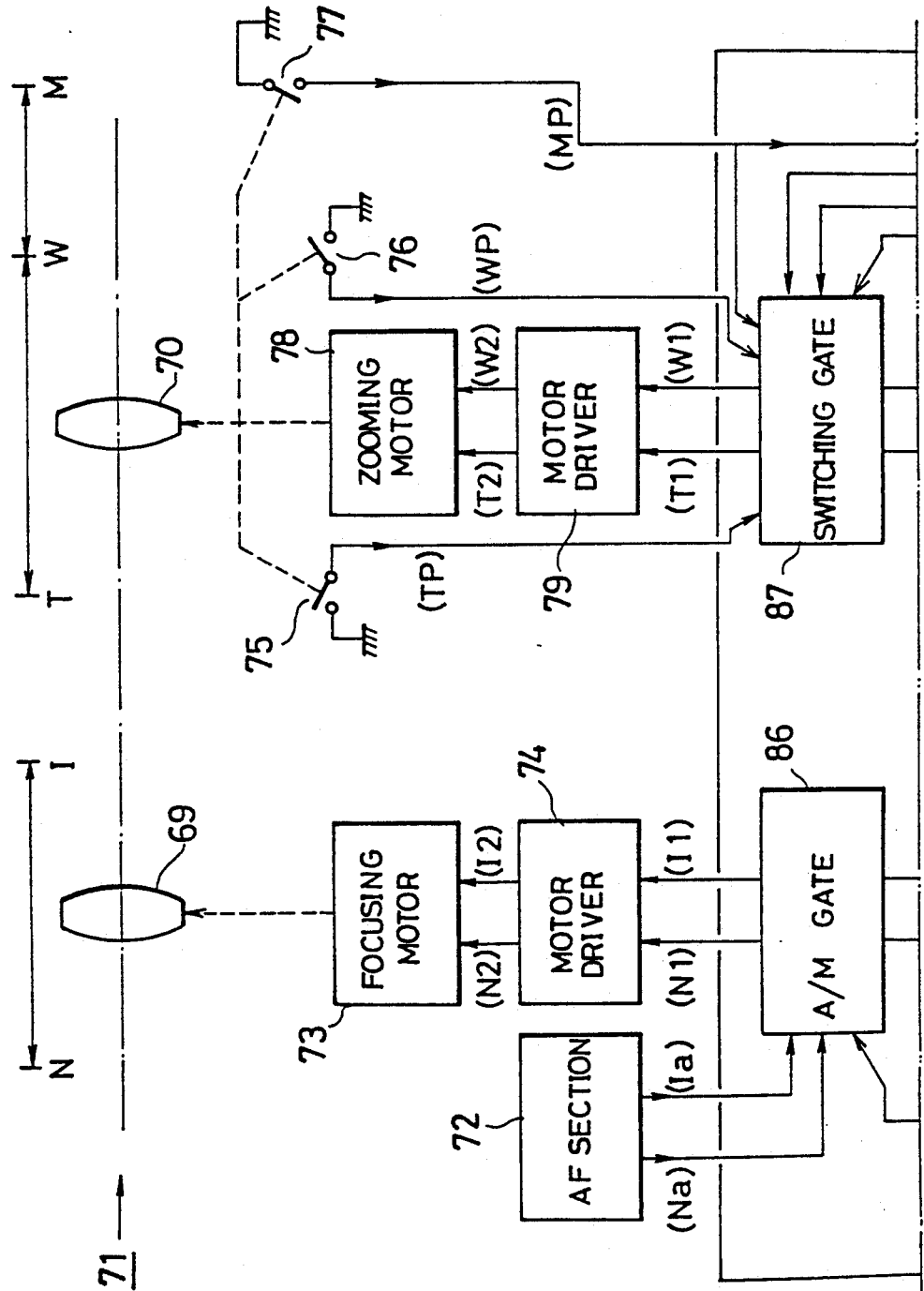

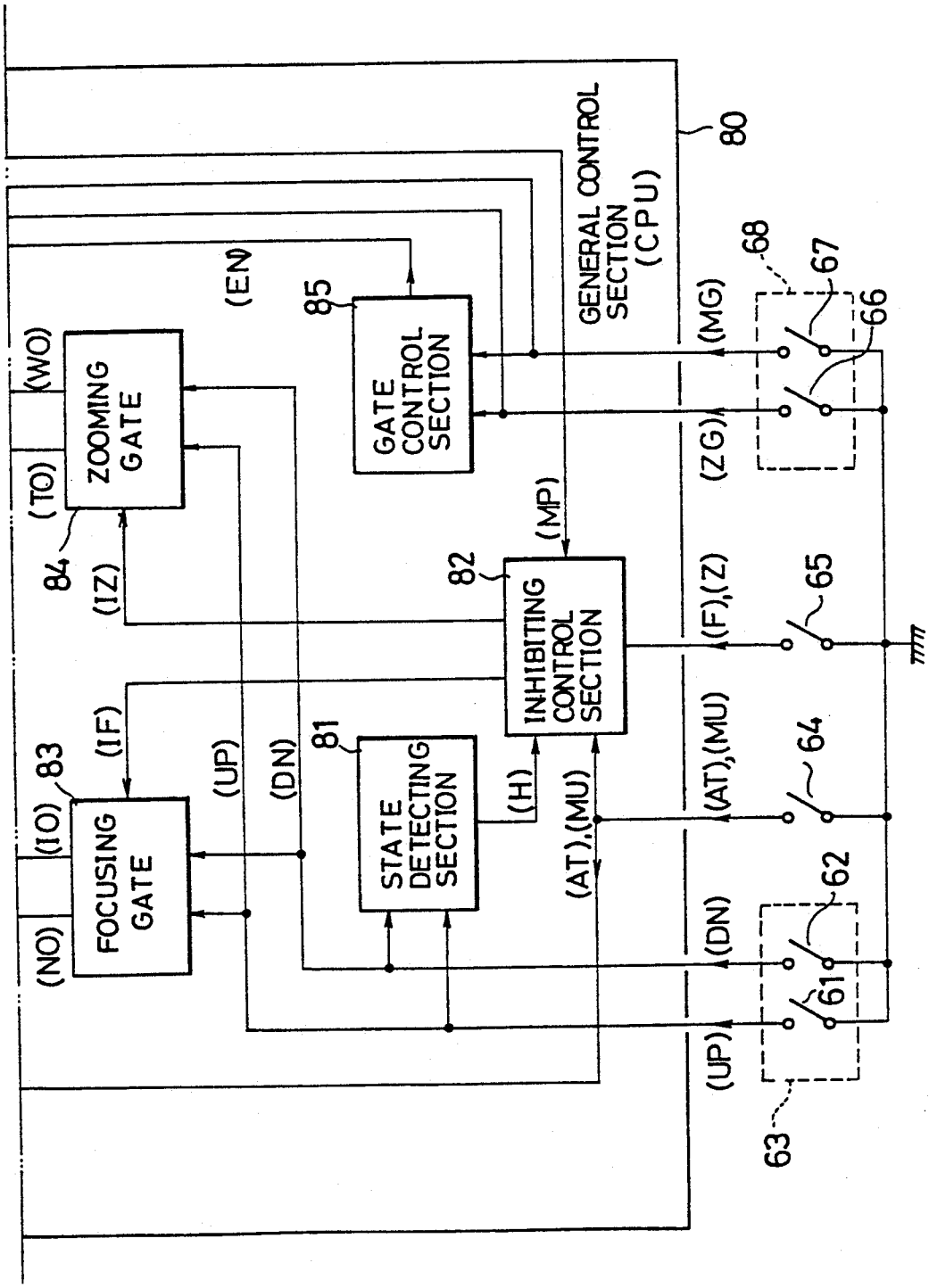

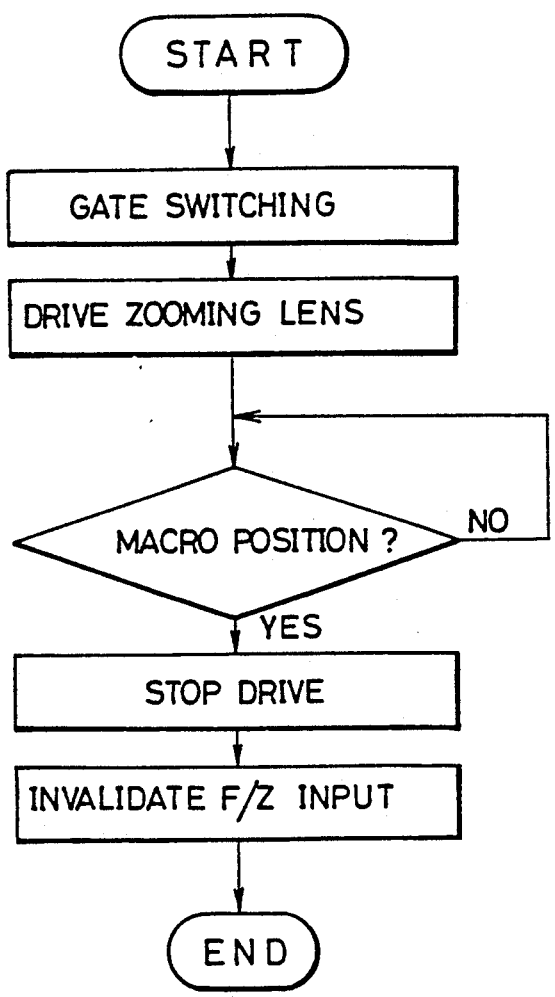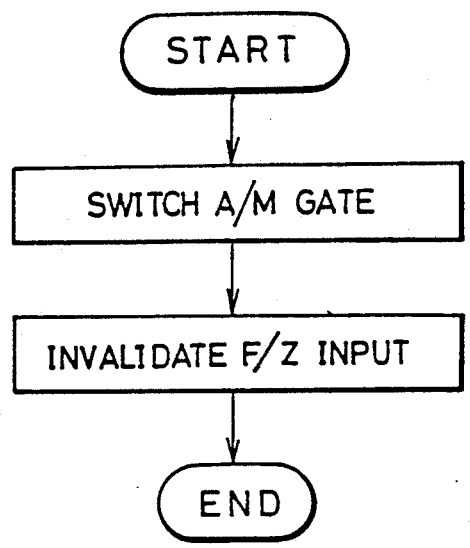
Fig. 24
Fig. 25

LENS CONTROLLER INCLUDES A ZOOMING OPTICAL SYSTEM AND A ZOOMING SPEED CONTROL DEVICE

BACKGROUND OF THE INVENTION

1. Field of the Invention

The present invention relates to a controller for controlling lenses. More particularly, the present invention relates to a lens controller which has as a photographing lens a zooming optical system composed of a focusing lens group and a zooming lens group respectively disposed on the same optical axis and performs focusing adjustment and operation by driving the focusing lens group and performs a zooming operation for changing the focal distance of the lens group by driving the zooming lens group.

2. Discussion of the Background

With respect to a zooming lens, there is no shift of an image forming position(the so-called focusing movement or shift) even when the zooming operation is performed. Accordingly, it is not necessary to perform the focusing adjustment in every zooming operation. However, an open diaphragm F number is small in comparison with a single focusing lens. For example, a certain skill is required to perform the focusing adjustment or operation by a single-lens reflex type finder. Recently, the cameras have been automatically focused and thereby this problem has been solved. Thus, the function of the zooming lens itself can be fulfilled so that an operator can concentrate on only the determination of composition along the intention of taking a photograph, thereby greatly improving the operability.

In general, the focusing operation of the zooming lens is performed by moving a focusing lens group disposed in a portion of a zooming optical system. In the case of the zooming lens, the moving amount of the focusing lens group is approximately the same with respect to the same distance between the lens and a photographed object in the entire zooming region, which is called an equivalent amount movement in the following description. Accordingly, a scale for indicating the distance of the photographed object is additionally disposed in a moving member(distance ring) of the focusing lens group. Further, an index is additionally disposed in a fixed ring adjacent to this scale. By such a simple construction, the distance between the lens and the photographed object can be indicated, and it is not necessary to change the scale for the distance of the photographed object in accordance with the zooming operation.

However, in the zooming lenses of an inner focusing system and a rear focusing system, when an optical design is performed under the condition of realizing the above-mentioned equivalent amount movement, the construction of the lens is complicated and the moving amount(the drawing-out amount) of the focusing lens group is excessively large on the wide angle side thereof. These situations depend on the construction of the lenses of the zooming optical system.

Further, by such a construction, the outer diameter of the lens becomes large and therefore the lens and the body tube become heavy.

The operability of the zooming lens is improved by combining this lens with the auto focusing function. However, the condition of the above equivalent amount movement provided for the zooming lens is required so that it is still difficult to make the lens controller compact and reduce the cost of the lens controller.

The same applicant as this applicant has therefore proposed a varifocal lens controller for solving the above-mentioned problems as Japanese application No. 62-013345.

In this prior application, a zooming optical system is composed of a zooming lens group and a focusing lens group arranged on the same optical axis. The focusing lens group of the zooming optical system is set in a focusing position from a proximate position to an infinite position on the optical axis corresponding to the distance of a photographed object from the proximate position to the infinite position. Thereafter, the focal distance of the entire zooming optical system is changed by the zooming lens group from an arbitrary first focal distance to a second focal distance between the shortest and longest focal distances, thereby shifting the image forming position with respect to the same photographed object. Such a varifocal lens controller comprises focal distance detecting means for detecting the above focal distance of the entire zooming optical system; focusing lens group position detecting means for detecting the position of the focusing lens group on the above optical axis; maximum drawing-out amount calculating means for receiving an output of the focal distance detecting means and calculating the drawing-out amount of the focusing lens group from the infinite position to the proximate position with respect to the above focal distance; and proportional constant calculating means for receiving outputs of the maximum drawing-out amount calculating means and the focusing lens group position detecting means and calculating a ratio of these outputs. The varifocal lens controller further comprises focusing correction calculating means for receiving outputs of the proportional constant calculating means, the maximum drawing-out amount calculating means and the focusing lens group position detecting means and calculating, as a correction value, a shifting amount of the image forming position from the said focal position caused by the change in focal distance of the entire zooming optical system; focusing drive means for driving the above focusing lens group; moving amount monitoring means for generating a signal corresponding to the moving amount of the focal lens group; and focusing control means for receiving outputs of the moving amount monitoring means and the focusing correction calculating means and controlling the focusing lens group to move this lens group to the above focal position. The varifocal lens controller further comprises zooming drive means for driving the above zooming lens group; and zooming control means for receiving a start signal from starting means separately disposed and controlling the above zooming drive means. The varifocal lens controller is thus constructed to automatically correct the shift of the image forming position caused by the change in focal distance of the entire zooming optical system.

On the other hand, many cameras have recently been electronized and automatically driven. In such cameras, various kinds of operations are automatically performed by the so-called one touch operation (or single operation). In such a situation, the camera body tends to be made compact and the number of operating switches is necessarily increased as the number of functions of cameras is variously increased. It is natural and rational that the operability of the operating switches is considered with the size of the man's fingers as a reference.

Namely, in the case of a push-button switch for example, it becomes easy for an operator to push the switch as the area for an operating face pushed by an operator's finger is increased. However, as mentioned above, the surface of the camera body has a limited area. To solve this problem, a technique for corresponding one operating switch to a plurality of operations has already been known.

For example, in a lens controller, an UP/DN switch for selecting the zooming direction is disposed to change the focal distance of the zooming lens on the longer focal distance side(telescopic side) or the shorter focal distance side(wide side). The lens controller further has an F/Z switch for manually selecting the focusing operation and the zooming operation, and an A/M switch for selecting whether the focusing operation is performed automatically or manually. The lens controller further has a ZG/MG switch for selecting whether the zooming lens is set to take a macroscopic photograph or is returned to a zooming region. The focusing operation is selected by the F/Z switch in the lens controller mentioned above. In such a lens controller, a switch for indicating the focusing direction is insufficient. In such a case, as is well known, the lens controller is constructed such that the switching operation of the above UP/DN switch corresponds to two operations, and the F/Z switch constructs a switch for indicating the zooming direction when the F/Z switch selects the zooming operation and constructs a switch for indicating the focusing direction when the F/Z switch selects the focusing operation.

In accordance with the invention of the prior application constructed above, the lens optical system itself has a very simple construction and is compact, and light and cheap. The entire lens controller is similarly compact, and light and cheap. Further, even when the focal distance of the entire lens optical system is changed by moving the zooming lens group from the arbitrary first focal position to the second focal position, the shift of the image forming position peculiar to the varifocal lens can be immediately corrected to hold the focusing state. Accordingly, such a lens controller substantially provides a lens system equivalent to the zooming lens when this lens controller is used.

However, in the varifocal lens in accordance with the invention of the prior application, the condition of the above equivalent amount movement is removed therefrom. Therefore, when the focal distance is changed with respect to the photographed object separated by the same distance, the drawing-out amount of the focusing lens group is changed to perform the focusing operation. Accordingly, when the zooming lens group is driven to perform the zooming operation for changing the focal distance, the shift of the image forming position caused by this zooming operation must be corrected by the above focusing operation. The correcting amount for correcting this shift is changed by the focal distance as mentioned above, but the rate of this change is further changed by the distance of the photographed object. For example, in comparison with the zooming time required to perform the zooming operation from the longest focal distance to the shortest focal distance, this zooming time is short in the case of the distance of the photographed object providing a small rate of the above change and is long in the case of the distance of the photographed object providing a large rate of the above change. Accordingly, there is a problem that the zooming time is not uniform by the distance of the photographed object with respect to the same changing amount of the focal distance.

In a certain case, in accordance with the construction of the varifocal lens, when the focal distance of the entire zooming optical system is changed from the shortest focal distance to the longest focal distance, the focusing position in the infinite position($\infty$ position) is not changed and the focusing position in the proximate position is changed so as to move away from the infinite position. In such a case, when the operation of the focusing lens group is controlled while the zooming lens group is moved to perform the zooming operation from the long focal point side to the short focal point side, or conversely, when the zooming operation is performed onto the side of the long focal point, the focusing lens group hits against a positioning member such as a stopper, etc., in the infinite position and the proximate position. Therefore, the focusing lens group cannot be moved and controlled, and the load of a drive motor is excessively increased, thereby causing a new problem.

Further, the following problems are caused in the case in which the operation of the UP/DN switch corresponds to the two operations and the F/Z switch constructs a switch for indicating the zooming direction when the F/Z switch selects the zooming operation, and constructs a switch for indicating the focusing direction when the F/Z switch selects the focusing operation.

In the following description, it is assumed that the composition(angle of view) has been completely determined and the F/Z switch is switched onto the side of the focusing operation. Further, it is assumed that the F/Z switch has been switched in error onto the side of the zooming operation while the UP/DN switch is operated to perform the focusing operation in accordance with the above-mentioned composition. In such a case, the UP/DN switch fulfills an original function of a switch for indicating the zooming direction so that the zooming operation is started and thereby the composition already determined is changed.

In a normal macro mode for fixing the focal distance of the zooming lens to a predetermined focal distance or magnification within a macro region by the ZG/MG switch, this magnification should not be changed after this fixing operation so that the zooming operation is inhibited and only the focusing operation is allowed in accordance with the general construction of the lens controller. However, in such a construction, when the F/Z switch is set onto the side of the zooming operation, the focusing operation by the UP/DN switch cannot be performed and the zooming operation also cannot be performed since the zooming operation is inhibited as mentioned above. Therefore, a beginner, who does not use such a camera so often, gets confused in such a situation. Further, it takes time to perform a suitable operation in such a situation even in the case of an operator who often uses the camera. Therefore, an important shutter chance of the camera is lost in a certain case.

When the A/Z switch is set onto the auto focusing side, the manually focusing operation is naturally inhibited and only the zooming operation is allowed in accordance with the general construction of the lens controller. However, in such a construction, when the F/Z switch is set onto the side of the manually focusing operation, the zooming operation cannot be naturally performed by the UP/DN switch and the manually focusing operation also cannot be performed since the manually focusing operation is inhibited as mentioned above. Therefore, the operator or user of the camera gets confused and a suitable operation is delayed in such a situation.

SUMMARY OF THE INVENTION

It is therefore a first object of the present invention to provide a lens controller using a varifocal lens as a compact and simple optical system cheaply manufactured and automatically correcting the shift of an image forming position peculiar to the varifocal lens when the focal distance of the entire zooming optical system is changed from an arbitrary first focal distance to a second focal distance between the shortest focal distance to the longest focal distance after the focusing operation of the focusing lens group is once performed.

A second object of the present invention is to provide a lens controller having an excellent operability such that the shift of the image forming position is accurately corrected and the zooming operation can be performed at a uniform operating speed irrespective of the distance of a photographed object.

A third object of the present invention is to provide a lens controller for preventing the generation of an excessive load of a focusing drive means in the infinite position and the proximate position, the excessive load tending to be caused when the automatic correcting operation of the shift of the image forming position is performed.

A fourth object of the present invention is to provide a lens controller for preventing the drive control of the focusing drive means from being disabled and performing the zooming drive operation reliably and rapidly.

A fifth object of the present invention is to provide a lens controller having a simplified construction and improving the operability of a start inputting means for starting the focusing or zooming operation and preventing the malfunction caused by operating the operation selecting means in error.

The first and second objects of the present invention can be achieved by a lens controller comprising a varifocal lens changed by a focusing position with respect to a shifting amount of an image forming position; focusing drive means for driving a focusing lens group constituting a zooming optical system; zooming drive means for driving a zooming lens group constituting the zooming optical system; means for detecting the position of the focusing lens group between proximate and infinite positions; means for detecting the position of the zooming lens group on the optical axis thereof corresponding to the focal distance of the entire zooming optical system; focusing correction control means for calculating a correcting amount of the shift of the image forming position with respect to the focal distance when the zooming operation is performed to change the focal distance of the entire zooming optical system by the zooming drive means, the focusing correction control means controlling the focusing drive means so as to move the focusing lens group to the focusing position in accordance with the correcting amount; zooming speed control means for receiving an output of the focusing lens group position detecting means and changing the zooming speed in a predetermined relation based on the change in output of the focusing lens group position detecting means; and means for controlling the zooming speed to be approximately constant within a zooming region even when the focusing position is located within any focusing region, and automatically correcting the shift of the image forming position caused by the change in focal distance of the entire zooming optical system.

In the lens controller of the present invention constructed above, the varifocal lens is changed by the focusing position with respect to the shifting amount of the image forming position. When the zooming operation of this varifocal lens is performed by the zooming drive means, the focusing correction control means calculates the correcting amount for correcting the shift of the image forming position with respect to the focal distance. Then, the focusing correction control means controls the operation of the focusing drive means so as to move the focusing lens group to the focusing position in accordance with the correcting amount.

The zooming speed control means receives an output corresponding to the position of the focusing lens group from the focusing lens group position detecting means, and is operated to change the zooming speed in a predetermined relation based on the change in this output.

As a result, the zooming operation within the zooming region is controlled to be approximately constant even when the focusing position is located in any focusing region. Thus, the shift of the image forming position caused by the change in focal distance of the entire zooming optical system is automatically corrected.

The first and second objects of the present invention can be also achieved by a lens controller comprising a varifocal lens changed by a focusing position with respect to a shifting amount of an image forming position; focusing drive means for driving a focusing lens group constituting a zooming optical system; zooming drive means for driving a zooming lens group constituting the zooming optical system; means for detecting the position of the focusing lens group between proximate and infinite positions; means for detecting the position of the zooming lens group on the optical axis thereof corresponding to the focal distance of the entire zooming optical system; focusing correction control means for calculating a correcting amount of the shift of the image forming position with respect to the focal distance when the zooming operation is performed to change the focal distance of the entire zooming optical system by the zooming drive means, the focusing correction control means controlling the focusing drive means so as to move the focusing lens group to the focusing position in accordance with the correcting amount when the correcting amount exceeds a reference amount; reference amount control means for receiving an output of the focusing lens group position detecting means and changing the reference amount in a predetermined relation based on the change in output of the focusing lens group position detecting means; and means for limiting the number of executions of the focus correcting operation for moving the focusing lens group to the focusing position in accordance with the correcting amount, the limiting means controlling the zooming speed to be approximately constant within a zooming region irrespective of the focusing position before the zooming operation is performed, and automatically correcting the shift of the image forming position caused by the change in focal distance of the entire zooming optical system.

In the case in which the correcting amount for correcting the shift of the image forming position with respect to the focal distance exceeds the predetermined amount when the zooming operation for changing the focal distance of the entire zooming optical system is performed by the zooming drive means, the focusing correction control means controls the operation of the focusing drive means to move the focusing lens group to the above focusing position in accordance with this correcting amount. Further, the reference amount control means receives an output from the focusing lens group position detecting means and changes the above reference amount such that the reference amount on the proximate side is greater than that on the infinite side for example on the basis of a predetermined relation provided by the change in this output. Accordingly, the number of executions of the focusing correction is limited in accordance with the above correcting amount. Thus, the zooming speed in the zooming region is approximately controlled constantly irrespective of the focal position before the zooming operation. The shift of the image forming position caused by the change in focal distance of the entire zooming optical system is thus automatically corrected.

The first and second objects of the present invention can be also achieved by a lens controller comprising a varifocal lens changed by a focusing position with respect to a shifting amount of an image forming position; focusing drive means for driving a focusing lens group constituting a zooming optical system; zooming drive means for driving a zooming lens group constituting the zooming optical system; means for detecting the position of the focusing lens group between proximate and infinite positions; means for detecting the position of the zooming lens group on the optical axis thereof corresponding to the focal distance of the entire zooming optical system; focusing correction control means for calculating a correcting amount of the shift of the image forming position with respect to the focal distance when the zooming operation is performed to change the focal distance of the entire zooming optical system by the zooming drive means, the focusing correction control means controlling the focusing drive means so as to move the focusing lens group to the focusing position in accordance with the correcting amount; remaining operation recognizing means for recognizing or measuring an amount of the remaining operation continued for a short time after commands for stopping the operation of the zooming drive means are given thereto; influence judging means for receiving an output of the remaining operation recognizing means and judging whether or not the amount of the remaining operation gives an influence to the next preset operation; and second control means for performing the control operation to execute the preset operation without waiting for the remaining time corresponding to the amount of the remaining operation when the influence judging means judges that the amount of the remaining operation does not give any influence to the next preset operation, the second control means automatically correcting the shift of the image forming position caused by the change in focal distance of the zooming optical system.

In this lens controller, the remaining operation recognizing means recognizes or measures the amount of the remaining operation continued for a short time after the commands for stopping the operation of the zooming drive means. The influence judging means receives an output of this remaining operation recognizing means and judges whether or not the amount of the above remaining operation gives an influence to the next preset operation. When the judging result is that the amount of the remaining operation does not give any influence to the next preset operation, the preset operation is performed without waiting for the remaining time corresponding to the remaining operation.

The third and fourth objects of the present invention can be achieved by a lens controller comprising a varifocal lens constructed such that its focusing position is invariant in an infinite position and is changed in a proximate position so as to move away from the infinite position when the focal distance of an entire zooming optical system is changed from a shortest focal distance to a longest focal distance; focusing drive means for driving a focusing lens group constituting the zooming optical system; zooming drive means for driving a zooming lens group constituting the zooming optical system; means for detecting the position of the focusing lens group on the optical axis thereof; means for detecting the position of the zooming lens group on the optical axis corresponding to the focal distance thereof; focusing correction calculating means for respectively outputs of the zooming lens group position detecting means and the focusing lens group position detecting means after the zooming lens group is driven by the zooming drive means, the focusing correction calculating means calculating a correcting amount with respect to a shift of an image forming position; focusing correction control means for receiving the correcting amount and controlling the focusing drive means so as to move the focusing lens group to the focusing position with respect to the focal distance; focusing drive inhibiting means for inhibiting driving of the focusing lens group in the directions of the infinite and proximate positions respectively when the focusing lens group is located in an inhibiting region on the infinite side formed within a predetermined distance from the infinite position to the proximate position, and when the focusing lens group is located in an inhibiting region on the proximate side formed within a predetermined distance from the proximate position to the infinite position in the case in which the focal distance of the entire zooming optical system is changed; and means for automatically correcting the shift of the image forming position caused by the change in focal distance of the entire zooming optical system when the focusing lens group is not located in the inhibiting regions on the proximate and infinite sides and when the focus driving direction is opposite to the inhibited direction in the inhibiting regions.

In the above lens controller in the second embodiment of the present invention, inhibiting regions are disposed on the infinite and proximate sides. When the focusing lens group is located in the respective inhibiting regions, the focusing drive inhibiting means respectively inhibits the drives towards the infinite and proximate positions of the focusing lens group. Accordingly, when a mechanical stopper is disposed in the infinite and proximate positions, it is possible to prevent the focusing lens group from hitting against this stopper. In other words, it is possible to avoid the useless operations so that the lens drive can be rapidly performed and the drive force can be saved and the operability improved.

When the zooming lens group is driven by the zooming drive means until a predetermined focal distance and the operation of the zooming lens group is then stopped, the focusing correction control means executes the focusing correction by controlling the focusing drive means irrespective of the position of the focusing lens group in the inhibiting regions on the infinite and proximate sides. Thus, the defocusing state of the lens group can be prevented.

The third and fourth objects of the present invention can be also achieved by a lens controller comprising a varifocal lens constructed such that its focusing position is invariant in an infinite position and is changed in a proximate position so as to move away from the infinite position when the focal distance of an entire zooming optical system is changed from the shortest focal distance to the longest focal distance; focusing drive means for driving a focusing lens group constituting the zooming optical system; zooming drive means for driving a zooming lens group constituting the zooming optical system; means for detecting the position of the focusing lens group on the optical axis thereof; means for detecting the position of the zooming lens group on the optical axis corresponding to the focal distance thereof; focusing correction calculating means for respective outputs of the zooming lens group position detecting means and the focusing lens group position detecting means after the zooming lens group is driven by the zooming drive means, the focusing correction calculating means calculating a correcting amount with respect to a shift of an image forming position and outputting a preset maximum correcting amount instead of the correcting amount when the correcting amount is greater than the preset maximum correcting amount; focusing correction control means for receiving the correcting amount or the maximum correcting amount and controlling the operation of the focusing drive means to move the focusing lens group to the focusing position with respect to the focal distance; and means for automatically correcting the shift of the image forming position caused by the change in focal distance of the entire zooming optical system.

When the correcting amount calculated by the focusing correction calculating means is greater than the maximum correcting amount, the focusing correction calculating means outputs the maximum correcting amount instead of this correcting amount. Accordingly, no large malfunction is caused even when the output information of the zooming lens group position detecting means and/or the focusing lens group position detecting means is not correct.

The fifth object of the present invention can be achieved by a lens controller in which a zooming optical system is composed of a focusing lens and a zooming lens disposed on the same optical axis and constitutes a photographing lens, and the focusing lens is moved to perform the focusing operation and the zooming lens is moved to perform the zooming operation for changing the focal distance thereof, the lens controller comprising start inputting means for outputting an operating execution signal during an operating period thereof and operable from the exterior of the lens controller; operation selecting means for outputting any one of a focusing command signal and a zooming command signal for respectively commanding the focusing and zooming operations and operable from the exterior of the lens controller; operating state detecting means for detecting whether the operation of the start inputting means is continued or not, and outputting an inhibit signal while the operation of the start inputting means is continued; output determining means for invalidating the output from the operation selecting means during a period of the reception of the inhibit signal, and validating this output in a period except for this signal receiving period; execution selecting means for receiving the output of the operation selecting means through the output determining means, the execution selecting means outputting a focusing execution signal or a zooming execution signal respectively corresponding to the focusing command signal or the zooming command signal during the period of the reception of the operation executing signal; focusing drive means for receiving the focusing execution signal and driving the focusing lens; and zooming drive means for receiving the zooming execution signal and driving the zooming lens.

In the lens controller constructed above, while the start inputting means is operated to start both the focusing and zooming operations, the operating state detecting means, the output determining means and the execution selecting means invalidate the selecting operation of the operation selecting means for commanding the focusing and zooming operations. Accordingly, even when the operation selecting means is operated in error during the execution of the focusing or zooming operation and the operating state of the operating selecting means is changed, the focusing or zooming operation is not influenced by this error in operation and is continued until the operation of the start inputting means is released, thereby greatly improving the operability.

The fifth object of the present invention can be also achieved by a lens controller in which a zooming optical system is composed of a focusing lens and a zooming lens disposed on the same optical axis and constitutes a photographing lens, and the focusing lens is moved to perform the focusing operation and the zooming lens is moved to perform the zooming operation for changing the focal distance thereof, the zooming optical system being set to a normal macro mode for performing the focusing operation in a macro state for enabling the macro photographing, or a zooming macro mode for performing the focusing adjustment by the zooming operation, the lens controller comprising macro state detecting means for detecting that the zooming optical system is in the macro state and outputting a macro state signal; start inputting means for outputting an operating execution signal during an operating period thereof and operable from the exterior of the lens controller; operation selecting means for outputting any one of a focusing command signal and a zooming command signal for commanding the focusing and zooming operations and operable from the exterior of the lens controller; output determining means for invalidating the output from the operation selecting means during the period of the reception of the macro state signal; execution selecting means for outputting a focusing execution signal when the zooming optical system is set to the normal macro mode corresponding to the period of the reception of the operating execution signal, and a zooming execution signal when the zooming optical system is set to the zooming macro mode; focusing drive means for receiving the focusing execution signal and driving the focusing lens; and zooming drive means for receiving the zooming execution signal and driving the zooming lens.

In the lens controller constructed above, when the zooming optical system is in the macro state for enabling a macro photographing, the macro state detecting means, the output determining means and the execution selecting means start the above focusing operation at any time by the operation of the start inputting means irrespective of the content of the operating commands of the operation selecting means operable from the exterior of the lens controller and giving commands on the focusing or zooming operation. Accordingly, a malfunction caused by an error in operation of the operation selecting means can be reliably prevented and it is possible to rapidly perform operations to be performed at a suitable time.

The fifth object of the present invention can be also achieved by a lens controller in which a zooming optical system is composed of a focusing lens and a zooming lens disposed on the same optical axis and constitutes a photographing lens, and the focusing lens is moved to perform the focusing operation and the zooming lens is moved to perform the zooming operation for changing the focal distance thereof, the lens controller comprising focusing mode selecting means for selecting an auto focusing mode for automatically performing the focusing adjustment and a manual focusing mode for manually performing the focusing adjustment and operable from the exterior of the lens controller; auto focusing control means for measuring the distance of a photographed object and outputting a focusing drive signal for driving the focusing lens corresponding to the measured distance of the photographed object; start inputting means for outputting an operating execution signal during an operating period thereof and operable from the exterior of the lens controller; operation selecting means for outputting any one of a focusing command signal and a zooming command signal for respectively commanding the focusing and zooming operations and operable from the exterior of the lens controller; output determining means for invalidating the output from the operation selecting means during a period in which the focusing mode selecting means is set to the auto focusing mode; execution selecting means for outputting a zooming execution signal during the period of the reception of the operating execution signal; focusing drive means for receiving the focusing execution signal and driving the focusing lens; and zooming drive means for receiving the zooming execution signal and driving the zooming lens.

In the lens controller constructed above, when the focusing mode selecting means is set to the auto focusing mode, the output determining means and the execution selecting means start the zooming operation at any time by the operation of the start inputting means irrespective of the output content of the operation selecting means. Accordingly, a malfunction caused by an error in operation of the operation selecting means can be reliably prevented and it is possible to rapidly perform operations to be performed at a suitable time.

Further objects and advantages of the present invention will be apparent from the following description of the preferred embodiments of the present invention as illustrated in the accompanying drawings.

BRIEF DESCRIPTION OF THE DRAWINGS

FIGS. 1 to 11 show a lens controller in accordance with a first embodiment of the present invention in which:

FIG. 1(11) is a block diagram showing the entire construction of the lens controller;

FIG. 2 is a graph showing the operating characteristics of the lens controller of the present invention and showing, every distance of the photographed object, the relation between the focal distance f of the entire zooming optical system to be set and the drawing-out amount Sx of the focusing lens group corresponding to the distance D of the photographed object;

FIG. 3 is a graph for explaining a calculating principle of the focusing correction calculating section as a main section of the present invention by omitting a portion of the relation of FIG. 2;

FIG. 4 is a graph showing the control operation of the zooming speed by an interruption;

FIGS. 5 and 6 are graphs for explaining the operation of the lens controller in the first embodiment shown in FIG. 1; and FIGS. 7 to 11 are flow charts showing the operational sequences of the lens controller in the first embodiment of the present invention in which FIG. 7 shows the zooming operation in a main routine of the flow charts, FIGS. 8 and 9 respectively show the zooming and shifting operations used in this main routine, FIG. 10 shows the focusing drive operation, and FIG. 11 shows the control operation of the zooming speed by the interruption; and FIGS. 12 to 21 show the lens controller in accordance with a second embodiment of the present invention in which:

FIG. 12(11) is a block diagram showing the entire construction of the lens controller in the second embodiment of the present invention;

FIGS. 13 and 14 are views for explaining the operation of the lens controller on the side of the proximity position in which FIG. 13 is a graph for explaining the operation for reducing the magnification, and FIG. 14 is a graph for explaining the operation for increasing the magnification;

FIGS. 15 to 17 are views for explaining the operation of the lens controller on the side of the infinite position in which FIG. 15 is a graph for explaining the operation of the lens controller on the side of the infinite position, FIG. 16 is a graph for explaining the operation for reducing the magnification, and FIG. 17 is a graph for explaining the operation for increasing the magnification;

FIGS. 18 to 21 are flow charts showing the operational sequences of the lens controller in the second embodiment shown in FIG. 12 in which FIGS. 18 and 19 show main routines of the flow charts and FIGS. 20 and 21 show subroutines "inhibiting judgment" and "correcting judgment" used in these main routines; and FIGS. 22 to 25 show the lens controller in a third embodiment of the present invention in which:

FIG. 22(11) shows a block diagram showing the entire construction of the lens controller in the third embodiment of the present invention; and FIGS. 23 to 25 are flow charts showing the operational sequences of the lens controller in the third embodiment shown in FIG. 22 in which FIG. 23 shows a focusing/zooming operation, FIG. 24 shows a macro setting operation and FIG. 25 shows an auto focus setting operation.

DESCRIPTION OF THE PREFERRED EMBODIMENTS

Figure 1:
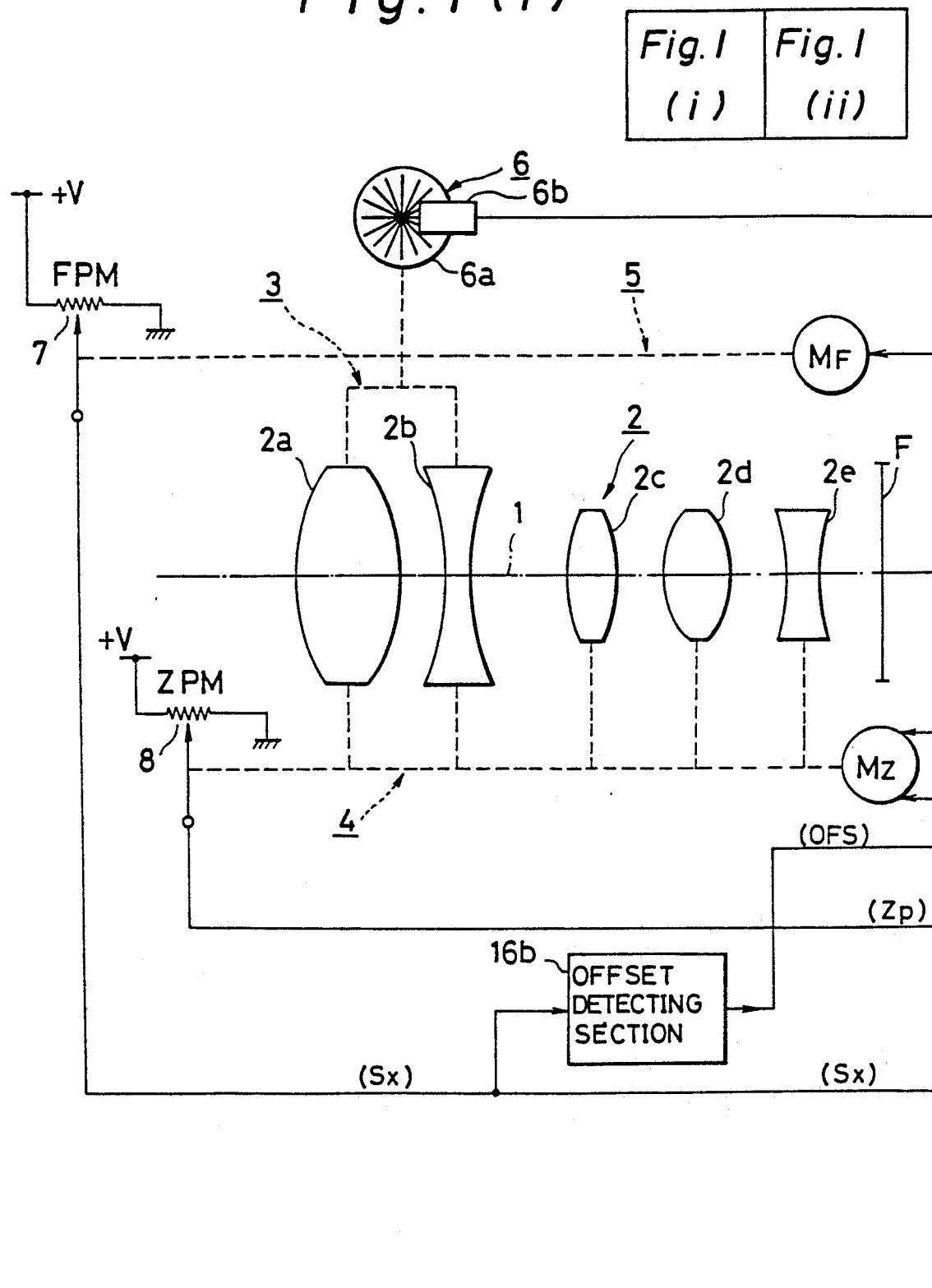

The preferred embodiments of a lens controller in accordance with the present invention will now be described in detail with reference to the accompanying drawings.

First, the principle of the lens controller of the present invention is described before the detailed description thereof.

In general, a zooming lens is defined by a lens which does not move with respect to the focal position by the zooming operation (the change in focal distance f of the entire zooming optical system). However, in the present invention, the change in focal position of the zooming lens is allowed and this construction is a starting point of the present invention. In the present invention, the movement of this focal position is finally corrected to provide a suitable focusing state as described later. In the following description, it is assumed that a front focusing system is used with respect to the lens controller of the present invention.

When the change in angle of view by the zooming operation is visually recognized, it is natural that the angle of view is linearly changed in accordance with the rotation of a motor when a so-called power zoom is especially used to perform the zooming operation by driving the motor, etc. This change in angle of view is approximately proportional to an inverse number 1/f of the focal distance f of the entire zooming optical system. Accordingly, the view of angle is naturally changed if the rotation of the motor is changed in proportion to the focal distance f of the entire zooming optical system. In the following description, it is assumed to dispose a means for detecting this focal distance f and a focal distance information Zp outputted from this detecting means is constructed to be changed in proportion to the rotation of the above motor. In this case, when $C_{p0}$ and $C_{p1}$ are setting constant numbers set at the designing time, the relation between the focal distance f of the entire zooming optical system and the focal distance information Zp for providing a natural change in view of angle can be represented by the following formula (1).

$$1/f = C_{p0} \cdot Zp + C_{p1} \quad (1)$$

In this case, the change in focal distance $f_H$ of the focusing lens group F is allowed, thereby reducing the unnecessary moving amount of the focusing lens group on the wide angle side caused by the equivalent amount movement in the conventional zooming lens. The relation between the focal distance $f_H$ of the focusing lens group and the focal distance f of the entire zooming optical system for reducing the outer diameter of the lens is thus considered to be provided by the following formula (2).

$$f_H{}^2 = C_{H0} f \quad (2)$$

where $C_{H0}$ is a setting constant number as mentioned above.

By multiplying both sides of the formula (2) by $1/f^2$ and substituting the formula (1) onto the right side of this multiplied formula, the following formula (3) is provided.

$$(f_H/f)^2 = C_{H0}(C_{p0} \cdot Zp + C_{p1}) \quad (3)$$

When a defocusing amount on a film face as a calculating result of the auto focusing operation is $\delta$ and $C_{10}$ and $C_{11}$ are new setting constant numbers, the moving amount $\Delta$ of the focusing lens group until the focusing position can be calculated by the following formula (4).

$$\Delta = (C_{10} Z_p + C_{11}) \delta \quad (4)$$

We next consider how to calculate the distance of a photographed object.

A focusing position information Sx is assumed to be outputted in proportion to the position (moving amount) of the focusing lens group in the direction of the optical axis. In this case, when $C_{30}$ is a setting constant number, the following formula (5) is provided.

$$Sx = C_{30} \Delta \quad (5)$$

Accordingly, when $C_{40}$, $C_{41}$ and $C_{42}$ are new setting constant numbers, the following formula (6) is provided.

$$d_1 = (C_{40} Zp + C_{41}) Sx + C_{42} \quad (6)$$

By this formula, the distance $d_1$ of the photographed object can be calculated.

The formula (6) can be rewritten by the following formula (7) to simplify the notation.

$$D = (C_0 Zp + C_1) Sx + C_2 \quad (7)$$

In this formula, D is the distance of the photographed object and is $d_1$, and $C_0$, $C_1$ and $C_2$ are setting constant numbers set at the designing time and are respectively equal to $C_{40}$, $C_{41}$ and $C_{42}$. Namely, in the formula (7), if a means for controlling Zp and Sx so as not to change the distance D of the photographed object is realized, it is possible to perform no focusing movement (or correction) of the lens group by the zooming operation. In this case, the moving amount of the focusing lens group is not the above-mentioned equivalent amount movement. In other words, in this case, there is no condition of the equivalent amount movement.

The operation of the lens controller in the first embodiment of the present invention will next be described.

FIG. 1 is a block diagram showing the entire construction of the lens controller of the present invention. In this figure, a zooming lens group 2 is movably disposed on an optical axis 1 of a zooming optical system therealong and constitutes the zooming optical system. First, second, third, fourth and fifth lens groups 2a, 2b, 2c, 2d and 2e are respectively composed of single or plural lenses. The first lens group 2a and the second lens group 2b constitute a focusing lens group 3 mentioned above. Accordingly, the focal distance formed by the first lens group 2a and the second lens group 2b is represented by $f_H$. The first to fifth lens groups 2a to 2e constitute the zooming lens group 2 mentioned above. Accordingly, the focal distance of these first to fifth lens groups 2a to 2e is represented by $f_z$. The focal distance of the entire zooming optical system composed of the zooming lens group 2 is represented by f. Reference numeral F designates a film face. A zooming drive section 4 is composed of a zooming motor Mz as a zooming drive means for driving the zooming lens group 2 and an unillustrated mechanical section so as to set the focal distance f of the entire zooming optical system to an arbitrary focal distance from the focal distance on the telescopic side (on which the focal position is simply called "telescopic position" in the following description) as the longest focal distance to the focal distance on the wide angle side (on which the focal position is simply called "wide position" in the following description) as the shortest focal distance. A focusing drive section 5 has a focusing motor $M_F$ as a focusing drive means for moving the first lens group 2a and the second lens group 2b to a focusing position from the infinite position ($\infty$ position) on the optical axis 1 to a proximate position corresponding to the distance of the photographed object from the infinite position to the proximate position. Namely, this focusing drive means moves the first lens group 2a and the second lens group 2b in the optical axis direction in a state in which the distance therebetween is constantly held. The focusing drive section 5 further has an unillustrated mechanical section for the focusing motor $M_F$. A focusing counter 6 and a position detector (which is called FPM in the following description) 7 for detecting the position of the focusing lens group are driven by the focusing drive section 5 as well as the first lens group 2a and the second lens group 2b. The focus counter 6 generates a counting pulse (Dfc) proportional to the number of rotations of a slit disk 6a by the rotation thereof from a photo-interrupter 6b and detects the moving amount of the first lens group 2a and the second lens group 2b on the optical axis 1. The FPM 7 constructs a focusing lens group position detecting means for outputting a voltage proportional to the positions of the first lens group 2a and the second lens group 2b on the optical axis as the focusing position information Sx mentioned above. A position detector (which is called ZPM in the following description) 8 for detecting the position of the zooming lens group is driven by the zooming drive section 4 as well as the zooming lens group 2. The ZPM 8 outputs a voltage proportional to the focal distance f of the entire zooming optical system as the focal distance information Zp mentioned above and constitutes a zooming lens group position detecting means.

A maximum drawing-out amount calculating section 9 performs an A/D conversion with respect to the inputted focal distance information Zp, and calculates the moving amount (i.e., the drawing-out amount) $F_{px}$ of the first lens group 2a and the second lens group 2b from the infinite position to the proximate position with respect to this Zp. A proportional constant number calculating section 10 receives the output $F_{px}$ of this maximum drawing-out amount calculating section 9 and the output Sx as focusing position information of the FPM 7 and performs the A/D conversion with respect to the output Sx. The proportional constant number calculating section 10 then calculates a ratio of the output $F_{px}$ and the converted output Sx and outputs a proportional constant number Cfp. A focusing correction calculating section 11 receives the above three outputs $F_{px}$, Cfp and Sx and constructs a portion of a focusing correction control means for calculating a correcting amount Dfp and a focusing direction FDR to perform the focusing operation. A reference amount control section 11b receives the above focusing position information (Sx) and functions as a reference amount control means for outputting a reference amount (DFO) on the basis of a calculating formula described later. A focusing control section 12 receives the output Dfc of the focusing counter 6, the correction amount Dfp from the focusing correction calculating section 11, the reference amount (DFO) and an execution signal (GO), and constructs a portion of a focusing correction control means for controlling the operation of the focusing drive section 5.

An operation recognizing section 12a is operated as a remaining operation recognizing means for recognizing an overrunning amount of the focusing motor $M_F$ and the zooming motor Mz in a remaining operation after commands for stopping the operation of the focusing motor $M_F$ and the zooming motor Mz are given (after the braking operation). A continuation judging section 12b as an influence judging means receives a recognizing signal (K) from this operation recognizing section 12a and judges whether or not the above overrunning amount gives an influence on the next preset operation. When the overrunning amount does not give any influence on the next preset operation, the continuation judging section 12b outputs a continuing signal (GO).

Starting means 13 to 15 are constructed by zooming switches 13, 14 composed of push-button switches which can be externally operated to start the zooming operation, and a driving direction judging section 15. The switch 13 is constructed by a switch for increasing the magnification (which is simply called an up-switch in the following description). The switch 14 is constructed by a switch for decreasing the magnification (which is simply called a down-switch in the following description). The driving direction judging section 15 receives outputs of these switches 13 and 14 and determines the rotary direction of the zooming motor Mz and thereafter outputs a start signal (STR).

A zooming control section 16 as a zooming speed control means receives this start signal (STR), the above continuing signal (GO), a back electromotive voltage (Vr), and an offset signal (OFS) and outputs a pulse voltage (PP) to control the operation of the zooming drive section 4. A speed detecting resistor 16a is disposed to detect the back electromotive voltage (Vr) approximately proportional to the number of rotations of the zooming motor Mz driven by the above pulse voltage (PP). An offset detecting section 16b receives the above focusing position information (Sx) and outputs an offset signal (OFS) based on a calculating formula described later. The focusing control section 12 and the zooming control section 16 have a brake timer and the zooming control section 16 has an interrupting timer and a zooming lock flag although these constructions are not shown in FIG. 1.

In FIG. 1, an electric power source is designated by +V and the inputting and outputting relations of the respective constructional portions are shown by only main signals.

FIG. 2 is a graph showing the operating characteristics of the lens controller in the first embodiment of the present invention shown in FIG. 1. This figure shows the focal distance f of the entire zooming optical system to be set and the drawing-out amount (moving amount) corresponding to the distance D of the photographed object with respect to the focusing lens group 3 (the first lens group 2a and the second lens group 2b) every distance D of each typical photographed object. The axis of ordinate shows the change in focal distance f of the entire zooming optical system and the axis of abscissa shows the drawing-out amount of the focusing lens group 3 with the focusing position with respect to the infinity as a reference. In this example, the telescopic position is shown by f=135 mm and the wide position is shown by f=35 mm.

In FIG. 2, focusing curves 17 to 22 show the change in drawing-out amount of the focusing lens group 3 from the infinite position to the focusing position with respect to the change in focal distance information Zp when the distance D of the photographed object on the left side of the above-mentioned formula (7) is ∞, 6.0 m, 3.0 m, 2.0 m, 1.5 m, and 1.2 m, respectively. Accordingly, the focusing curve 22 is a focusing curve in the proximate position providing a maximum drawing-out amount and is set to Fpx. Namely, when the distance D of the photographed object in the proximate position is $D_0$ and Sx=Fpx, the formula (7) is represented by the following formula (8).

$$Fpx = \frac{D_0 - C_2}{C_0 \cdot Zp + C_1} \quad (8)$$

By separating the constant number in the formula (8), the following formula (9) is provided.

$$Fpx = \frac{C_{22}(D_0)}{Zp + C_{11}} + C_{33}(D_0) \quad (9)$$

In the formula (9), when $C_{11}=C_1$, $C_{22}(D_0)=C_2$, and $C_{33}(D_0)=C_3$, the following formula (10) is obtained.

$$Fpx = \frac{C_2}{Zp + C_1} + C_3 \quad (10)$$

Figure 3:
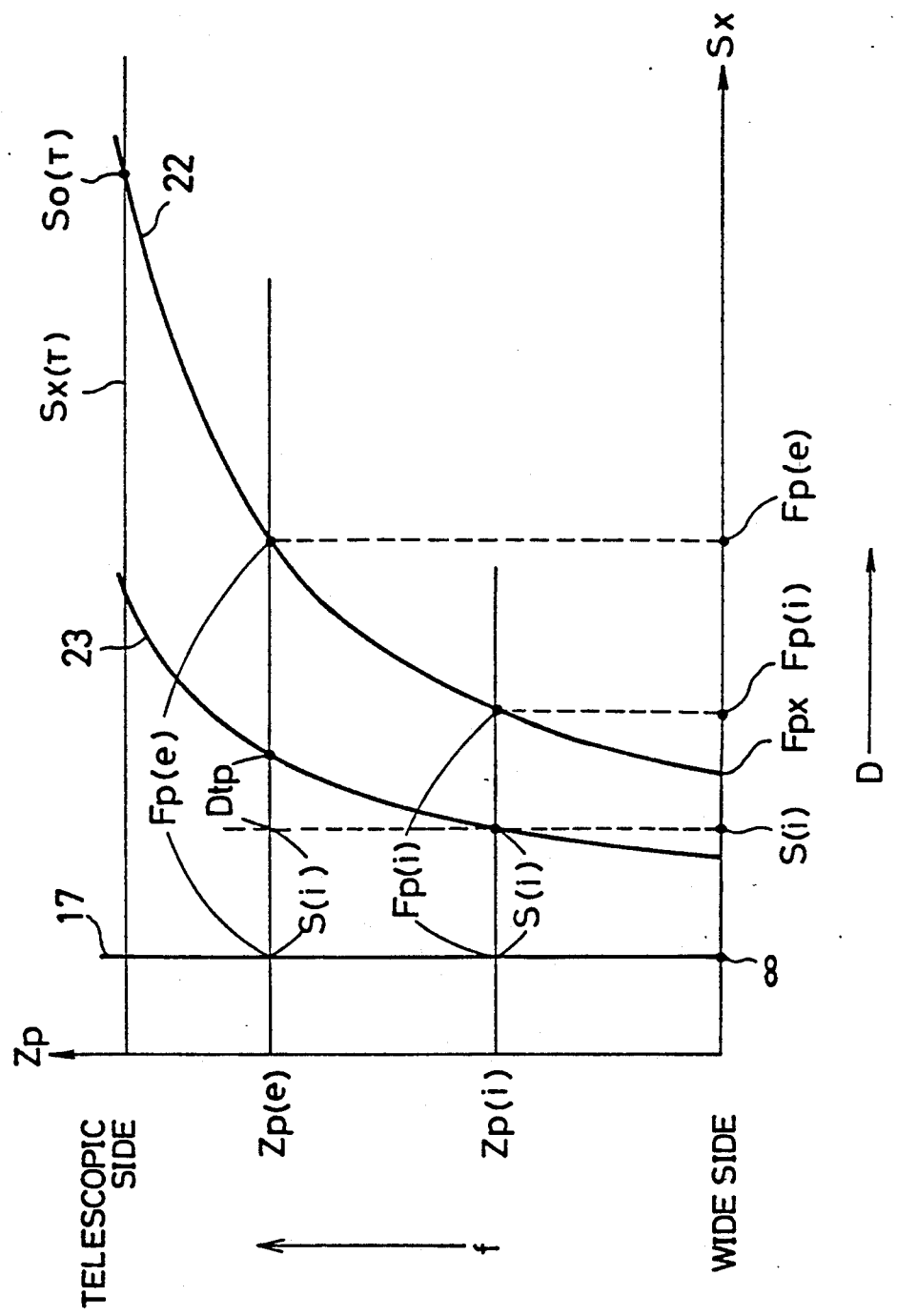

FIG. 3 is a graph for explaining the operations of the respective constructional and calculating sections in FIG. 1 by omitting a portion of the focusing curves of FIG. 2.

In FIG. 3, Zp(i), S(i) and Fp(i) respectively show the moving amount (the maximum drawing-out amount) from the focusing curve 17 in the infinite position to the focusing curve 22 in the proximate position with respect to the focal distance information (a first focal distance information) Zp just before the zooming operation, the focusing position information Sx, and the above Zp(i). The Z(p), Fp(e) and Dfp respectively show the focal distance information (a second focal distance information) until a predetermined time has passed since the operation of the zooming drive section 4 starts, the moving amount from the focusing curve 17 to the focusing curve 22 with respect to the above Zp(e), and a correcting amount to be corrected in the focusing movement. Namely, when the proportional constant number Cfp just before the zooming operation is given by the following formula (11), the focusing curve in the proximate position is provided by the following formula (12).

$$Cfp = \frac{S(i)}{Fp(i)} \quad (11)$$

$$Fp(i) = \frac{D_0 - C_2}{C_0 \cdot Zp(i) + C_1} \quad (12)$$

$$Cfp' = \frac{S(i) + Dfp}{Fp(e)} \quad (13)$$

$$Fp(e) = \frac{D_0 - C_2}{C_0 \cdot Zp(e) + C_1} \quad (14)$$

$$Dfp = Cfp\left(\frac{D_0 - C_2}{C_0 \cdot Zp(e) + C_1}\right) - S(i) \quad (15)$$

In the above formula (13), Cfp' is a proportional constant number after the predetermined time has passed.

No focusing movement is caused if Cfp=Cfp' is formed. To form this formula, the formula (13) must be formed. The focusing curve 22 at this time is provided by the formula (14). Accordingly, when the left side of the formula (13) is replaced by Cfp and the formula (14) is substituted into the denominator on the right side of the formula (13), the above formula (15) is obtained. The formula (15) is changed to the following formula (16) by deforming the formula (14) in a sequential order of (8), (9) and (10) as mentioned above.

$$Dfp = Cfp\left(\frac{C_2}{Zp(e) + C_1} + C_3\right) - S(i) \quad (16)$$

The Sx(T) designates the focusing position information Sx when the focal distance information Zp is provided in the position on the telescopic side. The $S_O$(T) designates the focusing position information Sx, i.e., an intersection point between Sx(T) and Fpx when the above Sx(T) is provided on the focusing curve 22 in the proximate position. The focusing curve 23 designates a curve drawn as mentioned above when the distance of the photographed object is arbitrary.

An operation expression provided by the offset detecting section 16b in FIG. 1 is shown by the formula (17), and an operation expression provided by the reference amount control section 11b is shown by the formula (18). These operation expressions are represented by functions of the focusing position information Sx as follows.

$$Vos = \frac{Sx}{C_4} + C_5 \quad (17)$$

$$DF0 = \frac{Sx}{C_6} + C_7 \quad (18)$$

In the above formulas (17) and (18), $C_4$, $C_5$, $C_6$ and $C_7$ are setting constant numbers provided as mentioned above.

Figure 4:
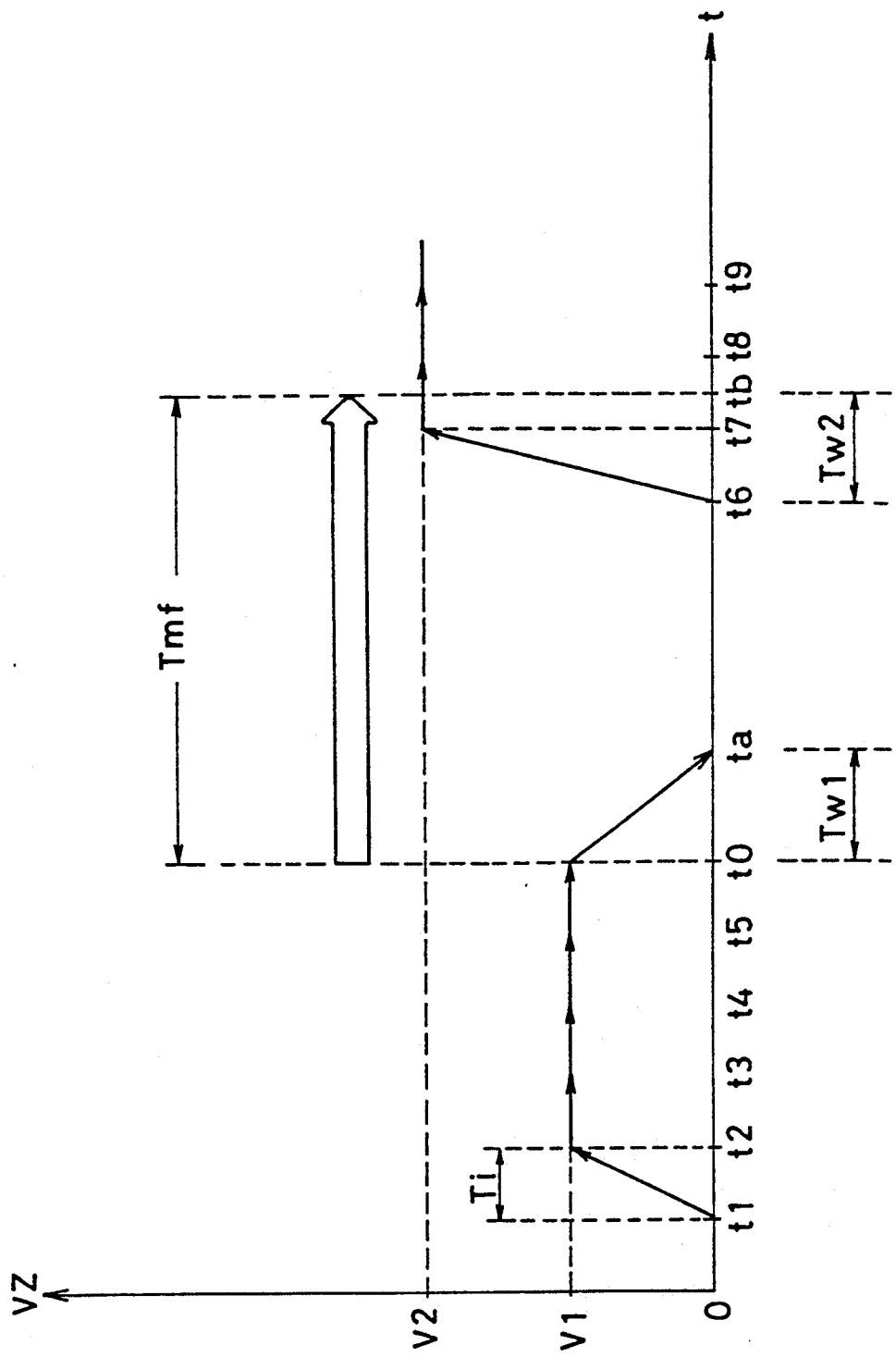

FIG. 4 is a timing chart for explaining an interrupting operation for the speed control of the zooming motor Mz. In this figure, the axis of ordinate shows the rotary speed VZ of the zooming motor Mz, and the axis of abscissa shows time t.

In FIG. 4, reference numeral Ti designates an interrupting period in which the interrupting operation is started, t1 to t9 represent time points at which the interrupting operation is started, Tw1 and Tw2 designate overrunning time of the zooming motor Mz and the focusing motor $M_F$, and reference numeral Tmf designates an operating period of the focusing motor $M_F$.

Figure 5:
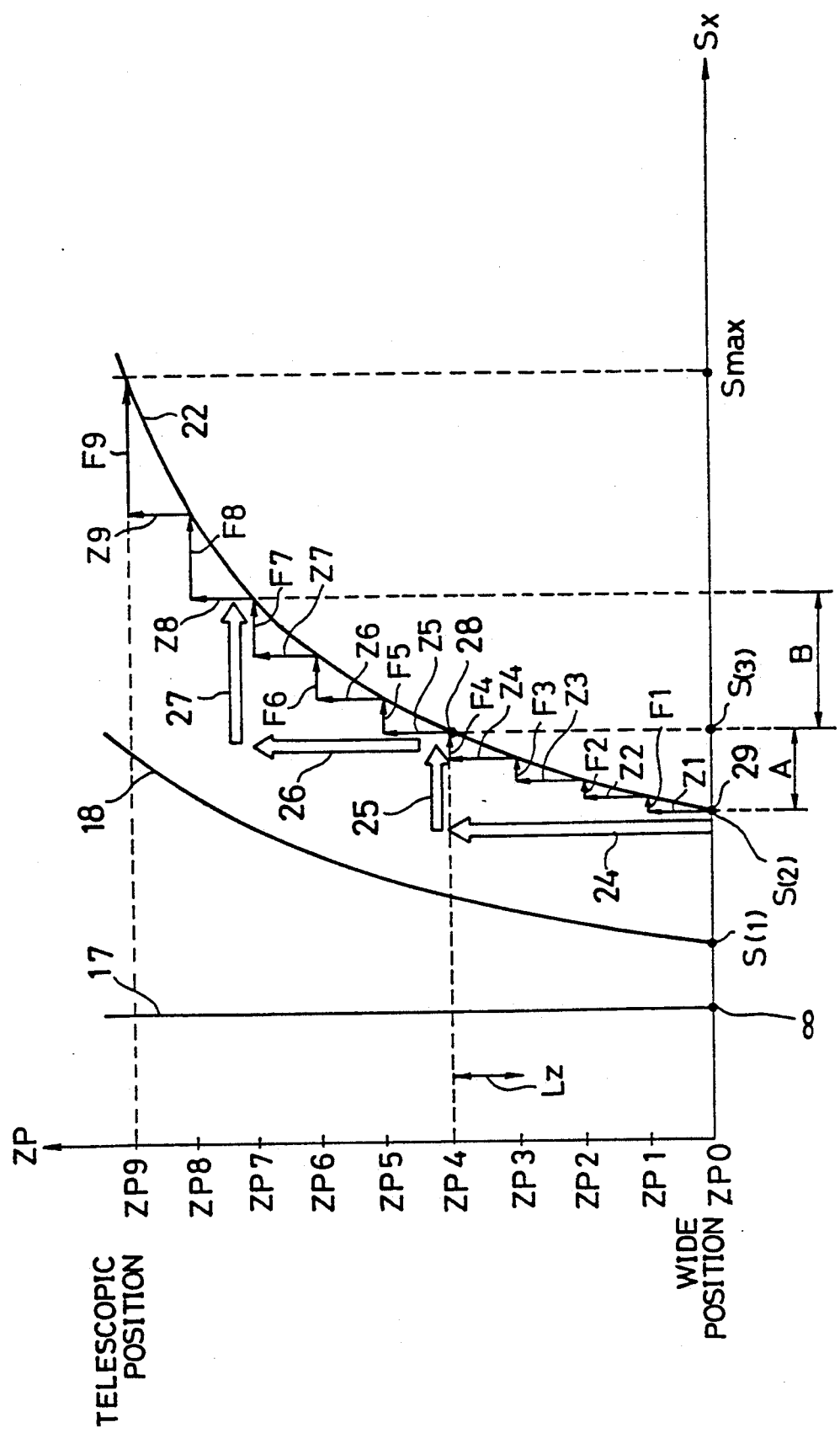
Figure 6:
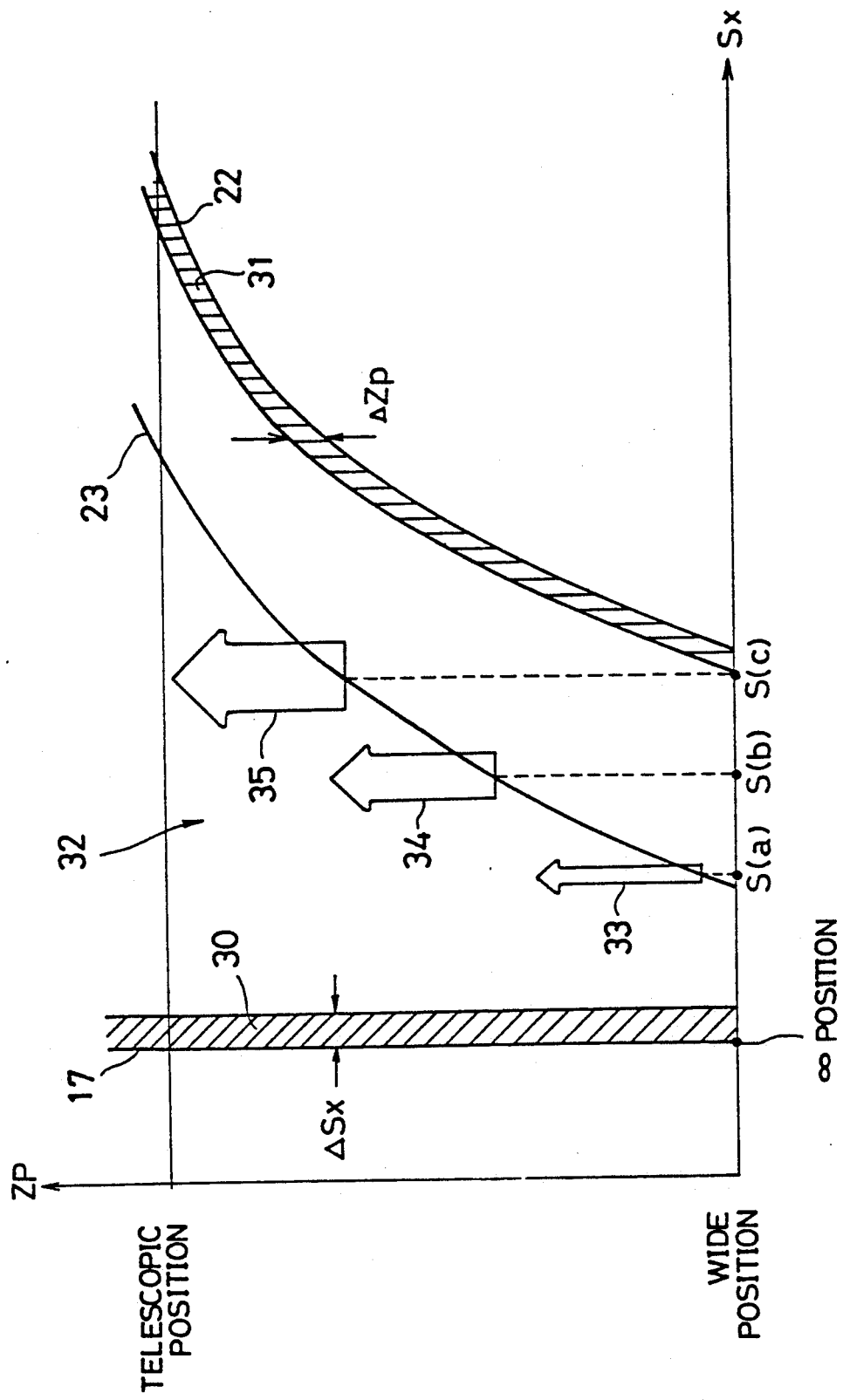

FIGS. 5 and 6 are graphs for explaining the operation of main portions of the lens controller and omitting a portion of the focusing curves of FIG. 2. FIG. 5 also shows the conventional operation for comparison.

In FIG. 5, reference numerals 24 and 26 designate wide arrows showing the direction and amount of the zooming operation, 25 and 27 wide arrows showing the direction and amount of the focusing or shifting operation, and reference numerals 28 and 29 designate points on the focusing curve 22. The point 28 is an intersection point provided by Zp=Zp4, and the point 29 is an intersection point provided by Zp=Zp0. Reference numeral Smax designates a maximum value of the focusing position information Sx, and the focusing position information Sx in the $\infty$ position shows 0 or a minimum value thereof. Reference numerals S(1), S(2) and S(3) respectively show the focusing position information Sx in the wide position, i.e., in the case of Zp=Zp0. The S(1) corresponds to an intersection point provided by the focusing curve 18. The S(2) corresponds to an intersection point provided by the focusing curve 22 and is located in the same position as that of the point 29. The S(3) corresponds to the point 28.

With respect to the conventional operation of the lens controller, the Zp1 to Zp9 on the axis of ordinate respectively show zoom operating states while the focusing operation is performed with respect to the focal distance information Zp every predetermined distance Lz. The Z1 to Z9 designate arrows showing the direction and amount of the zooming operation. The F1 to F9 designate arrows showing the direction and amount of the focusing operation. The Zp=Zp0 corresponds to the wide position and the Zp=Zp9 corresponds to the telescopic position.

In FIG. 6, a dangerous band 30 on the side of the infinite position is set on the side of the proximate position from the focusing curve 17 and has a width shown by a small distance $\Delta Sx$. A dangerous band 31 on the side of the proximate position is formed by the focusing curve 22 and a curve displaced in parallel by a small distance $\Delta Zp$ onto the side of the longer focal distance (on the upward side in this figure) with respect to the focusing curve 22. Reference numeral 32 designates a safe region except for these dangerous bands 30 and 31. Reference numerals 33 to 35 designate arrows showing the zooming direction and the zooming speed and the size of each of these arrows shows the zooming speed. The S(a), S(b) and S(c) designate the focusing position information Sx shown by the above arrows 33 to 35, respectively.

Figure 7:
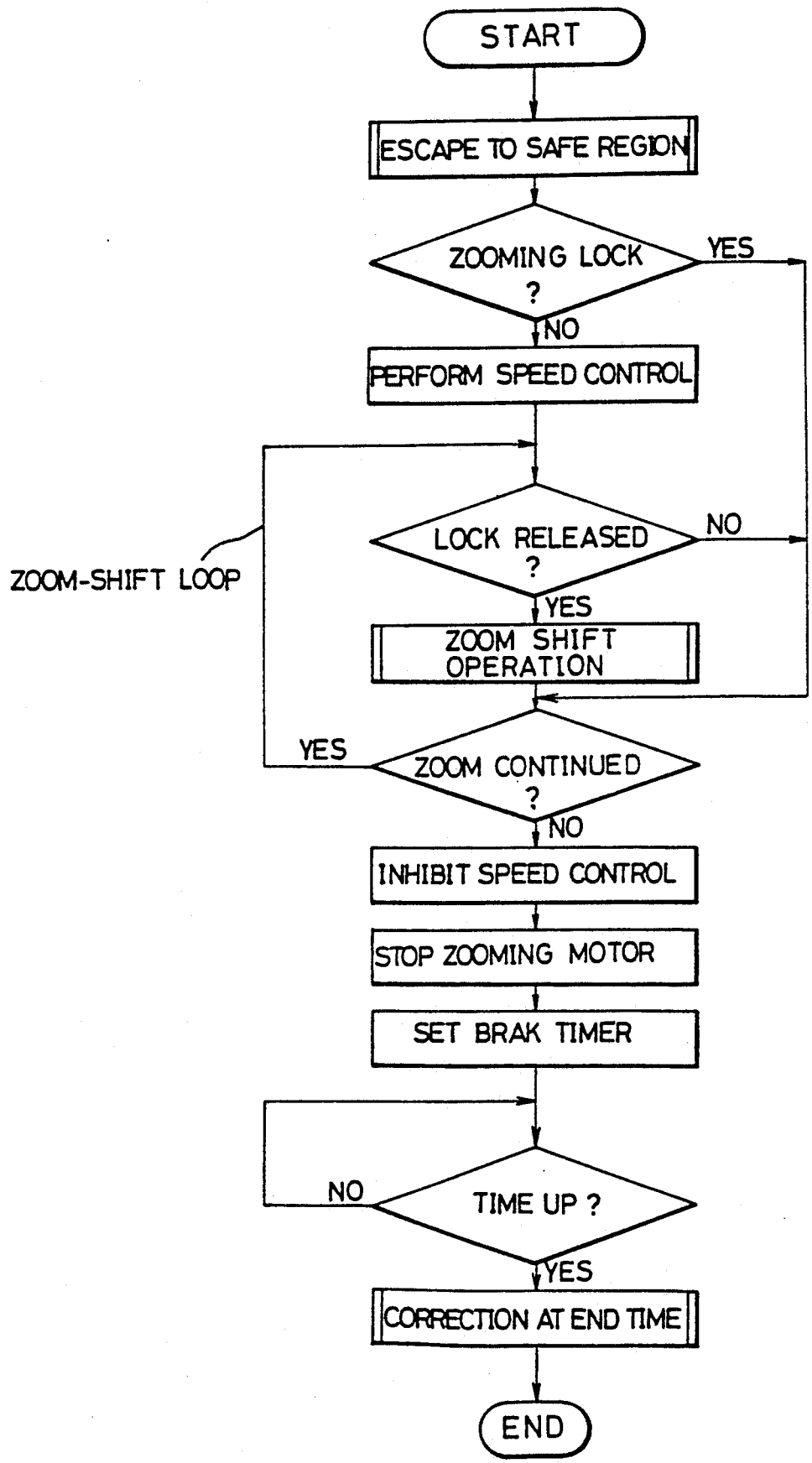
Figure 8:
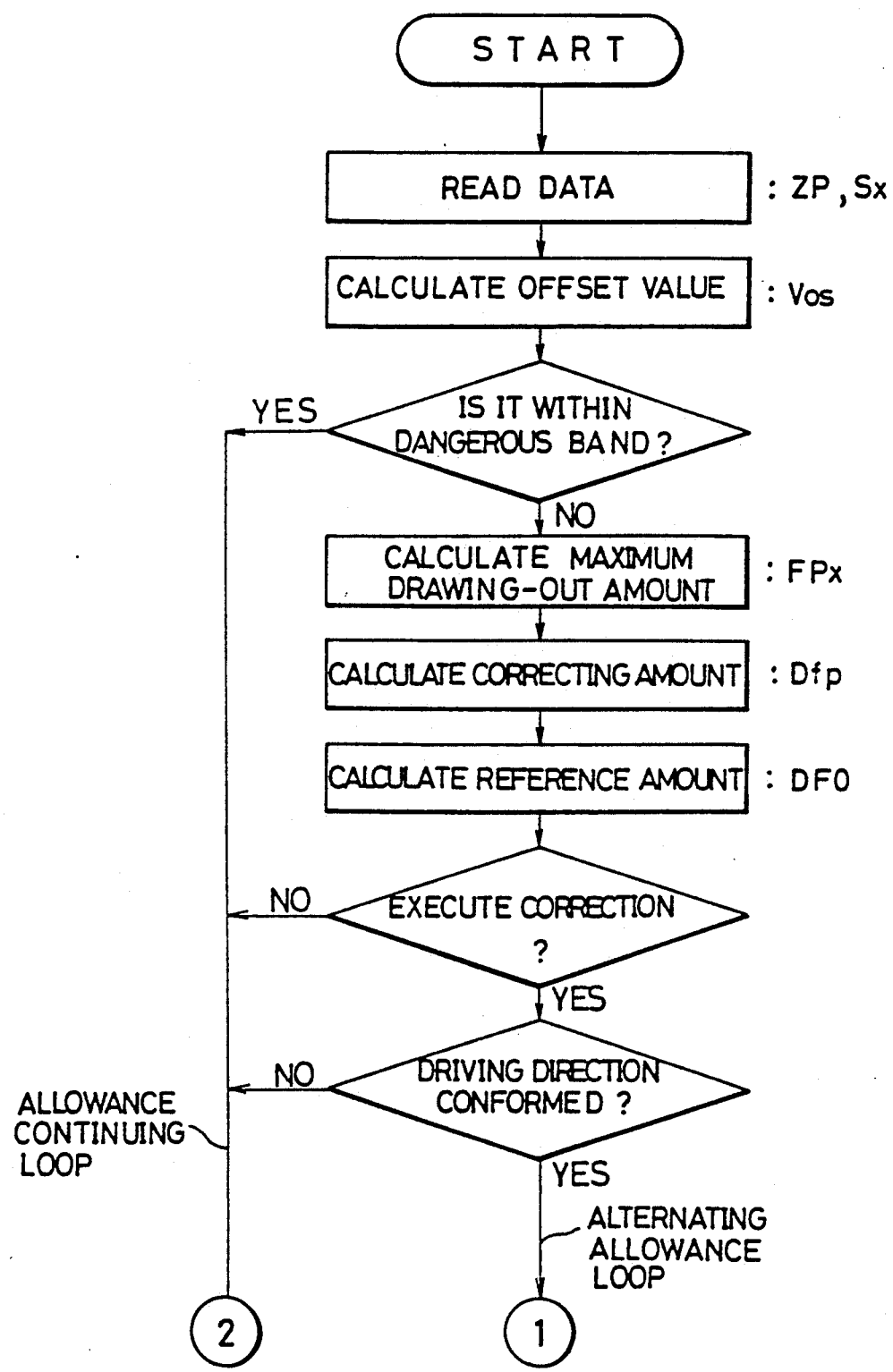
Figure 9:
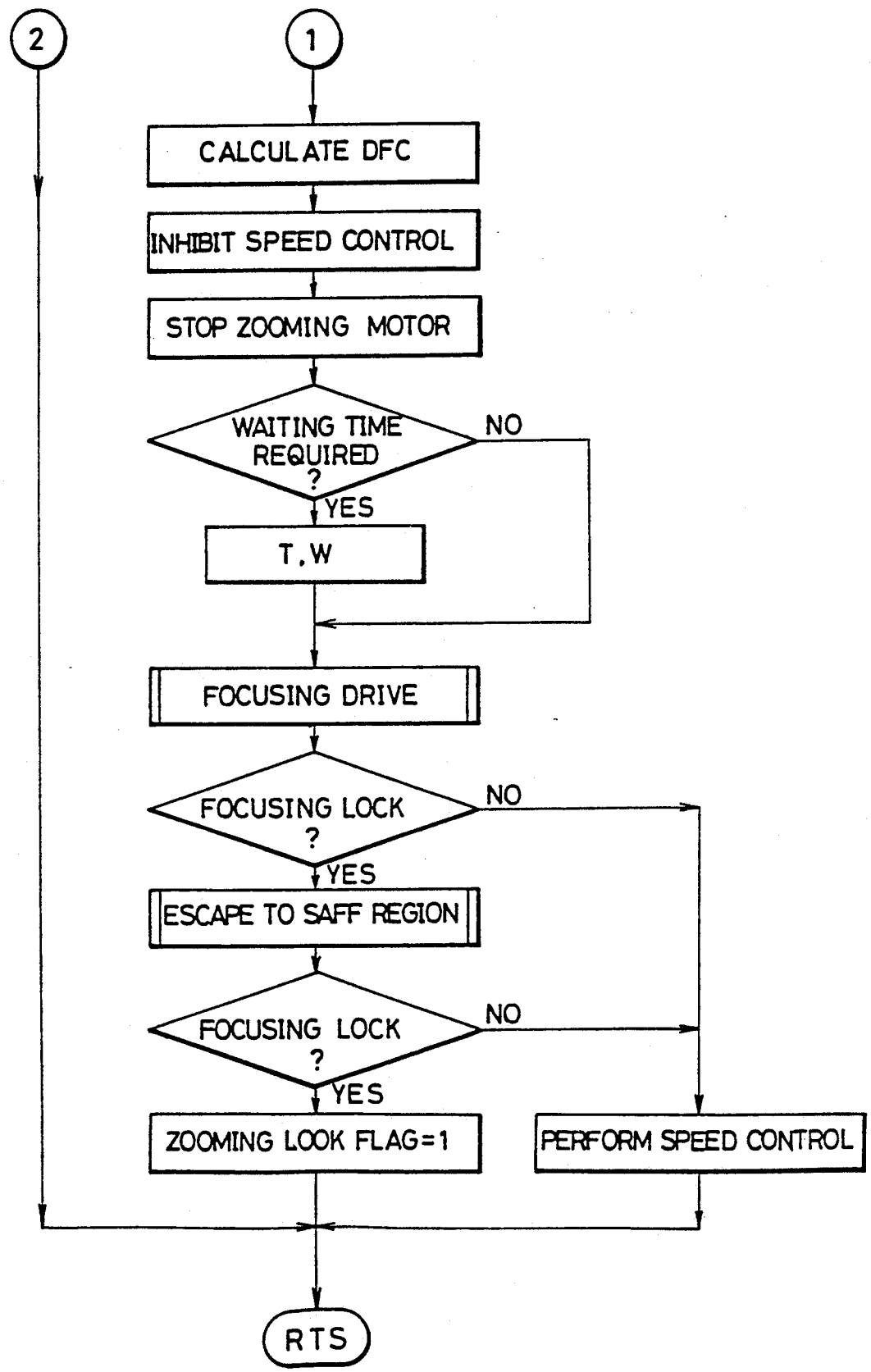
Figure 10:
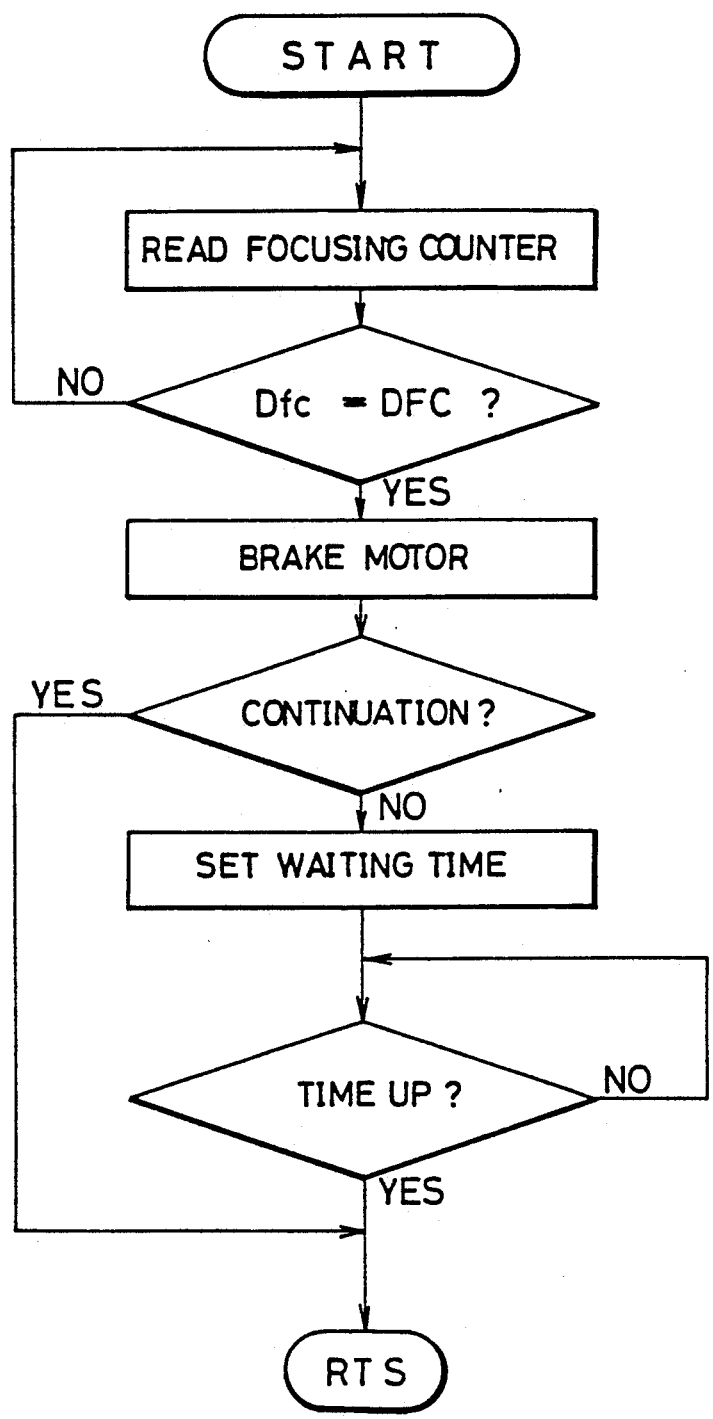
Figure 11:
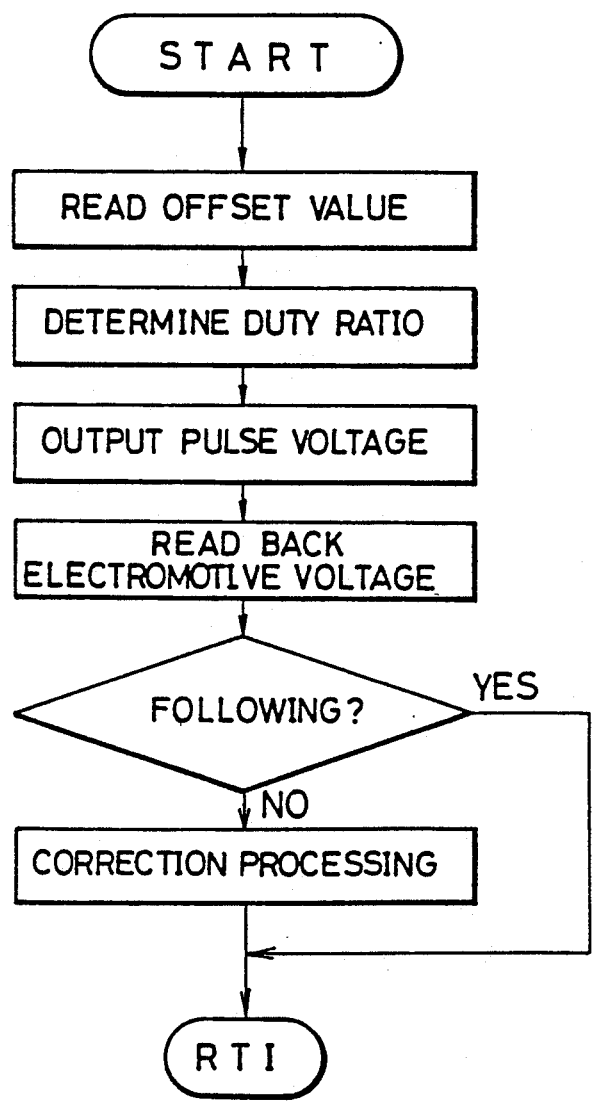

FIGS. 7 to 11 are flow charts showing the operational sequences of the lens controller in the first embodiment of the present invention shown in FIG. 1. FIG. 7 shows the zooming operation of the lens controller in a main routine. FIGS. 8 and 9 show the zooming and shifting operations performed in the above main routine. FIG. 10 shows the focusing drive operation and FIG. 11 shows the operation for controlling the zooming speed. The zooming speed control operation in FIG. 11 is the interrupting operation started every predetermined interrupting period as described later.

The operation of the above-mentioned lens controller in the first embodiment shown in FIG. 1 will next be described in detail with reference to these flow charts. The operation for increasing the magnification by performing the zooming operation from the wide side to the telescopic side is first described.

When the up-switch 13 is operated, the driving direction judging section 15 outputs the start signal (STR) indicating the magnification increasing direction. At this time point, the flow chart in FIG. 7 starts from a step START. In a first step "escape to safe region", the maximum drawing-out amount calculating section 9 and the proportional constant number calculating section 10 respectively read the focusing position information (Sx) and the focal distance information (Zp), and perform the A/D conversion with respect to this information. Then, the converted information is processed in accordance with the above formula (16). It is then judged whether or not the focusing lens group 3 is located within the dangerous band 31 shown in FIG. 6. When the focusing lens group 3 is located within the dangerous band 31, the focusing lens group 3 is moved onto the side of the infinite position by a step "focusing drive" described later, thereby escaping from the dangerous band 31 to the safe region 32.

In the next conditional step "zooming lock ?", the zooming lock flag is checked. In the present case, this flag shows a reset state so that the judging result is NO. In the next conditional step "perform speed control", the zooming control section 16 receives an interrupting signal from an unillustrated interrupting timer. In the next step "lock released ?", the above zooming lock flag is checked and is similarly in the reset state so that the judging result is YES. In the next step "zoom-shift operation", the zooming and shifting operations are thereby performed. Then, it returns to the flow chart in FIG. 8 and this flow chart starts from a step START.

At this time, the operation recognizing section 12a informs that the zooming and shifting operations are started by the recognizing signal (K). The continuation judging section 12b receiving this, recognizing signal outputs the continuing signal (GO) since the repeating operation begins to be performed.

In a first step "read data" in FIG. 8, the offset detecting section 16b, the proportional constant number calculating section 10 and the maximum drawing-out amount calculating section 9 receive the focusing position information (Sx) and the focal distance information (Zp), and respectively perform the A/D conversion with respect to this information. In the next step "calculate offset value", the offset detecting section 16b calculates an offset value $V_{OS}$ based on the above formula (17) and outputs this offset value as an offset signal (OFS). In the next conditional step "Is it within dangerous band ?", the focusing correction calculating section 11 judges whether or not the focusing position information Sx is located within the $\Delta Sx$ in FIG. 6. When the focusing lens group 3 is located within the dangerous band 30 on the side of the infinite position, the judging result of the flow chart in this step is YES. The judging result of the flow chart in this step is NO when the focusing lens group 3 is located in the safe region 32. In the present case, this result is set to NO. In the next step "calculate maximum drawing-out amount", the maximum drawing-out calculating section 9 calculates a maximum drawing-out amount (FPx) based on the formula (10). In the next step "calculate correcting amount", the focusing correction calculating section 11 receives the proportional constant number (Cfp) calculated by the proportional constant number calculating section 9, and outputs the correcting amount (Dfp) based on the formula (16).

In the next step "calculate reference value" in FIG. 8, the reference amount control section 11b outputs the reference amount (DFO) based on the formula (18). In the next conditional step "execute correction ?", the focusing control section 12 compares the above correcting amount (Dfp) with the reference amount (DFO). When DFO≧Dfp, the judging result of the flow chart in this step is NO. When DFO<Dfp, the judging result of the flow chart in this step is YES. Namely, when the correcting amount (Dfp) exceeds the reference amount (DFO), the shifting operation is executed. Further, in the next conditional step "driving direction conformed ?", the driving directions of the zooming lens group 2 and the focusing lens group 3 are respectively checked with respect to each other. Namely, these driving directions are conformed to each other in the case in which the focusing direction is changed from the infinite position to the proximate position when the zooming direction is changed from the wide side to the telescopic side. Further, these driving directions are also conformed to each other in the case in which the focusing direction is changed from the proximate position to the infinite position when the zooming direction is changed from the telescopic side to the wide side. In these two cases, the judging result of the flow chart in this step is YES. In a case except for these two cases, the judging result of the flow chart in this step is NO since the above directions are not conformed to each other. In the present case, it is assumed that the judging result of the flow chart in this step is YES. In this case, the flow chart proceeds to mark 1 and thereby it proceeds to mark 1 in FIG. 9. With respect to mark 2 in FIG. 8, it similarly proceeds to mark 2 in FIG. 9.

In the next step "calculate DFC" in FIG. 9, the focusing control section 12 receives the correcting amount (Dfp) and calculates the formula Dfp×$C_8$=CFC with $C_8$ a setting constant number. The focusing control section 12 further converts the correcting amount (Dfp) to a relative amount in the same dimension as that of a counting pulse (Dfc). In the next step "inhibit speed control", the zooming control section 16 inhibits the interrupting operation from the interrupting timer. In the next step "stop zooming motor", the pulse voltage (PP) applied to the zooming motor Mz is interrupted and an electromagnetic brake is applied to the zooming motor Mz. In the next conditional step "waiting time required ?", it is judged whether there is the continuing signal (GO) or not. In the present case, the continuing signal (GO) is being outputted as mentioned above. Therefore, the judging result of the flow chart in this step is NO, thereby executing the next step "focusing drive".

Then, it proceeds to the flow chart in FIG. 10 and this flow chart begins from a step "START" thereof. In a first step "read focusing counter", the focusing control section 12 reads the counting pulse (Dfc) from the focusing counter 6. In the next conditional step "Dfc=DFC ?", it is judged whether or not the focusing lens group 3 is moved by the correcting amount (Dfp). When the focusing lens group 3 is not moved by this correcting amount, the judging result in this step continues to be NO. When the focusing lens group 3 reaches the focusing position, Dfc=DFC is formed so that this judging result becomes YES. In the next step "brake motor", the electric current applied to the zooming motor $M_F$ is interrupted and an electromagnetic brake is applied thereto. In the next conditional step "continuation ?", the focusing control section 12 checks whether there is the continuing signal (GO) or not. In the present case, the continuing signal (GO) is being outputted so that this judging result is YES, thereby proceeding to the next step "RTS" and then returning to the flow chart in FIG. 9.

The step "focusing drive" in FIG. 9 has been completed as mentioned above. In the next conditional step "focusing lock ?", this judging result is NO. In the next step "perform speed control", the zooming control section 16 performs the interrupting operation from the interrupting timer again. In the next step "RTS", it returns to the flow chart in FIG. 7.

The step "zoom-shift operation" in FIG. 7 has been completed as mentioned above. In the next conditional step "zoom continued ?", the zooming control section 16 checks the start signal (STR). In the present case, it is assumed that the up-switch 13 is continued to be operated. Accordingly, the judging result of the flow chart in this step is YES and it again returns to the above step "lock released ?". In this step "lock released ?", the judging result is YES. In the next step "zoom continued ?", the judging result is YES, thereby returning to the above step "lock released ?" again. The repetitious loop constructed by the step "lock released ?" through the step "zoom continued ?" is called a zoom-shift loop in the following description.

In the step "focusing lock ?" in FIG. 9, the judging result is YES. Thus, the next step "escape to safe region" is executed. In the next step "focusing lock ?", the judging result is YES. The operation of the lens controller until the above zooming lock flag is set in the next step "zooming lock flag=1" is set for an unexpected malfunction of the lens controller in the actual design thereof. The operation of the lens controller in which the judging result is YES in the step "zooming lock ?" in FIG. 7 or the judging result is NO in the step "lock released ?" is also set for an unexpected malfunction of the lens controller in the actual design thereof. Such operations of the lens controller do not directly relate to the features of the present invention. Therefore, in the following description, the judging result in the two steps "focusing lock ?" is assumed to be NO at any time. Accordingly, the judging result in the step "zooming lock ?" is assumed to be NO at any time and the judging result in the step "lock released ?" is assumed to be YES at any time.

In the step "Is it within dangerous band ?" in FIG. 8, the judging result is YES. In the subsequent steps "execute correction ?" and "driving direction conformed ?", the judging results are NO. Thereafter, it proceeds to the step "RTS" in FIG. 9 through mark 2. From this step "RTS", it returns to the flow chart in FIG. 7. In this case, the two operations of the lens controller in the steps "Is it within dangerous band ?" and "driving direction conformed ?" do not directly relate to the features of the present invention. Therefore, in the following description, it is assumed that the judging result in the step "Is it within dangerous band ?" is NO at any time, and the judging result in the step "driving direction conformed ?" is YES at any time.

While the operation of the up-switch 13 is continued, the operation of the lens controller in the above zoom-shift loop is repeatedly performed. The control operation of the zoom speed next described is started by the interruption. This zoom-shift loop is composed of an alternating allowance and an allowance continuing loop. In the alternating allowance loop, the interruption is allowed from the step "perform speed control" in FIG. 7 and it then proceeds to the flow chart in FIG. 8. The step "START" of the flow chart in FIG. 8 to the step "inhibit speed control" of the flow chart in FIG. 9 construct an allowing period. The step "inhibit speed control" of the flow chart in FIG. 9 to the subsequent step "perform speed control" in FIG. 9 construct an inhibiting period. In the above alternating allowance loop, the allowing period and the inhibiting period are repeated. In the allowance continuing loop, the interruption is allowed from the step "perform speed control" in FIG. 7 and it then proceeds to the flow chart in FIG. 8. The step "START" of the flow chart in FIG. 8 is started and the judging result in the step "execute correction?" in FIG. 8 is NO. It then proceeds to the step "RTS" in FIG. 9 and the allowance of the interruption is continued. These steps construct the allowance continuing loop mentioned above. In the case of the above alternating allowance loop, the step "focusing drive" is executed during the above inhibiting period as mentioned above.

As shown in FIG. 5, it is next assumed that the zooming lens group 2 and the focusing lens group 3 just before the switching operation of the up-switch 13 are in the focusing state at the point 29. At this time, the focusing position information Sx is S(2) and it is then assumed that the reference amount DF0 in the case of Sx=S(2) is provided by DF0=0. In this case, the correcting amount Dfp=0 and Dfp<A are obtained. Accordingly, the above zoom-shift loop becomes the above allowance continuing loop.

As shown in FIG. 4, when the interruption is allowed at a time point t1 and a first interruption is simultaneously generated for brevity (in reality, the time points of the interrupting generation and the interrupting allowance or inhibition are completely independent of each other), the step "START" of the flow chart in FIG. 11 is started and the zooming control section 16 first reads the offset value $V_{OS}$ from the offset signal (OFS) in the step "read offset value" in FIG. 11. In the next step "determine duty ratio", the duty ratio of the pulse voltage (PP) is determined. In the next step "output pulse voltage", the pulse voltage (PP) according to this duty ratio is outputted to drive the zooming motor Mz. In the next step "read back electromotive voltage", the back electromotive voltage Vr from the speed detecting resistor 16a is read. In the next conditional step "following?", it is checked whether or not the preset number of rotations of the motor is set with respect to the above duty ratio. When this preset number is set, the judging result in this step is YES and the first interrupting operation is completed in the step "RTI" in FIG. 11. When the above preset number is not set, the judging result in this step is NO and the duty ratio is corrected in the step "correction processing" and is outputted again, thereby proceeding to the above step "RTI".

The interruption is continued to be allowed so that the operation of the lens controller in FIG. 11 is sequentially started at respective time points t2 to t5 every interrupting period Ti. The rotary speed of the zooming motor Mz is increased from the time point t1 when this rotary speed is zero, and approximately becomes a speed V1 corresponding to the offset value $V_{OS}$ at the time point t2 of a second interruption. This speed V1 is held until the time point t0. In FIG. 5, the zooming lens group 2 is moved onto the telescopic side from the point 29 as shown by an arrow 24.

When the zooming lens group 2 reaches a position provided by Zp=Zp4, the correcting amount Dfp exceeds the reference amount DF0=A. Therefore, in the step "execute correction?" within the above allowance continuing loop in FIG. 8, the judging result is YES and the above zoom-shift loop is switched to the above alternating allowance loop. When this switching operation is performed at the time point t0, the step "calculate DFC" in FIG. 9 is executed and the interruption is inhibited in the next step "inhibit speed control". In the next step "stop zooming motor", the pulse voltage (PP) applied to the zooming motor Mz is interrupted and the electromagnetic brake is applied thereto. In the next step "waiting time required?", the judging result is NO and the next step "focusing drive" is then executed. Namely, as shown in FIG. 4, the zooming motor Mz is braked at the time point t0 and the focusing motor $M_F$ begins to be driven and there is no overrunning time Tw1 until a time point ta when the overrunning operation of the zooming motor Mz really stops, thereby correspondingly increasing the operation of the lens controller. In the case of the above step "focusing drive" in FIG. 9, the judging result in the step "continuation?" in FIG. 10 is also YES as mentioned above. Accordingly, the interruption is allowed in the step "perform speed control" in FIG. 9 from the time point t6 when the focusing motor $M_F$ is braked in the step "brake motor". Thus, the zooming motor Mz is driven again from the time point t6 without waiting for overrunning time Tw2 of the focusing motor $M_F$, thereby correspondingly increasing the operating speed of the lens controller.

As shown by arrow 25 in FIG. 5, the focusing lens group 3 is driven in the step "focusing drive" and is located at the point 28 on the focusing curve 22. Accordingly, the focusing position information Sx is increased from S(2) to S(3). Namely, as shwon in FIG. 4, by this increase, the rotary speed of the motor is set to a speed V2 faster than the above speed V1 at the time point t7, and the reference amount DF0 is also increased from A to B(B>A). Thus, the next zoom-shift operation is performed as shown in arrows 26 and 27 in FIG. 5, thereby similarly performing the zooming and shifting operations alternately.

Thereafter, when the switching operation of the up-switch 13 is released, the zooming control section 16 detects this operating state and the judging result in the step "zoom continued?" of the zoom-shift loop (i.e., alternating allowance loop) is NO. The operation recognizing section 12a informs this operating state by the recognizing signal (K) as well as the release of the up-switch 13. The continuation judging section 12b receives this recognizing signal (K) and stops the output of the continuing signal (GO).

In the next step "inhibit speed control" in FIG. 7, the interruption is inhibited. In the next step "stop zooming motor", the zooming motor is braked as mentioned above. Since the continuing signal (GO) is not outputted, the brake timer is set to a predetermined time in the next step "set brake timer" and the counting operation thereof is started. In the next conditional step "time up?", the waiting operation is performed for the set time. The next step "correction at end time" is next executed so that the zooming operation is completed in the step "END". In the this step "correction at end time", only the zooming lens group 2 is driven in the allowance continuing loop of the zoom-shift loop. When the switching operation of the up-switch 13 is released in this allowance continuing loop before the correcting amount Dfp reaches the reference amount DF0=A, the unexecuted correcting amount Dfp is left and a defocusing state is thereby caused and the above zooming operation is completed in this defocusing state. The operation in the above step "correction at end time" is performed to prevent such a state. Namely, the left correcting amount Dfp is calculated in accordance with the formula (16) and thereafter the focusing drive operation in FIG. 10 is executed. In this case, the judging result in the step "continuation?" is NO and the waiting operation is performed for the set waiting time.

As mentioned above, in accordance with the first embodiment shown in FIG. 1, the rotary speed of the zooming motor Mz and the reference of the focusing correction can be changed by the offset value $V_{OS}$ from the offset detecting section 16b and the reference amount DF0 from the reference amount control section 11b. Accordingly, for example, when the focusing lens 3 is located on the focusing curve 22, as shown in FIG. 5, the focusing and zooming operations are not repeatedly performed so often in a place in which the conventional shift amounts F1 to F3 are small. Namely, the number of focusing operations is limited so that the general operating time as a total time of the zooming and focusing operations can be reduced. Further, the waiting time after the braking operations of the focusing motor $M_F$ and the zooming motor Mz is removed during the zooming and shifting operations so that the above general operating time can be reduced.

The above offset value $V_{OS}$ and the reference amount DF0 are functions of the focusing position information Sx and are increased as this Sx is increased as shown by the formulas (17) and (18). Accordingly, this Sx is also increased from S(a) through S(b) to S(c) on the side of the proximate position on which the drawing-out amount is greatly required as shown in FIG. 6. Therefore, the operating speed of the lens controller is increased as shown by arrows 33, 34 and 35 in FIG. 6 so that the above general operating time can be reduced. In contrast to this, as the Sx is decreased and therefore approaches the infinite position side in a sequential order of S(2), S(1) and ∞ as shown in FIG. 5, the offset value $V_{OS}$ and the reference amount DF0 are also decreased so that the operating speed is reduced. Accordingly, the above general operating time approximately becomes uniform irrespective of the focusing position information Sx (the distance of the photographed object), thereby improving the operability.

The present invention is not limited to the first embodiment mentioned above, but various kinds of modifications can be made within the scope of the features of the invention.

For example, the conditional steps "waiting time required?" and "T. W" in FIG. 9 are disposed to clarify the features of the invention. The judging results in these steps are NO at any time and therefore these steps may be omitted.

Further, the zooming lock flag may be set when the number of executions in the step "focusing drive" in FIG. 9 is counted and this counting number exceeds a predetermined number. In this case, a really unexpected malfunction can be prevented by such a construction.

A second embodiment of the lens controller of the present invention will next be described in detail with reference to FIGS. 12 to 21.

Figure 12:
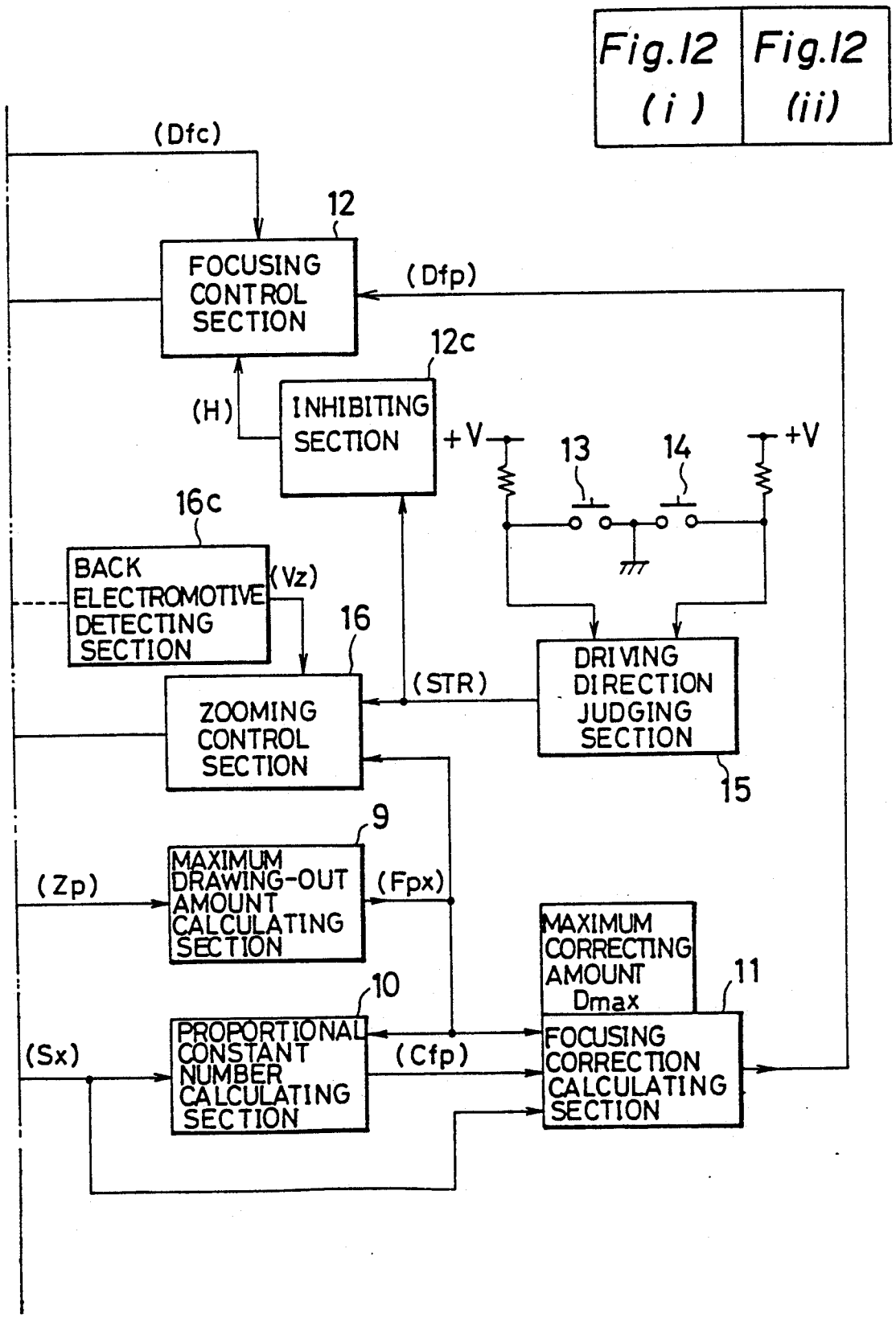

FIG. 12 is a block diagram showing the entire construction of the lens controller. The basic construction of the lens controller in this second embodiment is similar to that in the first embodiment in FIG. 1.

Namely, in the second embodiment shown in FIG. 12, the reference amount control section 11b, the operation recognizing section 12a, the continuation judging section 12b and the offset detecting section 16b disposed in the first embodiment shown in FIG. 1 are not disposed. However, an inhibiting section 12c is disposed in this second embodiment although this inhibiting section 12c is not disposed in the first embodiment in FIG. 1. Further, in this second embodiment, a maximum correcting amount is constructed to be provided to the focusing correction calculating section 11. Such a construction is mainly different from that in the first embodiment.

Accordingly, the constructional portions different from those in the first embodiment in FIG. 1 will be mainly described in the following description.

In FIG. 12, a focusing correction calculating section 11 receives three outputs $F_{px}$, Cfp, and Sx and calculates a correcting amount Dfp for performing the focusing operation. This focusing correction calculating section 11 further compares this correction amount Dfp with a preset maximum correcting amount Dmax and outputs this Dmax when Dfp ≧ Dmax. This focusing correction calculating section 11 constructs a means for calculating the focusing correction. A focusing control section 12 receives the output Dfc of the focusing counter 6, the inhibit signal (H), and the output Dfp corresponding to the correcting amount of the above focusing correction calculating section 11. The focusing control section 12 thus controls the operation of the focusing drive section 5. This focusing control section 12 constructs a means for controlling the focusing correction.

An inhibiting section 12c receives the start signal (STR) described later and outputs the inhibit signal (H) by the driving direction provided by this start signal. This inhibiting section 12c constructs a means for inhibiting the focusing drive.

A zooming control section 16 receives the start signal STR, a motor speed signal Vz and an output $F_{px}$ and controls the zooming drive section 4. A back electromotive voltage detecting section 16c detects a back electromotive voltage generated by the zooming motor Mz when the zooming motor Mz is driven by the zooming control section 16, and outputs this back electromotive voltage as the motor speed signal (Vz). The maximum correcting amount Dmax is set to several % of the entire correcting amount provided by the zooming operation from the telescopic side to the wide side.

Figure 13:
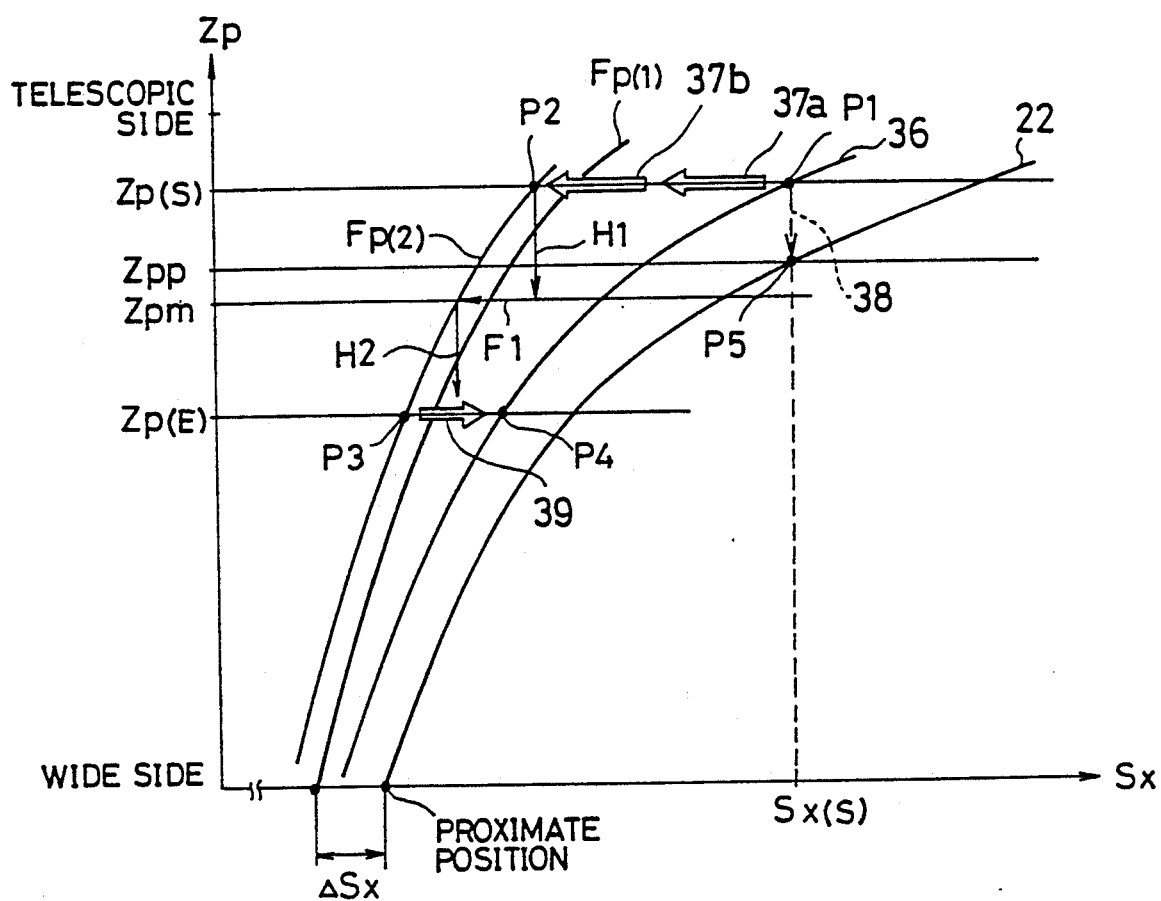
Figure 14:
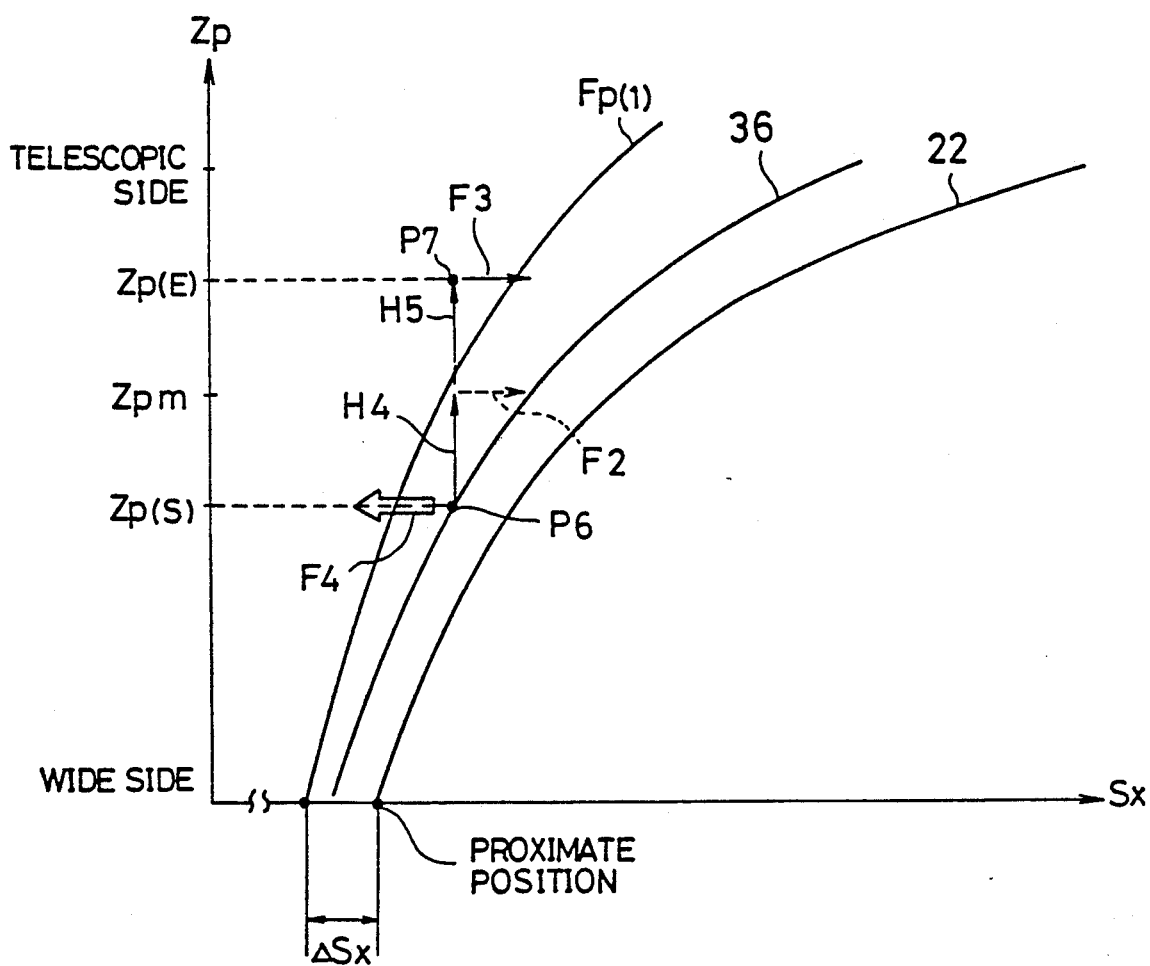

FIGS. 13 and 14 are partially enlarged views of the focusing curve 22 of FIG. 2 for explaining the principle and operation of the lens controller in the second embodiment. FIG. 13 shows the operation for reducing the magnification and FIG. 14 shows the operation for increasing the magnification.

In FIG. 13, Fp(1) shows a dangerous limiting curve (which is simply called a limiting curve in the following description) calculated from the formula (7). When the setting constant number $C_1$ in the formula (7) is set to $C_1$-16 for example, the limiting curve Fp(1) is provided by moving the focusing curve 22 in the most proximate position in parallel upwards by 16 steps in this figure. In the following description, the left-hand side (∞ position side) of this limiting curve Fp(1) in this figure is called an outer side and the right-hand side thereof (the proximate position side) is called an inner side. An inhibiting region on the proximate side between this limiting curve Fp(1) and the focusing curve 22 is called a dangerous band on the proximate side. Accordingly, the width of the dangerous band on the wide side becomes Δ Sx. Reference numeral 36 designates an arbitrary focusing curve within the above dangerous band. Fp(2) designates a provisional focusing curve slightly moved in parallel on the ∞ position side along the limiting curve. P1 and P2 designate intersection points at which Zp=Zp(s) and the focusing curve 36 and the provisional focusing curve Fp(2) respectively cross each other. Sx(s) designates the focusing position information Sx at the point P1. P3 and P4 designate intersection points at which Zp=Zp(E) and the provisional focusing curve Fp(2) and the focusing curve 36 respectively cross each other. P5 designates an intersection point at which the focusing curve 22 and Zp=Zpp cross each other. Zp(s), Zpm, and Zp(E) respectively designate value Zp every distance of 8 steps. Zpp designates value Zp in a position of steps less than 8 steps from Zp(s). Reference numerals 37a, 37b, F1, and 39 designate arrows showing the direction of the focusing drive. H1 and H2 designate arrows showing the direction of the zooming drive. Reference numeral 38 designates an arrow showing the direction of the provisional zooming drive. A cam wall or stopper of a mechanical section constructing the zooming drive section 4 and the focusing drive section 5 is disposed and corresponds to the right-hand side of the focusing curve 22 although this construction is not shown.

In FIG. 14, P6 designates an intersection point at which $Zp=Zp(s)$ and the arbitrary focusing curve 36 within the dangerous band cross each other. H4 and H5 designate arrows showing the direction of the zooming drive. F2 and F3 designate arrows showing the direction of the focusing drive. The same portions as those in FIG. 13 are designated by the same reference numerals and the description thereof is therefore omitted.

Figure 15:
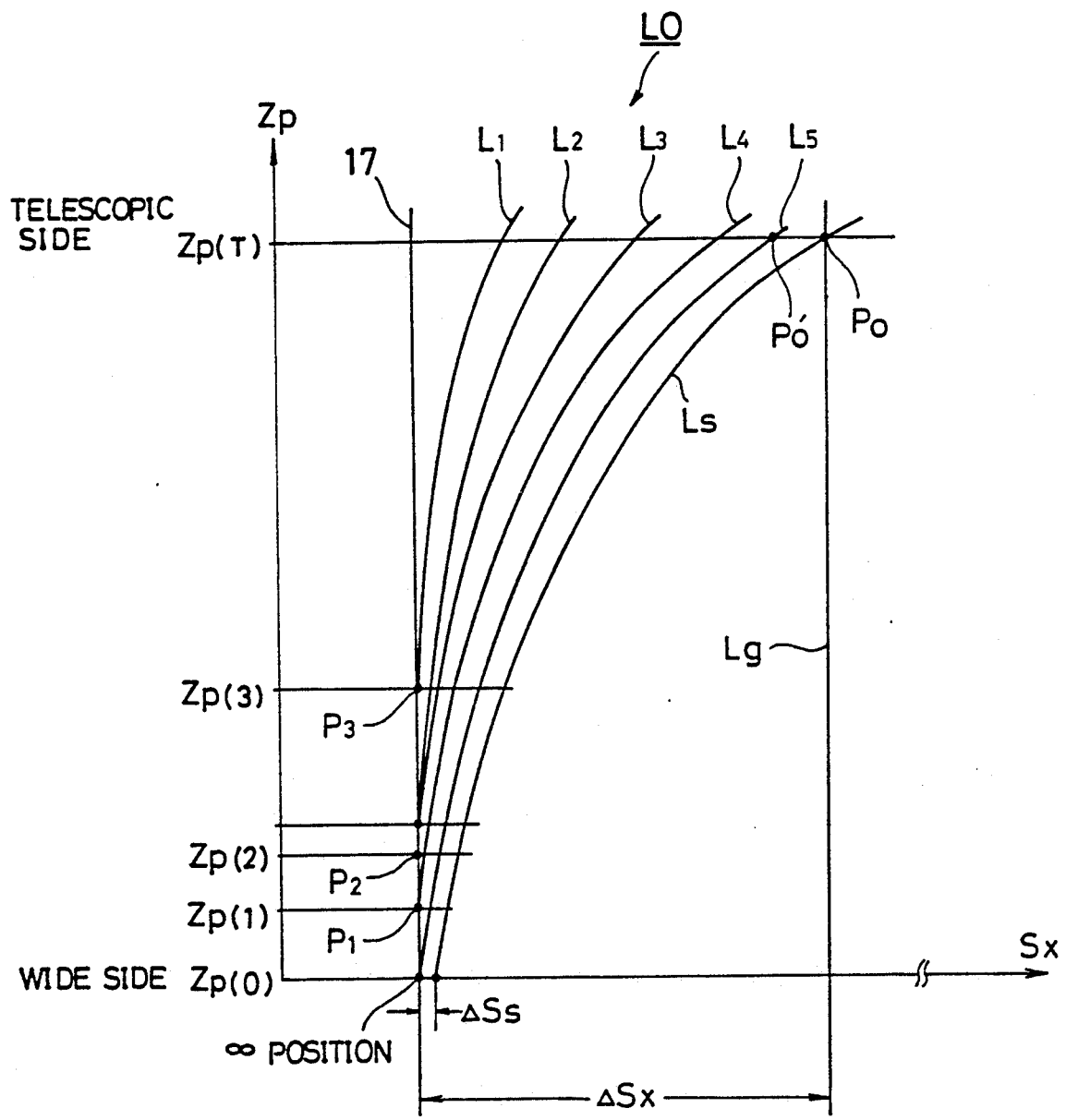
Figure 16:
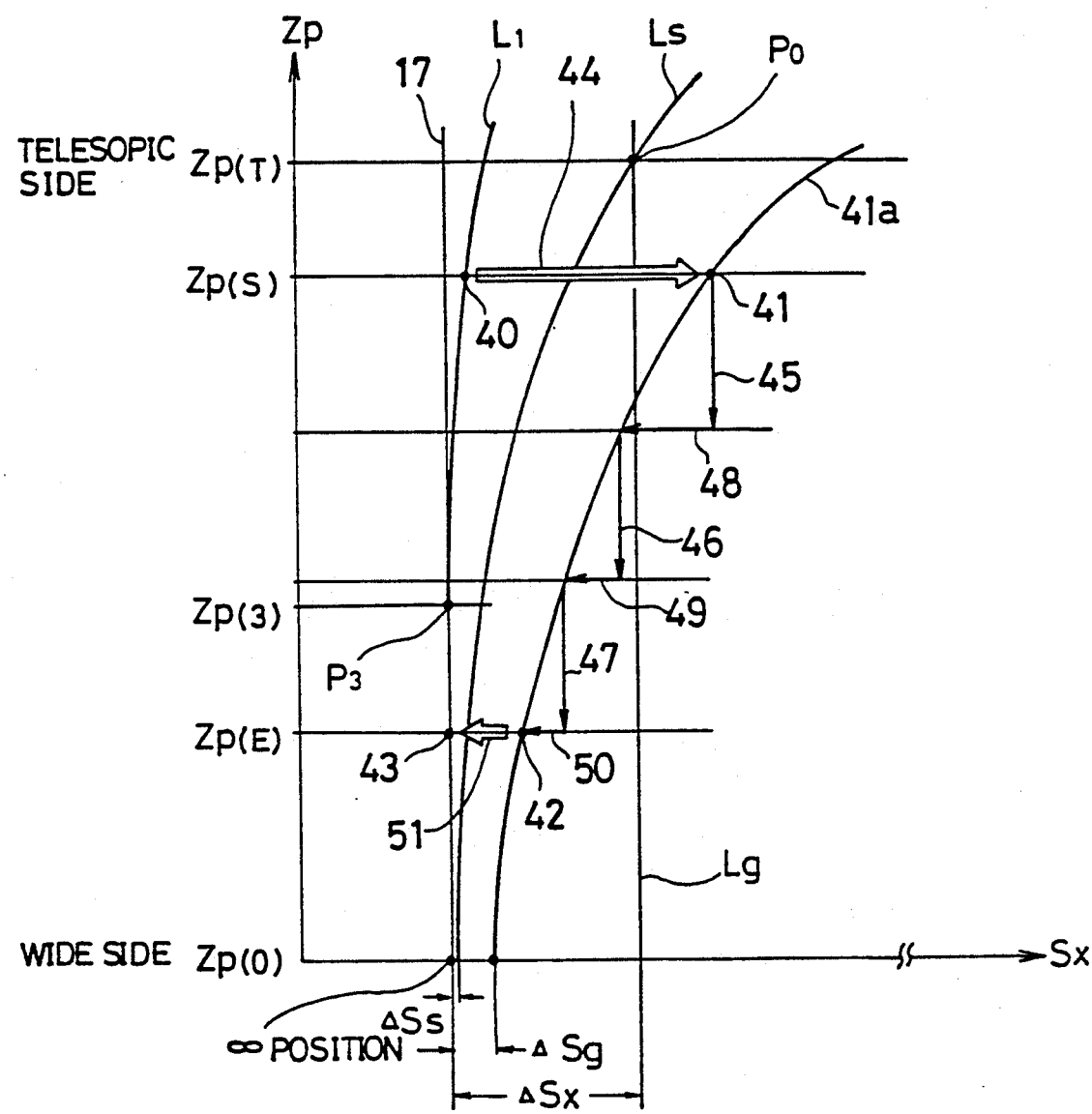
Figure 17:
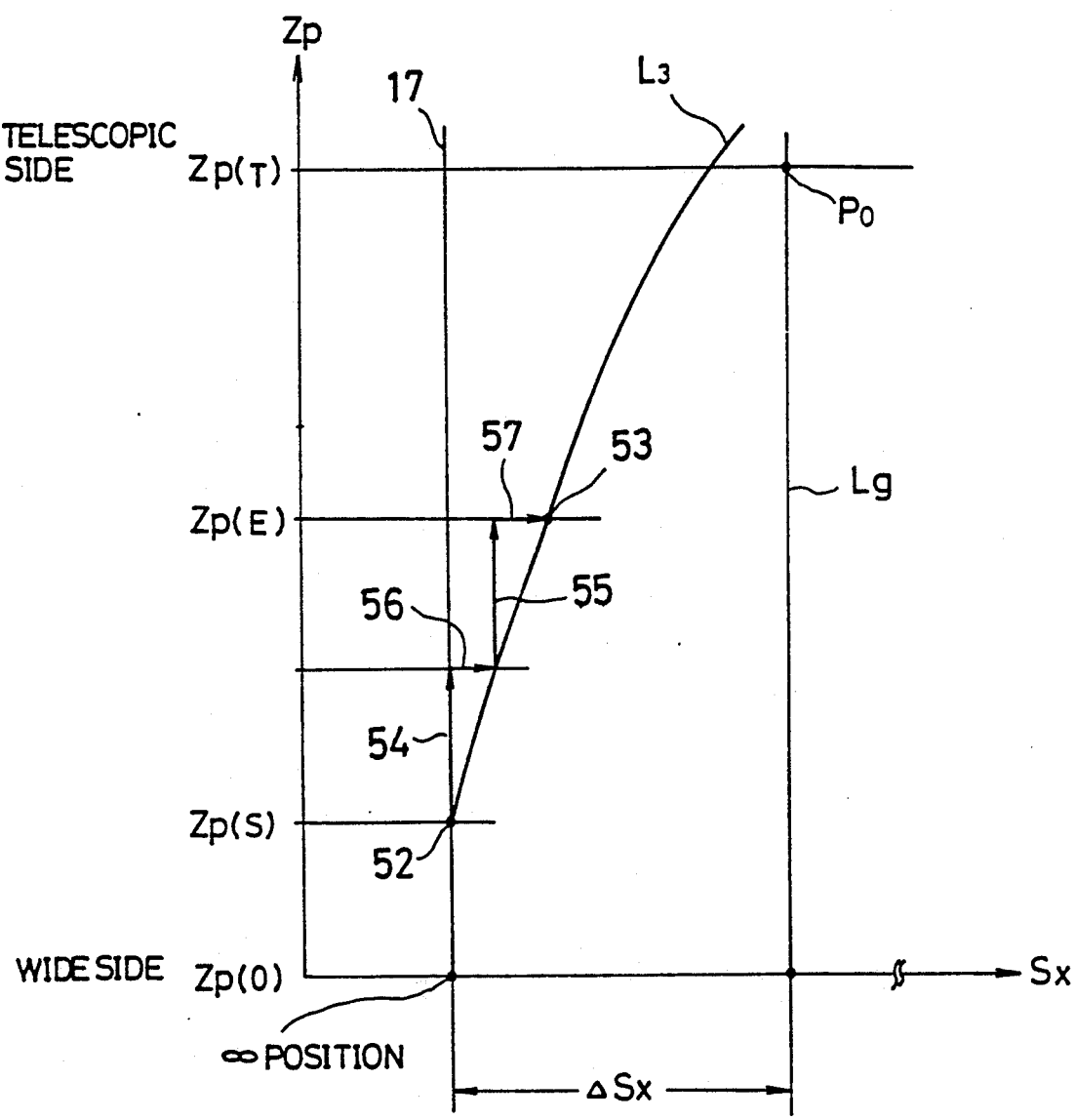

FIG. 15 is an enlarged graph of the curves in the vicinity of the $\infty$ position in FIG. 2 for explaining the principle of the lens controller in the second embodiment of the present invention. FIGS. 16 and 17 are views for explaining the operation of the lens controller in FIG. 12 and respectively show the operation for decreasing the magnification and the operation for increasing the magnification.

FIG. 15 shows some focusing curves $L_1$ to $L_5$ in a focusing curve group L0 within a small interval $\Delta Sx$ on the proximate side from the focusing curve (straight line in this case) 17 in the infinite position. Theoretically, any one of the focusing curve group L0 does not contact the focusing curve 17. Namely, the focusing curve group L0 unlimitedly approaches the focusing curve 17 as this focusing curve group approaches the wide side. The unlimited approach is really equal to contact in consideration of the restriction of the accuracy in processing of mechanical members and the accuracy in assembly, etc. Therefore, in accordance with such a meaning, all the focusing curves of the focusing curve group L0 contact the focusing curve 17 in any of positions $Zp(0)$ to $Zp(3)$.

A stopper is disposed on the left-hand side of the focusing curve 17 in FIG. 15 although this construction is not shown. A focusing curve Ls is provided to secure a small safe distance $\Delta Ss$ in consideration of the mechanical error or rattle, etc., in unillustrated mechanical portions on the wide side of the focusing curve (which is simply called an infinite line in the following description) 17 in the above infinite position. This focusing curve Ls is called a safe curve in the following description. $P_0$ and $P_0'$ respectively designate intersection points of the safe curve Ls and the above-mentioned focusing curve $L_5$ on $Zp=Zp(T)$. Lg designates a parallel limiting line parallel to the infinite line 17 and separated from the infinite line 17 by the small distance $\Delta Sx$ through the above point $P_0$. $P_1$ to $P_3$ designate substantial contact points at which respective focusing curves $L_4$, $L_3$ and $L_1$ substantially contact the infinite line 17. $Zp(1)$ to $Zp(3)$ designate value Zp corresponding to the respective points $P_1$ to $P_3$. $Zp(0)$ and $Zp(T)$ respectively designate value Zp on the wide and telescopic sides. In the present case, $Zp(0)=0$ and $Zp(T)=255$ for example. In the following description, a band portion located between the infinite line 17 and the safe curve Ls is called a dangerous band on the infinite side and an inhibiting region on the infinite side. In FIGS. 16 and 17, the same portions as those in FIG. 15 are designated by the same reference numerals and the description thereof is therefore omitted.

In FIG. 16, a start point 40 designates a position on the focusing curve $L_1$ having the substantial contact point $P_3$ just before the zooming operation for decreasing the magnification. $Zp(s)$ designates value Zp corresponding to the point 40. Reference numeral 41 designates a provisional start point provided by displacing the point 40 on $Zp=Zp(s)$ in parallel by predetermined steps on the side of the proximate position, and reaching the above-mentioned outer side. Reference numeral 41a designates a provisional focusing curve passing through this provisional start point 41. $\Delta Sg$ designates the distance between this focusing curve 41a on the wide side thereof and the infinite line 17. Reference numerals 42 and 43 respectively designate a provisional intersection terminal point of the provisional focusing curve 41a on $Zp=Zp(E)$, and an intersection terminal point of the focusing curve $L_1$ on $Zp=Zp(E)$ when the above zooming operation has been completed. Reference numerals 44 to 51 designate arrows showing the respective driving directions. Reference numerals 45 to 47 designate the direction of the zooming drive in which the length of the respective arrows has 8 steps. Further, reference numerals 48 to 51 designate the direction of the focusing drive. As can be seen from FIG. 16, the following inequality is obtained.

$$\Delta Ss < \Delta Sg < \Delta Sx < <255$$

In FIG. 17, reference numeral 52 designates a start point on the infinite line 17 showing the position thereof just before the operation for increasing the magnification is started. This start point 52 corresponds to the point $P_2$ in FIG. 15 for example. $Zp(s)$ is a value of the Zp of the start point 52 and $Zp(s)=Zp(2)$ is set as mentioned above. The focusing curve $L_3$ has a large inclination in comparison with that in FIG. 4 to clarify this focusing curve. Reference numeral 53 designates a terminal point showing the position of the focusing curve when the above magnification increasing operation has been completed. Reference numerals 54 and 55 designate arrows showing the direction of the zooming drive in which the length of the driving direction has 8 steps. Reference numerals 56 and 57 designate arrows showing the direction of the focusing drive.

Figure 18:
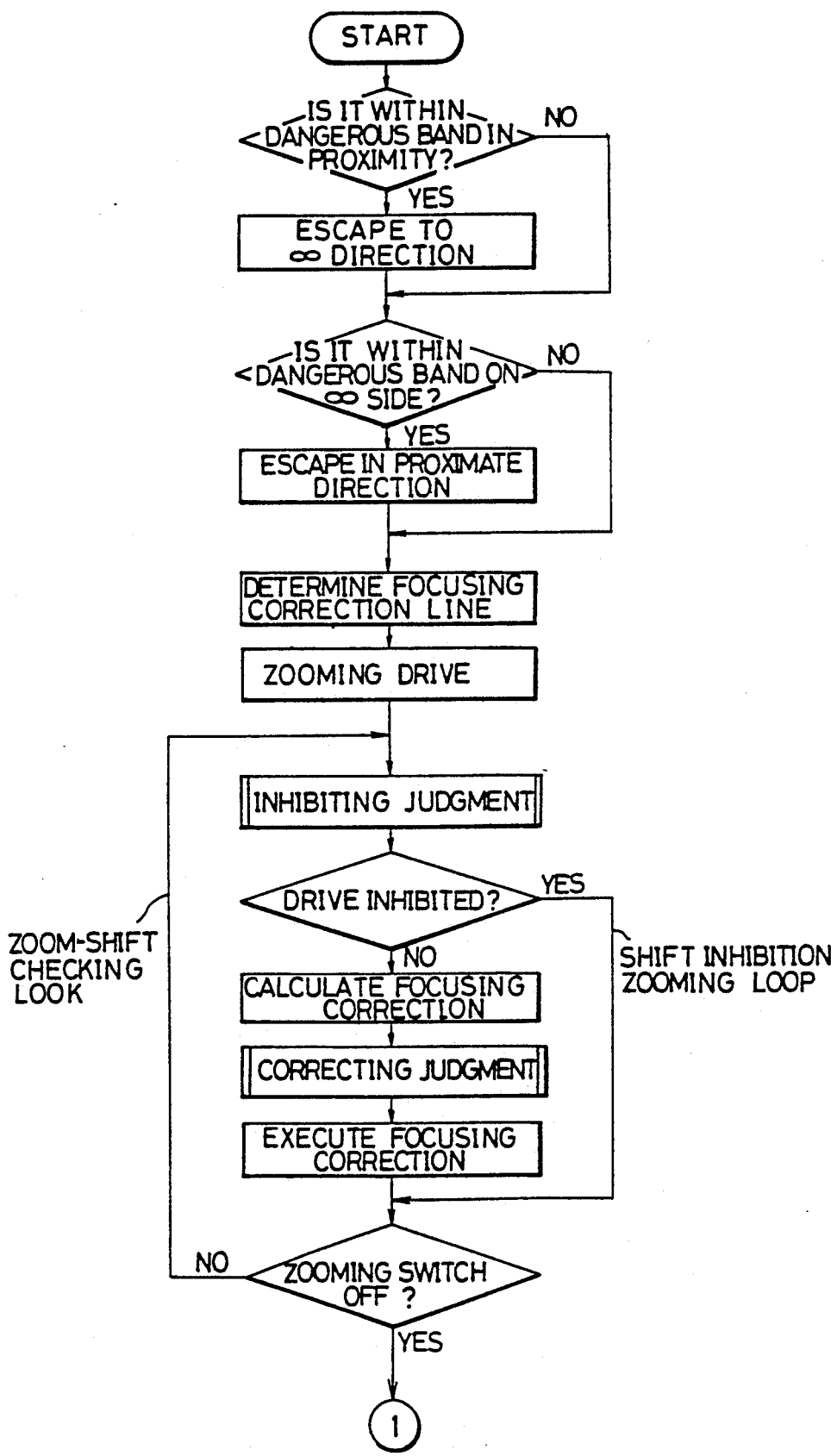
Figure 19:
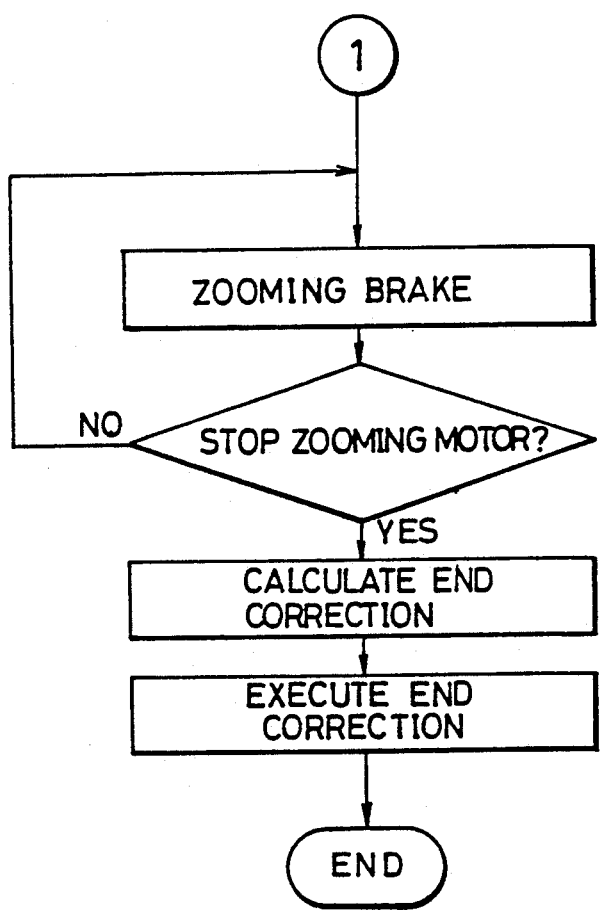
Figure 20:
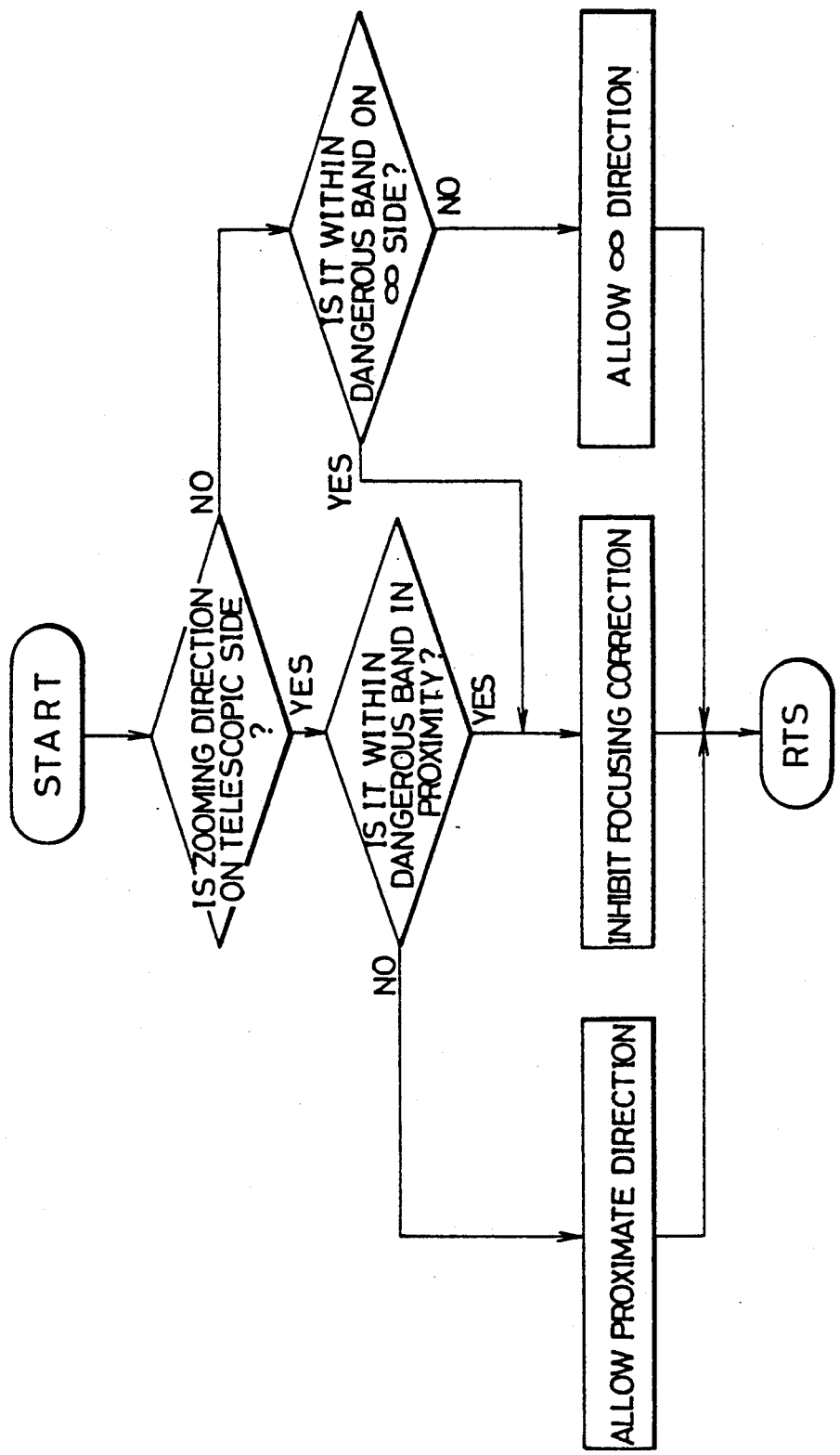
Figure 21:
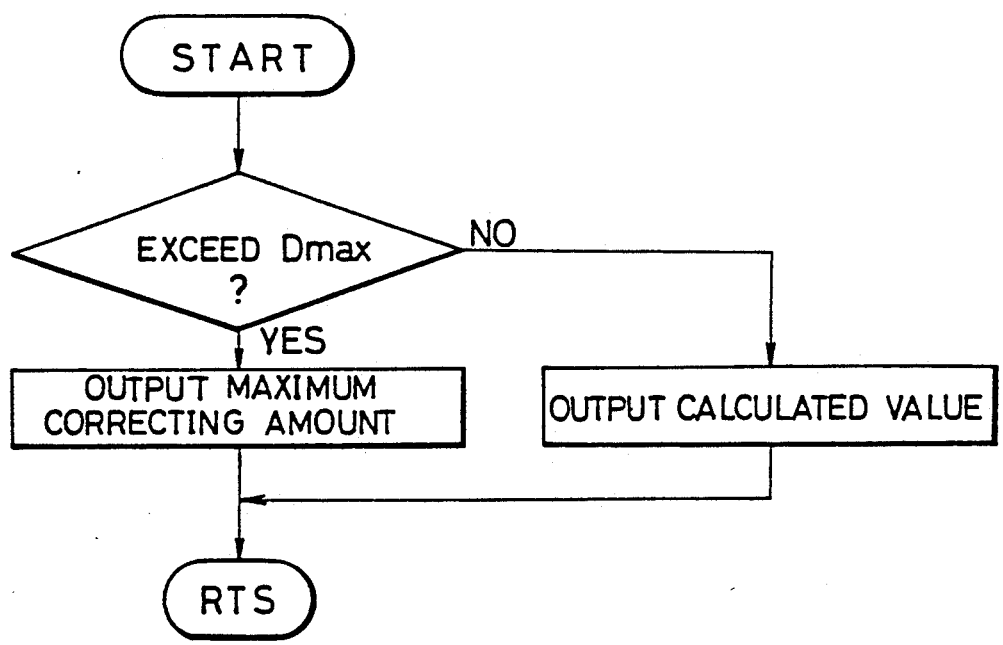

FIGS. 18 to 21 are respectively flow charts showing the operational sequences of the lens controller in the second embodiment of the present invention shown in FIG. 12. FIGS. 18 and 19 show main routines showing the zooming and focusing operations. FIGS. 20 and 21 show subroutines used in the above main routines. FIG. 20 shows an operation for judging inhibition, and FIG. 21 shows an operation for judging correction.

The operation of the lens controller in accordance with the second embodiment of the present invention constructed as above will next be described with reference to the flow chart of FIG. 18. It is assumed that the zooming lens group 2 and the focusing lens group 3 are located at the point P1 in FIG. 13.

When the down-switch 14 in FIG. 12 is pushed (this switch is assumed to be continuously pushed when there is no designation of the switching operation in the following description), a start signal (STR) including information of the zooming direction is outputted from the driving direction judging section 15, and the flow chart in FIG. 18 starts from the step "START". In the first conditional step "Is it within dangerous band in proximity?", the maximum drawing-out amount calculating section 9 receives the output (Zp) of the ZPM 8 and performs the A/D conversion with respect to this output and temporarily stores this converted output. Further, the proportional constant number calculating section 10 receives the output (Sx) of the FPM 7 and performs the A/D conversion with respect to this output and temporarily stores this converted output. Namely, the position of the point P1, $Zp=Zp(s)$, and $Sx=Sx(s)$ in FIG. 13 are read by these sections. The limiting curve $Fp(1)$ is calculated from $Zp(s)$ and $Sx(s)$.

Namely, it is judged whether or not the point P1 is located within the dangerous band in the calculation of $Sx \geq Fp(1)$. In the present case, the point P1 is located within the dangerous band as can be seen from FIG. 13. Accordingly, the judging result in this step in FIG. 18 is YES. In the next step "escape in infinite direction", the focusing control section 12 controls the focusing lens group 3 such that this focusing lens group is moved by a predetermined amount (e.g., 4 steps) in a direction shown by the wide arrow 37a. Further, the focusing lens group 3 is moved in the direction shown by the arrow 37b and reaches the point P2 slightly exceeding the Fp(1) on $Zp = Zp(s)$ on the side of the infinite position. At the point P2, the inequality $Sx < Fp(1)$ is formed.

In the next conditional step "Is it within dangerous band on infinite side?", the judging result is NO since the focusing lens group 3 and the zooming lens group 2 are located at the point P2 at the present time. In the next step "determine focusing correction line", the provisional focusing curve Fp(2) is calculated. In the next step "zooming drive", the zooming control section 16 begins to perform the shifting operation in which the point P2 is set to a new start point and the provisional focusing curve Fp(2) is in the vicinity of the limiting curve Fp(1) on the outer side thereof. Namely, the zooming lens group 2 begins to be driven in the direction of the arrow H1.

The zooming control section 16 performs e.g., a constant speed control, etc. by the motor speed signal (Vz) from the back electromotive voltage detecting section 16c during the operation of the zooming drive.

In the next subroutine "inhibiting judgement", it proceeds to the flow chart in FIG. 20. The flow chart in FIG. 20 starts from the step "START". In the first conditional step "Is zooming direction on telescopic side?", the information of the driving direction included in the start signal (STR) of the inhibiting section 12c is checked. In the present case, this information shows the magnification decreasing direction or the wide direction. Accordingly, the arrow H1 is directed downwards in FIG. 13. Therefore, the judging result of the flow chart in this step is NO. In the next conditional step "Is it within dangerous band on infinite side?", the arrow H1 enters the dangerous band in an intermediate portion thereof with respect to the inhibiting section 12c. This band is a dangerous band on the proximate side as mentioned above and the anticipated direction of the next focusing correction is a direction emitting from the dangerous band as shown by the arrow F1. Therefore, the judging result in this step is NO. In the next step "allow infinite direction", the direction arrow F1 of the next focusing drive is allowed and the inhibit signal (H) is not outputted. In the next step "RTS", it returns to the flow chart in FIG. 18. In the next conditional step "drive inhibited?" in FIG. 18, the judging result is NO since the focusing control section 12 does not receive the inhibit signal (H) as mentioned above. In the next step "calculate focusing correction", the focusing correction calculating section 11 calculates the correcting amount Dfp corresponding to the length of the arrow F1. In the next subroutine "correcting judgment", it proceeds to the flow chart in FIG. 21.

The flow chart in FIG. 21 starts from the step "START". In the first conditional step "exceed Dmax?", the focusing correction calculating section 11 compares the maximum correcting amount Dmax with the above calculated correcting amount Dfp. When $Dmax > Dfp$, the judging result in this step is NO, and the above correcting amount Dfp is outputted in the next step "output calculated value". Conversely, when $Dmax \leq Dfp$, the judging result in the step "exceed Dmax?" in FIG. 21 is YES and the maximum correcting amount Dmax instead of the above Dfp is outputted in the next step "output maximum correcting amount". Thus, the flow chart proceeds to the next step "RTS" and then it returns to the flow chart in FIG. 18 again.

In the next step "execute focusing correction" in FIG. 18, the focusing control section 12 executes the focusing drive corresponding to the above arrow F1. In the next conditional step "zooming switch OFF?", the zooming control section 16 checks the start signal (STR). When this signal shows the continuation of the operation, the judging result in this step is NO. Conversely, when this signal shows the stoppage of the operation, the judging result in this step is YES. In the present case, the continuation of the operation is assumed so that this judging result is NO. Then, it returns to the above subroutine "inhibiting judgment" again, and the above-mentioned operation is repeated again. In the following description, this operating loop is called a zoom-shift checking loop. The zooming drive is again executed in the direction shown by the arrow H2. The focusing drive is executed from the arrow H2 reaching $Zp = Zp(E)$ to the point P3 slightly exceeding Fp(1) on $Zp = Zp(E)$ although no arrow is shown in FIG. 13. At this time, when the above down-switch 14 is turned off, the judging result in the step "zooming switch OFF?" in FIG. 18 is YES, thereby escaping from the above zoom-shift checking loop. Then, the flow chart proceeds to mark ① in FIG. 18 and it then proceeds to the flow chart in FIG. 19.

The flow chart in FIG. 19 starts from the mark ①. In the next step "zooming brake", the zooming control section 16 applies an electromagnetic brake to the zooming motor Mz. In the next conditional step "stop zooming motor?", the zooming control section 16 judges whether or not the operation of the zooming motor Mz is stopped by the motor speed signal (Vz). This judging result is continued to be NO until the operation of the zooming motor Mz is stopped. When the zooming control section 16 judges that the operation of the zooming motor Mz is stopped, this judging result becomes YES.

In the next step "calculate end correction", the correcting amount Dfp from the point P3 to the point P4 is calculated. In the next step "execute end correction", the focusing control section 12 drives the focusing lens group 3 in the direction of the arrow 39 and then moves this focusing lens group 3 from the above provisional focusing curve Fp(2) to the point P4 on the original focusing curve 36. Thus, all the operations with respect to the decrease of the magnification have been completely performed.

As mentioned above, the operation for decreasing the magnification is started after the position of the focusing lens group 3 is once located outside the dangerous band in advance as shown by the wide arrows 37a and 37b in FIG. 13. Therefore, it is possible to prevent the control of the zooming drive toward the point P4 from being disabled by substantially contacting the cam wall or the stopper on the proximate side in the position of the point P5 on the focusing curve 22 in the most proximate position when the magnification decreasing operation immediately begins to be performed as shown by the broken line arrow 38 for example. Further, the focusing correction is finally performed as shown by the wide arrow 39 in FIG. 13 so that the zooming drive is really controlled in the vicinity of the limiting curve Fp(1) along the outside thereof. In this case, the zooming drive is substantially controlled along the arbitrary focusing curve 36.

The operation for increasing the magnification will next be described. In this case, as clearly seen from FIG. 14, with respect to at least the zooming lens group 2, this driving direction is a direction away from the cam wall or the unillustrated stopper on the proximate side. Accordingly, even when the arbitrary focusing curve 36 is located within the dangerous band, it is not necessary to consider this dangerous band with respect to the operation of the zooming lens group 2.

However, with respect to the focusing lens group 3, this driving direction is a direction approaching the above stopper as shown by the arrows F2 and F3 in FIG. 14, thereby causing a dangerous situation. In particular, when the FPM 7 and the ZPM 8 are driven by the focusing drive section 5 and the zooming drive section 4, noises are sometimes caused from unillustrated sliding portions thereof. In such a case, the focusing position information Sx and the focal distance information Zp cannot be correctly detected in a certain case.

For example, when the zooming lens group 2 and the focusing lens group 3 are located at the point P6 in FIG. 14 and the magnification increasing operation is started, the focusing lens group 3 is driven in the direction of the arrow F4 in the step "escape in infinite direction" in the main routine in FIG. 18. In this case, it is assumed that the focusing lens group 3 stops at the point P6 by a certain cause. The zooming lens group 2 is driven in the direction of the arrow H4 in the step "zooming drive". However, in the next step "inhibiting judgement", it proceeds to the flow chart in FIG. 20. In the step "Is zooming direction on telescopic side?", the judging result is YES. In the next step "Is it within dangerous band in proximity?", the judging result is YES. In the next step "inhibit focusing correction", the drive corresponding to the arrow F2 is inhibited. Then, it returns to the flow chart in FIG. 18. In the step "drive inhibited?", the judging result is YES so that the focusing drive is not executed. In this case, the loop branching from YES of this step is called a shift inhibition zooming loop in the following description. However, the zooming drive is being continued so that the zooming lens group 2 is driven in the direction of the arrow H5.

When the zooming lens groups 2 reaches the point provided by Zp=Zp(E), the zooming lens group 2 has finally escaped from the dangerous band. Therefore, the above inhibition is released and the focusing drive is executed in the direction shown by the arrow F3 on the basis of the correcting amount calculated at the point P7. The following operation will be easily understood from the above-mentioned description.

The operation of the lens controller on the infinite position side in the second embodiment of the present invention will next be described with reference to the flow charts of FIGS. 18 and 19.

As mentioned above, the focusing curve group L0 in FIG. 15 substantially contacts the infinite line 17 in an intermediate portion thereof from the telescopic side to the wide side. As can be seen from FIG. 15, the focusing curve L5 contacts the infinite line 17 on Zp=Zp(0) on the wide side, thereby causing no problem. However, in reality, the safe curve Ls separated by the safe distance ΔSs from the infinite line 17 is set on the wide side in consideration of the processing error or rattle, etc., of mechanical members. Namely, the infinite line 17 does not substantially contact the safe curve Ls as a focusing curve which is located further on the proximate side from the point P0' on Zp=Zp(T) on the telescopic side and passes through the point P0 separated by Δ Sx from the infinite line 17. Further, the infinite line 17 does not substantially contact an unillustrated focusing curve located on the proximate side from the safe curve Ls.

The operation of the lens controller will next be described. With respect to the operation for decreasing the magnification, the zooming lens group 2 and the focusing lens group 3 are assumed to be located at the start point 40 in FIG. 16.

When the down-switch 14 in FIG. 12 is pushed (this switch is assumed to be continuously pushed until the operation thereof is designated in the following description), the driving direction judging section 15 outputs the start signal (STR) including the information of the zooming direction. The flow chart in FIG. 18 starts from the step "START". In the first conditional step "Is it within dangerous band in proximity", the judging result is NO. In the next step "Is it within dangerous band on infinite side", the maximum drawing-out amount calculating section 9 receives the output (Zp) of the ZPM 8 and performs the A/D conversion with respect to this output and temporarily stores this converted output. The proportional constant number calculating section 10 receives the output (Sx) of the FPM 7 and performs the A/D conversion with respect to this output and temporarily stores this converted output. Namely, the values of Zp and Sx at the start point 40 in FIG. 16 are read. It is then judged whether the start point 40 is located within the dangerous band or not. In the present case, the start point 40 is located within the dangerous band so that this judging result is YES. In the step "escape in the proximate direction", the focusing lens group 3 is moved by a predetermined number of steps on the proximate side in the direction shown by the wide arrow 44 and then is moved until the provisional start point 41. When the Δ Sx is 8 steps for example, the above predetermined number of steps is about 12 steps. In the next step "determine focusing correction line", the provisional focusing curve 41a is calculated. In the next step "zooming drive", the zooming control section 16 sets the provisional start point 41 to a new start point and starts the control operation based on the provisional focusing curve 41a including this provisional start point 41. Namely, the zooming lens group 2 is driven in the direction of the arrow 45 in FIG. 16 until this zooming lens group has been moved by the above 8 steps.

In the next step "inhibiting judgement", it proceeds to the flow chart in FIG. 20. In the conditional step "Is zooming direction on telescopic side?", the judging result is NO. In the next conditional step "Is it within dangerous band on infinite side?", the judging result is NO. In the next step "allow infinite direction", the focusing drive shown by the arrow 48 to be next performed is allowed. In the next step "RTS", it returns to the flow chart in FIG. 18. In the step "drive inhibited?", the judging result is NO. In the step "calculate focusing correction", the correction amount corresponding to the length of the arrow 48 is calculated. In the next step "correcting judgment", it proceeds to the flow chart in FIG. 21. When the above correcting amount does not exceed the maximum correcting amount Dmax, this correcting amount is outputted as Dfp and it returns to the flow chart in FIG. 18 again. In the next step "execute focusing correction", the focusing lens group 3 is driven in the direction of the arrow 48. When the down-switch 14 is not turned off, the above zoom-shift checking loop is operated. Thereafter, the above-mentioned operations shown by the sequential order of the arrows 46, 49, 47 and 50 are repeatedly performed. When the focusing lens group 3 has reached the provisional terminal point 42 and the down-switch 14 is turned off, the focusing lens group 3 escapes from the above zoom-shift checking loop and it proceeds to the flow chart in FIG. 19. Thus, the focusing lens group 3 is driven in the direction shown by the wide arrow 51. When the focusing lens group 3 then reaches the terminal point 43 on the infinite line 17, the zooming operation from Zp(s) to Zp(E) is performed so that the magnification decreasing operation is completed. As mentioned above, in accordance with the focusing curve $L_1$ constituting the basic control, it is possible to avoid the problems that the focusing lens group 3 cannot be driven until the terminal point 43 by the substantial contact of the stopper at the substantial contact point $P_3$ on the infinite side. Further, the focusing correction shown by the arrow 51 is finally performed so that the same results as those provided by the control along the focusing curve $L_1$ are substantially obtained.

The operation for increasing the magnification will next be described. In this case, with respect to the focusing operation, as can be clearly seen from FIG. 17, the driving direction of the focusing lens group 3 is a direction away from the unillustrated stopper on the infinite side. Accordingly, even when the focusing curve $L_3$ is located within the dangerous band, it is not necessary to consider this dangerous band with respect to the operating content of the focusing lens group 3. With respect to the flow chart in FIG. 20, the judging result in the step "Is zooming direction on telescopic side?" is YES. In the next step "Is it within dangerous band in proximity?", the judging result is NO.

As mentioned above, in the second embodiment of the present invention, when the zooming operation for decreasing the magnification is performed and the focusing position already set is located within the above dangerous band, this focusing position is once moved outside the dangerous band and is controlled along the provisional focusing curve 41a. Accordingly, the problems such as the substantial contact of the stopper on the infinite position side can be removed and the operating control in the vicinity of the side of the infinite position can be also performed reliably and rapidly. Further, the final correction shown by the arrow 51 in FIG. 16 is executed so that no defocusing state is caused.

FIGS. 16 and 17 shows the enlarged focusing curves, etc., and therefore the width of the dangerous band is also enlarged. In reality, the Δ Sx is a small amount and therefore the operating curves shown in FIGS. 16 and 17 show the zooming operation substantially on the infinite line 17, i.e., in the focusing state in which the distance of the photographed object is infinite. The zooming lens group 2 is really moved along the stopper without contacting the stopper on the infinite side, but in a state unlimitedly approaching the stopper within the processing accuracy of the mechanical portion. For example, it can be easily judged whether the lens group is stopped by the substantial contact of the above stopper or a manually external force, etc., when the stopping position of the lens group is detected by an excessive load state of the motor for example, thereby accurately performing the focusing control.

Further, after the focusing lens group has once escaped from the dangerous band, the steps "inhibiting judgment" and "correcting judgment" within the zoom-shift checking loop are further checked. Accordingly, there are no problems that the focusing lens group 3 is not driven even when the driving operation thereof has been performed, and that the focusing lens group 3 substantially contacts the stopper on the proximate or infinite side even when the focusing position information Sx and the focal distance information Zp are error information.

Further, since the step "correcting judgment" is judged, no large malfunction of the lens controller is caused even if the control operation thereof is disturbed.

The final correction shown by the arrow 39 in FIG. 13 is performed by the steps "calculate end correction" and "execute end correction" in FIG. 19, thereby causing no defocusing state.

The lens controller of the present invention is not limited to the above-mentioned second embodiment, but can be changed in various kinds of modifications within the scope of the features of the invention.

For example, to clarify the principle of the operation of the lens controller in the above end correction, the driving operation from the tip of the arrow H2 to the point P3 in FIG. 13 is performed and thereafter the correcting operation toward the point P4 is performed. However, if the distance from the tip of the arrow H2 to the point P4 is calculated and the distance with respect to the point P3 is subtracted from the former distance, the driving operation from the tip of the arrow H2 to the point P4 can be directly performed.

The Δ Sx is not limited to the 8 steps, but may be set to an arbitrary suitable number of steps such as 5 or 10 steps in accordance with the design.

In the step "escape in proximate direction" in FIG. 18, the number of moving steps is not limited to four steps, but may be set to an arbitrary number of steps such as 2 or 6 moving steps in consideration of the control accuracy and the control speed.

In the conditional step "stop zooming motor ?" in FIG. 19, the operation of the zooming motor is based on the motor speed signal (Vz) as mentioned above, but a timer may be disposed to count a predetermined time.

A third embodiment of the lens controller of the present invention will next be described in detail with reference to FIGS. 22 to 25.

FIG. 22 is a block diagram showing the entire construction of the lens controller in the third embodiment of the present invention.

In FIG. 22, an up-switch 61 and a down-switch 62 are respectively constructed by momentary switches, etc., and respectively output an up-signal (UP) and a down-signal (DN) as execution signals of the switching operation while these switches are operated. These switches 61 and 62 construct a motor switch 63 as a start inputting means. An A/M switch 64 and a F/Z switch 65 are constructed by toggle switches, etc. The A/M switch 64 outputs an auto signal (AT) at the opening time thereof and outputs a manual signal (MU) at the closing time thereof. The A/M switch 64 constructs a focusing mode selecting means for switching an auto focusing mode or a manual focusing mode. The F/Z switch 65 outputs a focusing signal (F) as a signal indicating the focusing operation at the opening time thereof and outputs a zooming signal (Z) as a signal indicating the zooming operation at the closing time thereof. The F/Z switch 65 constructs an operation selecting means for switching the focusing operation or the zooming operation. A zoom setting switch 66 and a macro setting switch 67 are constructed by momentary switches, etc. The zoom setting switch 66 outputs a zoom setting signal (ZG) during the switching operation thereof. The macro setting switch 67 outputs a macro setting signal (MG) during the switching operation thereof. The zoom setting switch 66 and the macro setting switch 67 construct a Z/M setting switch 68.

A focusing lens 69 can be moved from a proximate position N corresponding to the proximate distance of the photographed object to an infinite position I corresponding to the infinite distance of the photographed object. A zooming lens 70 can be moved within a zooming region from a position T corresponding to the longest focal distance to a position W corresponding to the shortest focal distance. The zooming lens 70 can be set to a normal macro mode for fixing the lens controller to a macro position M in the macro state exceeding the position W. A zooming optical system 71 is composed of the above focusing lens 69 and the zooming lens 70.

An AF section 72 measures the distance of the photographed object and outputs a focusing signal (Na) or (Ia) as a focusing execution signal for executing the focusing operation of the photographed object. The AF section 72 constructs a means for performing the auto focusing control. A focusing motor 73 receives drive signals (N2) and (I2) and drives the above focusing lens 69. A motor driver 74 receives focusing motor signals (N1) and (I1) and respectively outputs the above drive signals (N2) and (I2).

Reference numerals 75 to 77 designate state switches. The switches 75 and 76 are respectively a T-position switch and a W-position switch for outputting a T-position signal (TP) and a W-position signal (WP) when the zooming lens 70 reaches the above positions T and W. The switch 77 is a macro position switch as a macro state detecting means for outputting a macro position signal (MP) when the zooming lens 70 is moved to the above macro position M. A zooming motor 78 drives the above zooming lens 70 by receiving the drive signal (T2) or (W2). A motor driver 79 receives the zooming motor signal (T1) or (W1) and respectively outputs the above drive signal (T2) or (W2). The zooming motor 78 and the motor driver 79 construct a zooming drive means. The focusing motor 73 and the motor driver 74 construct a focusing drive means.

A general control section (which is called a CPU in the following description) 80 receives the above focusing signals (Na), (Ia), the above T-position signal (TP), the W-position signal (WP), the macro position signal (MP), the up-signal (UP) or the down-signal (DN), the auto signal (AT) or the manual signal (MU), the focusing signal (F) or the zooming signal (Z), and the zoom setting signal (ZG) or the macro setting signal (MG). The CPU 80 outputs the above focusing motor signals (N1), (I1) and the zooming motor signals (T1), (W1). The construction of a main portion of the interior of this CPU 80 will next be described.

A state detecting section 81 as an operating state detecting means outputs a hold signal (H) as an inhibit signal to detect an operating state of the motor switch 63 when this state detecting section 81 receives any one of the above up-signal (UP) and the down-signal (DN).

Reference numeral 82 designates an inhibiting control section. When the inhibiting control section 82 receives the focusing signal (F) or the zooming signal (Z) from the above F/Z switch 65, this inhibiting control section 82 outputs an inhibit signal (IZ) or (IF) corresponding to such a signal. When the inhibiting control section 82 receives the hold signal (H), the inhibiting control section 82 holds its outputting state and invalidates the output from the above F/Z switch 65. When the inhibiting control section 82 receives the macro position signal (MP), the inhibiting control section 82 compulsorily outputs the inhibit signal (IZ). When the inhibiting control section 82 receives the above auto signal (AT), the inhibiting control section 82 compulsorily outputs the inhibit signal (IF) and thereby invalidates the output from the F/Z switch 65, thereby constituting an output determining means. Reference numeral 83 designates a focusing gate. When the focusing gate 83 receives the above up-signal (UP) and the down-signal (DN), the focusing gate 83 respectively outputs a focusing motor signal (NO) indicating the driving direction on the side of the proximate position N and a focusing motor signal (IO) indicating the driving direction on the side of the infinite position I. When the focusing gate 83 receives the above inhibit signal (IF), the focusing gate 83 interrupts both the focusing motor signals (NO) and (IO). Reference numeral 84 designates a zooming gate. When the zooming gate 84 receives the above up-signal (UP) and the down-signal (DN), the zooming gate 84 respectively outputs a zooming motor signal (TO) indicating the driving direction on the side of the position T and a zooming motor signal (WO) indicating the driving direction on the side of the position W. When the zooming gate 84 receives the above inhibit signal (IZ), the zooming gate 84 interrupts both the zooming motor signals (TO) and (WO). The focusing gate 83 and the zooming gate 84 construct an execution selecting means. The above focusing motor signals (NO), (IO), and the zooming motor signals (TO), (WO) respectively correspond to a focusing execution signal and a zooming execution signal.

A gate control section 85 receives the above zoom setting signal (ZG) and the above macro setting signal (MG), and outputs an enable signal (EN) during a period in which the gate control section 85 receives any one of these setting signals. An A/M gate 86 outputs the focusing signals (Na), (Ia) as the focusing motor signals (N1), (I1) when this A/M gate 86 receives the above auto signal (AT). When the A/M gate 86 receives the manual signal (MU), the A/M gate 86 outputs the focusing motor signals (NO), (IO) as the focusing motor signals (N1), (I1). Reference numeral 87 designates a switching gate. When this switching gate 87 does not receive the above enable signal (EN), the switching gate 87 outputs the above zooming motor signals (T0), (W0) as the zooming motor signals (T1), (W1). When the switching gate 87 receives the enable signal (EN), the switching gate 87 outputs the above zoom setting signal (ZG) and the macro setting signal (MG) as the zooming motor signals (T1), (W1). When the switching gate 87 receives the above T-position signal (TP) and the W-position signal (WP), the switching gate 87 respectively interrupts the zooming motor signals (T1) and (W1).

Figure 23:
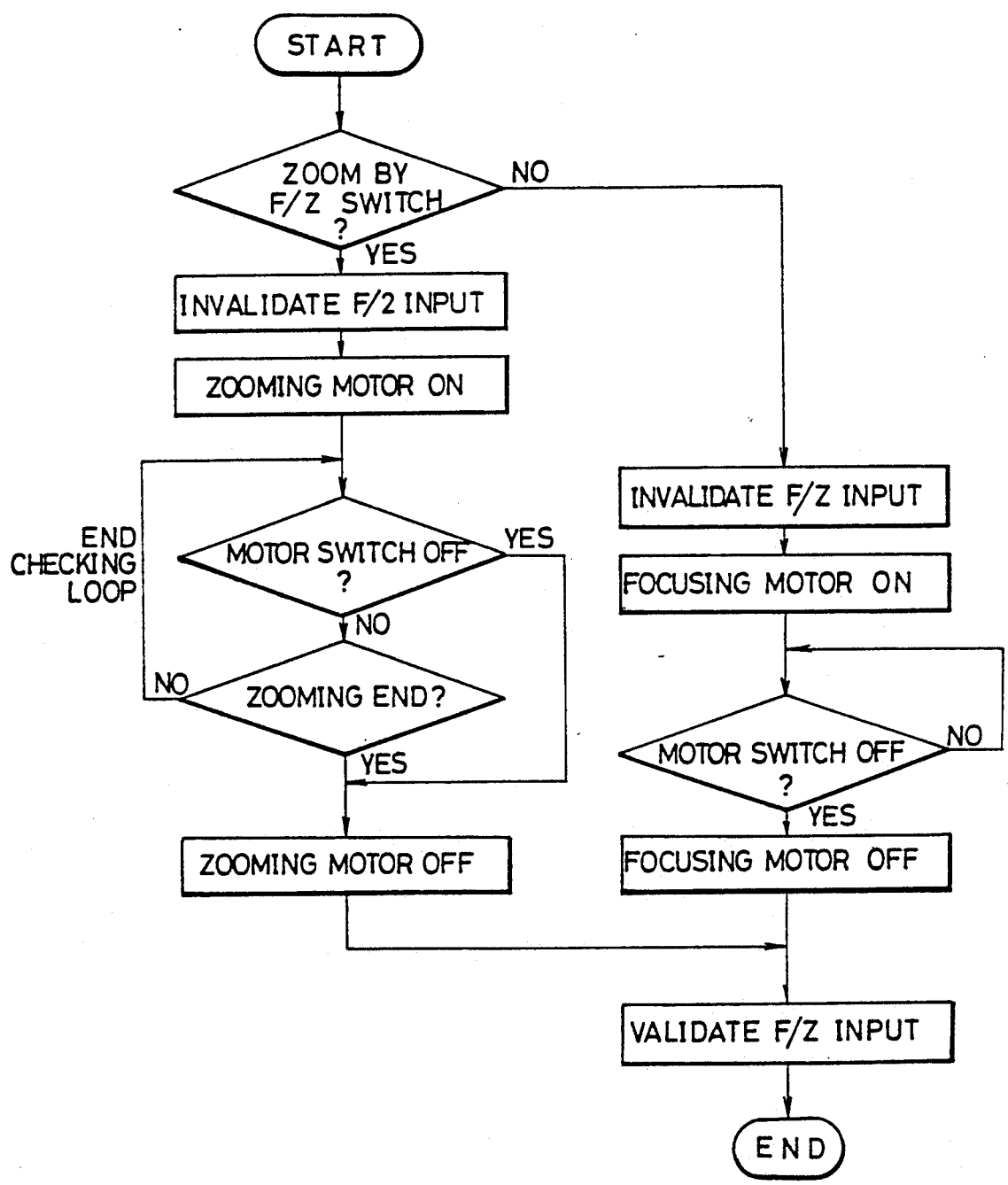

FIGS. 23 to 25 are flow charts showing the operational sequences of the lens controller in the third embodiment shown in FIG. 22. FIGS. 23 to 25 respectively show the focusing/zooming operation, the macro setting operation, and the auto focus setting operation.

The operation of the lens controller in accordance with the third embodiment of the present invention constructed above will next be described.

The focusing/zooming operation of the lens controller will first be described along the flow chart in FIG. 23. With respect to the initial states of the constructional portions of the lens controller, the A/M switch 64 is in the closing state in which this A/M switch 64 outputs the manual signal (MU). The motor switch 63 and the Z/M setting switch 68 are in unoperated states. The focusing lens 69 is located between the proximate position N and the infinite position I. The zooming lens 70 is located in the zooming region between the position T and the position W.

First, an operator closes the F/Z switch 65 to output the zooming signal (Z) so as to determine the composition by the zooming operation. The inhibiting control section 82 receives this zooming signal (Z) and outputs the inhibit signal (IF). When the up-switch 61 for example with respect to the motor switch 63 is operated, the up-switch (UP) is outputted therefrom and at this time the flow chart in FIG. 23 is started from the step "START". In the first conditional step "zoom by F/Z switch ?", the judging result is YES and the state detecting section 81 receiving the above up-signal (UP) outputs the hold signal (H) in the next step "invalidate F/Z input". The inhibiting control section 82 receives this hold signal (H) and holds the inhibit signal (IF) so that this inhibiting control section 82 invalidates the subsequent output of the F/Z switch 65. The focusing gate 83 is turned off by receiving the inhibit signal (IF).

In the next step "zooming motor ON", the above up-signal (UP) passes through the zooming gate 84 and becomes the zooming motor signal (T0). This zooming motor signal (T0) further passes through the switching gate 87 and becomes the zooming motor signal (T1). The motor driver 79 receives this zooming motor signal (T1) and outputs the drive signal (T2). The zooming motor 78 begins to drive the zooming lens 70 on the side of the position T. In the next conditional step "motor switch OFF ?", the judging result is NO if the switching operation of the up-switch 61 is continued. Further, in the next conditional step "zooming end ?", the judging result is NO if the zooming lens 70 does not still reach the position T. Thereafter, it returns to the above step "motor switch OFF ?" again, and the above-mentioned operations are repeatedly performed. This repeating loop is called an end checking loop in the following description.

When the F/Z switch 65 is open during the switching operation of the up-switch 61, the focusing signal (F) instead of the zooming signal (Z) is outputted from the F/Z switch 65. In this case, the outputting state of the inhibiting control section 82 is held by the hold signal (H). Accordingly, the focusing gate 83 is held in the turning-off state and the zooming gate 84 is held in the turning-on state and the driving operation of the zooming lens 70 is continued.

Thereafter, when the switching operation of the up-switch 61 is released, the judging result in the above step "motor switch OFF ?" is YES to escape from the above end checking loop. In the next step "zooming motor OFF", the above up-signal (UP) is not outputted. Therefore, the motor driver 79 stops the output of the drive signal (T2) so that the operation of the zooming motor 78 is stopped. In the next step "validate F/Z input", the up-signal (UP) is not inputted to the state detecting section 81 so that the state detecting section 81 stops the output of the hold signal. Thus, the inhibiting control section 82 is freely operated to perform the next switching operation of the F/Z switch 65. In the final step "END", all the control operations are completed.

When the zooming lens 70 has reached the position T, the switching gate 87 stops the output of the zooming motor signal (T1) by the T-position signal (TP). Thus, the step "zooming motor OFF" is executed and the above step "validate F/Z input" is then executed at a time point when the operator has released the switching operation of the up-switch 61.

In the control operation by the switching operation of the down-switch 62, the driving direction of the zooming lens 70 is opposite, but the other control operations are similar to the above-mentioned operations. Therefore, the control operation in the case of the down-switch 62 is omitted here.

The focusing operation of the lens controller will next be described briefly. When the F/Z switch 65 is open, the focusing signal (F) is outputted therefrom and the zooming gate 84 is turned off by the inhibit signal (IZ). When the up-switch 61 is operated, the up-signal (UP) is changed to the focusing motor signals (N0), (N1) and the drive signal (N2), thereby driving the focusing motor 73. Thus, the focusing lens 69 is driven on the side of the proximate position N. Then, the state detecting section 81 outputs the hold signal (H) so that the closing operation of the F/Z switch 65 is invalidated during the focusing operation and thereby the focusing operation is not prevented.

The macro setting operation will next be described along the flow chart in FIG. 24. This flow chart is started from the step "START" at a time point when the macro setting switch 67 is operated. In the first step "gate switching", the gate control section 85 receiving the macro setting signal (MG) outputs the enable signal (EN). The switching gate 87 receives this enable signal (EN) and outputs the macro setting signal (MG) as the zooming motor signal (W1). In the next step "drive zooming lens", the zooming motor signal (W1) is changed to the drive signal (W2) by the motor driver 79. The zooming motor 78 receives this drive signal (W2) and moves the zooming lens 70 to the position W. The zooming motor 78 further drives the zooming lens 70 in the direction of the macro position M. When the zooming lens 70 has reached the macro position M, the judging result in the next conditional step "macro position ?" is YES. In the next step "stop drive", the switching gate section 87 receiving the macro position signal (MP) stops the output of the zooming motor signal (W1), thereby stopping the drive of the zooming lens 70. The inhibiting control section 82 receiving the macro position signal (MP) compulsorily outputs the inhibit signal (IZ) in the next step "invalidate F/Z input", and turns the zooming gate 84 off. Accordingly, in this state, the focusing lens 69 is driven through the focusing gate 83 by the switching operation of the motor switch 63. Thus, the focusing operation in the normal macro mode can be executed irrespective of the operating state of the F/Z switch 65 if the motor switch 63 is operated.

The auto focus setting operation will next be described with reference to the flow chart in FIG. 25. When the A/M switch 64 is open, this flow chart is started from the step "START" at this time point. In the first step "switch A/M gate", the A/M gate 86 receiving the auto signal (AT) performs the switching operation of an internal electric connection so as to output the focusing signal (Na) or (Ia) as the focusing motor signal (N1) or (I1). In the next step "invalidate F/Z input", the inhibiting control section 82 receiving the auto signal (AT) compulsorily outputs the inhibit signal (IF) and turns the focusing gate 83 off. Accordingly, in this state, the zooming lens 70 is driven through the zooming gate 84 by the switching operation of the motor switch 63 irrespective of the operating state of the F/Z switch 65.

As mentioned above, in accordance with the present invention, in the focusing/zooming operation, the output of the F/Z switch 65 is invalidated by outputting the holding signal (H) by the state detecting section 81 during the switching operation of the motor switch 63. Accordingly, even when the F/Z switch 65 is operated in error during the execution of the zooming or focusing operation and thereby this switching state is changed, the zooming or focusing operation is continued without any influence of this switching operation until the switching operation of the motor switch 63 is released, thereby improving the operability.

Further, when the zooming lens 70 is set to the normal macro mode, the inhibiting control section 82 compulsorily turns the zooming gate 84 off. Accordingly, even when the F/Z switch 65 is in any operating state, the focusing operation is started at any time by the switching operation of the motor switch 63, thereby improving the operability.

When the auto focusing mode is set, the inhibiting control section 82 compulsorily turns the focusing gate 83 off. Thus, the zooming operation is started at any time by the switching operation of the motor switch 63, thereby improving the operability.

Accordingly, in the zooming/focusing operation, the composition or the focusing state already determined is not changed by the error in operation of the F/Z switch 65. In the normal macro mode and the auto focusing mode, there is no case in which the operator gets confused with respect to the operation of the lens controller and operations to be performed at a suitable time are delayed.

Further, the switching operation of the motor switch 63 correspond to the focusing and zooming operations so that the number of operating switches is reduced and thereby the operating area of the motor switch 63 can be increased. Thus, the operability of the motor switch 63 is improved and the cost of the lens controller can be reduced.

The lens controller of the present invention is not limited to that in the above-mentioned third embodiment, but may be changed in various kinds of modifications within the scope of the features of the present invention.

For example, the macro state of the zooming lens 70 is not limited to the normal macro mode mentioned above, but may be constructed by a zooming macro mode in which the focusing adjustment is performed by performing the zooming operation without fixing to the macro position M within the macro region from the position W to the macro position M. In this case, a means for detecting that the zooming lens 70 is located within the above macro region is disposed instead of the above macro position switch 77. The inhibiting control section 82 receives an output of this detecting means and compulsorily turns the focusing gate 83 off.

Further, the A/M switch 64 and the F/Z switch 65 are not limited to the toggle switches, but may be constructed to be two push-button switches. When the F/Z switch 65 is constructed by two push-button switches, one of the two push-button switches may be constructed such that the operating area is small and may be disposed in a recessed portion of the camera body such that it is not easy to operate this push-button switch. In this case, only the output provided by the other push-button switch, which is constructed to be easily operated, is constructed as the input signal toward the above inhibiting control section 82, thereby invalidating only this signal.

As mentioned above, in accordance with the first embodiment of the present invention, the lens controller is controlled such that the zooming speed within the zooming region is approximately constant even when the focusing position of the focusing lens group is located within any focusing region. The number of executions of the focus correcting operation for moving the focusing lens group to the focusing position is limited in accordance with the correcting amount. Therefore, the zooming speed within the zooming region is controlled to be approximately constant irrespective of the above focusing position before the zooming operation. When it is judged that there is no influence on the preset control operation, the subsequent preset operation is controlled to be executed without waiting for the remaining time corresponding to the remaining operation of the zooming drive means. The shift of the image forming position caused by the change in focal distance of the entire zooming optical system is automatically corrected. Accordingly, the lens optical system has a very simplified construction and is compact and light and cheaply manufactured. Further, the entire lens controller is similarly compact, light and can be cheaply manufactured. The shift of the image forming position peculiar to the varifocal lens is corrected automatically and rapidly even when the zooming lens group is moved from the arbitrary first focal point to the second focal point to change the entire focal distance. The shift of the image forming position is also reliably corrected even when the focusing position is any position within the above focusing region. Further, the zooming speed within the zooming region becomes approximately uniform, thereby providing a lens controller having an excellent operability.

In accordance with the second embodiment of the present invention, the lens optical system has a very simplified construction and is compact, light and can be cheaply manufactured. The entire lens controller is similarly compact, light and can be cheaply manufactured. The shift of the image forming position peculiar to the varifocal lens is corrected instantly even when the zooming lens group is moved from the arbitrary first focal point to the second focal point to change the entire focal point, thereby substantially holding the focusing state. In particular, when the focusing lens group is located in the inhibiting regions on the infinite and proximate sides, a means for inhibiting the focusing drive is disposed to inhibit the drive toward the infinite and proximate positions of the focusing lens group. The shift of the image forming position caused by the change in focal distance of the entire zooming optical system is automatically corrected only when the focusing lens group is not located within the inhibiting regions on the proximate and infinite sides, and only when the focus driving direction is opposite to the above inhibited direction in the inhibiting regions. Accordingly, it is possible to avoid the situations in advance in which an excessive load is applied to the focusing drive means in both inhibiting regions and the drive control is disabled.

Further, in accordance with the second embodiment of the present invention, when the correcting amount is greater than the preset maximum correcting amount, the maximum correcting amount instead of this correcting amount is outputted by the correction calculating means. Accordingly, it is possible to avoid the situations in which the means for detecting the position of the focusing lens group and the means for detecting the position of the zooming lens group perform such detections in error and thereby the focusing lens group moves to the proximate and infinite positions so that the excessive load state is continued.

Further, in accordance with the second embodiment of the present invention, the zooming lens group is driven until the zooming lens group reaches a desirable focal distance by the zooming drive means. When this drive of the zooming lens group is stopped, the focusing correction control means controls the focusing drive means to move the focusing lens group to the focusing position with respect to the desirable focal distance on the basis of the correcting amount calculated by the focusing correction calculating means irrespective of the position of the focusing lens group in the inhibiting region on the infinite or proximate side. Accordingly, a strict correction focusing operation is performed after the completion of the zooming operation, thereby causing no defocusing state. Therefore, it is possible to provide a lens controller smoothly driven and having a rapid response and an excellent operability and having useless operations and useless driving force.

In accordance with the third embodiment of the present invention, the start inputting means is used to start the focusing and zooming operations. Accordingly, the number of the start inputting means is reduced so that the operating area of the start inputting means can be correspondingly increased, thereby improving the operability and reducing the cost of the lens controller.

Further, in accordance with the third embodiment of the present invention, the operation of the operation selecting means is invalidated during the operation of the start inputting means. Accordingly, even when the operation selecting means is operated in error during the execution of the focusing or zooming operation and the operating state of the operation selecting means is thereby changed, the operation of the start inputting means is continued until the release thereof without any influence of this error in operation, thereby greatly improving the operability.

Further, in the third embodiment of the present invention, in the macro state of the zooming optical system, the above focusing operation is started by the operation of the start inputting means at any time irrespective of the content of commands for operating the operation selecting means. Thus, it is possible to reliably prevent the error in operation of the operation selecting means caused by an error in command and rapidly perform the focusing operation to be performed at a suitable time.

Further, in the third embodiment of the present invention, when the focusing mode selecting means is set to the auto focusing mode, the zooming operation is started by the operation of the start inputting means at any time irrespective of the output content of the operation selecting means. Accordingly, it is possible to reliably prevent the error in operation of the operation selecting means caused by an error in command and rapidly perform the zooming operation to be performed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lens controller for automatically correcting a shift of an image position with respect to a subject due to a change of a focal distance of a zooming optical system comprised of a varifocal lens group and a focusing lens group, each of which is movably arranged on a same optical axis of the zooming optical system, said change of the focal distance being caused by moving said varifocal lens group within a varifocal region defined by a shortest focal distance and a longest focal distance of the zooming optical system, a shifted amount of the image position being changed in response to a focusing position of said focusing lens group on said optical axis, said focusing position being set within a focusing region between a proximity position corresponding to a proximity distance and an infinite position corresponding to an infinite distance with respect to a distance of the subject, comprising:

a varifocal lens drive means for moving said varifocal lens group;

a focusing lens drive means for moving said focusing lens group;

a varifocal position detecting means for detecting a position of said varifocal lens group on said optical axis within said varifocal region, a detected position of said varifocal lens group corresponding to the focal distance of the zooming optical system;

a focusing position detecting means for detecting a position of said focusing lens group on said optical axis within said focusing region;

a control means for calculating a correcting amount of the shift of the image position with respect to the focal distance of the zooming optical system when a varifocal operation is performed to change the focal distance of the zooming optical system and for controlling said varifocal lens drive means and said focusing lens drive means so as to move first said varifocal lens group to change the focal distance of the zooming optical system for forming the image position, then to move said focusing lens group in accordance with the correcting amount; and a varifocal speed control means for controlling said varifocal lens drive means so as to change a moving speed of said varifocal lens group in accordance with the detected position of said focusing lens group, then to substantially keep a total of moving time constant with respect to said varifocal lens group and said focusing lens group.

2. A lens controller for automatically correcting a shift of an image position with respect to a subject due to a change of a focal distance of a zooming optical system comprised of a varifocal lens group and a focusing lens group, each of which is movably arranged on a same optical axis of the zooming optical system, said change of the focal distance being caused by moving said varifocal lens group within a varifocal region defined by a shortest focal distance and a longest focal distance of the zooming optical system, a shifted amount of the image position being changed in response to a focusing position of said focusing lens group on said optical axis, said focusing position being set within a focusing region between a proximity position corresponding to a proximity distance and an infinite position corresponding to an infinite distance with respect to a distance of the subject, comprising:

a varifocal lens drive means for moving said varifocal lens group;

a focusing lens drive means for moving said focusing lens group;

a varifocal position detecting means for detecting a position of said varifocal lens group on said optical axis within said varifocal region, a detected position of said varifocal lens group corresponding to the focal distance of the zooming optical system;

a focusing position detecting means for detecting a position of said focusing lens group on said optical axis within said focusing region;

a control means for calculating a correcting amount of the shift of the image position with respect to the focal distance of the zooming optical system when a varifocal operation is performed to change the focal distance of the zooming optical system and for controlling said varifocal lens drive means and said focusing lens drive means so as to move first said varifocal lens group to change the focal distance of the zooming optical system for forming the image position, to move said focusing lens group in accordance with the correcting amount when the correcting amount exceeds a reference amount determined in accordance with the detected position of said focusing lens group, then to limit a number of moving of said focusing lens group.

3. A lens controller for automatically correcting a shift of an image position with respect to a subject due to a change of a focal distance of a zooming optical system comprised of a varifocal lens group and a focusing lens group, each of which is movably arranged on a same optical axis of the zooming optical system, said change of the focal distance being caused by moving said varifocal lens group within a varifocal region defined by a shortest focal distance and a longest focal distance of the zooming optical system, a shifted amount of the image position being changed in response to a focusing position of said focusing lens group on said optical axis, said focusing position being set within a focusing region between a proximity position corresponding to a proximity distance and an infinite position corresponding to an infinite distance with respect to a distance of the subject, comprising:

a varifocal lens drive means for moving said varifocal lens group;

a focusing lens drive means for moving said focusing lens group;

a varifocal position detecting means for detecting a position of said varifocal lens group on said optical axis within said varifocal region, a detected position of said varifocal lens group corresponding to the focal distance of the zooming optical system;

a focusing position detecting means for detecting a position of said focusing lens group on said optical axis within said focusing region;

a first control means for calculating a correcting amount of the shift of the image position with respect to the focal distance of the zooming optical system when a varifocal operation is performed to change the focal distance of the zooming optical system and for controlling said varifocal lens drive means and said focusing lens drive means so as to move first said varifocal lens group to change the focal distance of the zooming optical system for forming the image position, then to move said focusing lens group in accordance with the correcting amount;

a remaining operation recognizing means for recognizing an amount of a remaining operation continued for a predetermined time after commands for stopping the moving of said varifocal lens group are given thereto;

an influence judging means for judging whether or not the amount of the remaining operation gives an influence to the next preset operation on the basis of recognized results of said remaining operation recognizing means; and a second control means for performing a control operation to execute the next preset operation without waiting for the remaining time corresponding to the amount of the remaining operation when the influence judging means judges that the amount of the remaining operation does not give any influence to the next preset operation.

4. A lens ccntroller for automatically correcting a shift of an image position with respect to a subject due to a change of a focal distance of a zooming optical system comprised of a varifocal lens group and a focusing lens group, each of which is movably arranged on a same optical axis of the zooming optical system, said change of the focal distance being caused by moving said varifocal lens group within a varifocal region defined by a shortest focal distance and a longest focal distance of the zooming optical system, said varifocal lens group being adapted such that a focusing position thereof is invariant at an infinite position and is changed at a proximity position so as to move away from the infinite position when the focal distance of the zooming optical system is changed from the shortest focal distance to the longest focal distance, said focusing position being set within a focusing region between a proximity position corresponding to a proximity distance and an infinite position corresponding to an infinite distance with respect to a distance of the subject, comprising:

a varifocal lens drive means for moving said varifocal lens group;

a focusing lens drive means for moving said focusing lens group;

a varifocal position detecting means for detecting a position of said varifocal lens group on said optical axis within said varifocal region, a detected position of said varifocal lens group corresponding to the focal distance of the zooming optical system;

a focusing position detecting means for detecting a position of said focusing lens group on said optical axis within said focusing region;

a focusing correcting calculating means for receiving outputs of said varifocal position detecting means and said focusing lens detecting means after said varifocal lens group is driven by said varifocal lens drive means and for calculating a correcting amount with respect to a shift of an image position based on the outputs of said varifocal position detecting means and said focusing lens detecting means;

a focusing correction control means for receiving said correcting amount and controlling said focusing lens drive means so as to move said focusing lens group to said focusing position on the focal distance;

a focusing drive inhibiting means for inhibiting driving of said focusing lens group in directions of the infinite and proximity positions respectively when said focusing lens group is located in an inhibiting region on the infinite side formed within a predetermined distance from the infinite position to the proximity position, and when said focusing lens group is located in an inhibiting region on the proximity side formed within a predetermined distance from the proximity position to the infinite position in a case where the focal distance of the zooming optical system is changed; and means for automatically correcting the shift of the image position caused by the change in focal distance of the zooming optical system when said focusing lend group is not located in the inhibiting regions on the proximity and infinite sides and when the driving direction of said focusing lens group located in the inhibiting regions is opposite to said inhibited direction.

5. A lens controller for automatically correcting a shift of an image position with respect to a subject due to a change of a focal distance of a zooming optical system comprised of a varifocal lens group and a focusing lens group, each of which is movably arranged on a same optical axis of the zooming optical system, said change of the focal distance being caused by moving said varifocal lens group within a varifocal region defined by a shortest focal distance and a longest focal distance of the zooming optical system, said varifocal lens group being adapted such that a focusing position thereof is invariant at an infinite position and is changed at a proximity position so as to move away from the infinite position when the focal distance of the zooming optical system is changed from the shortest focal distance to the longest focal distance, said focusing position being set within a focusing region between a proximity position corresponding to a proximity distance and an infinite position corresponding to an infinite distance with respect to a distance of the subject, comprising:

a varifocal lens drive means for moving said varifocal lens group;

a focusing lens drive means for moving said focusing lens group;

a varifocal position detecting means for detecting a position of said varifocal lens group on said optical axis within said varifocal region, a detected position of said varifocal lens group corresponding to the focal distance of the zooming optical system;

a focusing position detecting means for detecting a position of said focusing lens group on said optical axis within said focusing region;

a focusing correction calculating means for receiving outputs of said varifocal position detecting means and said focusing position detecting means after said varifocal lens group is driven by said varifocal lens drive means and for calculating a correcting amount with respect to a shift of an image position and outputting a preset maximum correcting amount instead of the calculated correcting amount when the calculated correcting amount is greater than the preset maximum correcting amount; and a focusing correction control means for receiving said calculated correcting amount or the maximum correcting amount and controlling said focusing lens drive means so as to move said focusing lens group to the focusing position on the focal distance.

6. A lens controller in which a zooming optical system is comprised of a focusing lens and a varifocal lens, each of which is disposed on the same optical axis, the zooming optical system constitutes a photographing lens, the focusing lens is moved to perform the focusing operation and the varifocal lens is moved to perform the zooming operation for changing a focal distance of the zooming optical system, comprising:

a starting means for outputting an operating executing signal during an operating period thereof and operable from the exterior of the lens controller;

an operation selecting means for outputting one of a focusing command signal for commanding the focusing operation to said focusing lens group and a zooming command signal for commanding the zooming operation to said varifocal lens group and operable from the exterior of the lens controller;

an operating state detecting means for detecting whether the operation of the starting means is continued or not, and outputting an inhibit signal while the operation of the starting means is continued;

an output determining means for invalidating the output from the operation selecting means during a period of the reception of the inhibit signal, and validating this output in a period except for this signal receiving period;

an executing selecting means for receiving the output of said operation selecting means through said output determining means and for outputting a focusing execution signal or a zooming execution signal respectively corresponding to said focusing command signal or said zooming command signal during the period of the reception of the operation executing signal;

a focusing drive means for receiving the focusing execution signal and driving the focusing lens; and a zooming drive means for receiving the zooming execution signal and driving the varifocal lens;

said starting means being adapted so as to start one of said focusing operation and said zooming operation and to invalidate the operation of said operation selecting means.

7. A lens controller in which a zooming optical system is comprised of a focusing lens and a zooming lens, each of which is disposed on the same optical axis, the zooming optical system constitutes a photographing lens, the focusing lens is moved to perform the focusing operation and the varifocal lens is moved to perform the zooming operation for changing a focal distance of the zooming optical system, said zooming optical system being set to a normal macro mode for performing the focusing operation in a macro state for enabling macro photographing, or a zooming macro mode for performing the focusing adjustment by the zooming operation, comprising:

a macro state detecting means for detecting that the zooming optical system is in the macro state and for outputting a macro state signal;

a starting means for outputting an operating executing signal during an operating period thereof and operable from the exterior of the lens controller;

an operation selecting means for outputting one of a focusing command signal for commanding the focusing operation to said focusing lens group and a zooming command signal for commanding the zooming operation to said varifocal lens group and operable from the exterior of the lens controller;

an output determining means for invalidating the output from the operation selecting means during the period of the reception of the macro state signal;

an execution selecting means for outputting a focusing execution signal when the zooming optical system is set to the normal macro mode corresponding to the period of the reception of the operating execution signal and outputting a zooming execution signal when the zooming optical system is set to the zooming macro mode;

a focusing drive means for receiving the focusing execution signal and driving the focusing lens; and a zooming drive means for receiving the zooming execution signal and driving the variable lens;

an operation corresponding to the starting means being determined by only one of the normal macro mode and the zooming macro mode irrespective of the output content of the operation selecting means when the zooming optical system is in the macro state.

8. A lens controller in which a zooming optical system is comprised of a focusing lens and a varifocal lens, each of which is disposed on the same optical axis, the zooming optical system constitutes a photographing lens, the focusing lens is moved to perform the focusing operation and the zooming lens is moved to perform the zooming operation for changing a focal distance of the zooming optical system, comprising:

a focusing mode selecting means for selectively setting one of an auto focusing mode for automatically performing the focusing adjustment and a manual focusing mode for manually performing the focusing adjustment and operable from the exterior of the lens controller;

an auto focusing control means for measuring the distance of a subject and outputting a focusing drive signal for driving the focusing lens corresponding to the measured distance of the subject;

a starting means for outputting an operating execution signal during an operating period thereof and operable from the exterior of the lens controller;

an operation selecting means for outputting one of a focusing command signal for commanding the focusing operation to said focusing lens group and a zooming command signal for commanding the zooming operation to said varifocal lens group and operable from the exterior of the lens controller;

an output determining means for invalidating the output from the operation selecting means during a period in which the focusing mode selecting means is set to the auto focusing mode;

an execution selecting means for outputting a zooming execution signal during the period of the reception of the operating execution signal;

a focusing drive means for receiving the focusing execution signal and driving the focusing lens; and a zooming drive means for receiving the zooming execution signal and driving the focusing lens;

the zooming operation being started by the operation of said starting means at any time irrespective of the output content of said operation selecting means when the focusing mode selecting means is set to the auto focusing mode.

* * * * *